(12) United States Patent
Matsuda et al.

(10) Patent No.: US 10,480,635 B2
(45) Date of Patent: Nov. 19, 2019

(54) ROTATION TRANSMISSION DEVICE

(71) Applicant: NSK LTD., Shinagawa-ku, Tokyo (JP)

(72) Inventors: Yasuyuki Matsuda, Fujisawa (JP);
Daisuke Gunji, Fujisawa (JP);
Masafumi Hikida, Fujisawa (JP);
Kazutaka Tanaka, Fujisawa (JP);
Tooru Ueda, Fujisawa (JP); Tetsu Takehara, Fujisawa (JP); Tomoharu Saito, Fujisawa (JP); Hiroyasu Yoshioka, Fujisawa (JP); Yuka Kaneko, Fujisawa (JP)

(73) Assignee: NSK Ltd., Tokyo (JP)

( * ) Notice: Subject to any disclaimer, the term of this patent is extended or adjusted under 35 U.S.C. 154(b) by 356 days.

(21) Appl. No.: 15/436,996

(22) Filed: Feb. 20, 2017

(65) Prior Publication Data

US 2017/0227111 A1 Aug. 10, 2017

Related U.S. Application Data

(62) Division of application No. 14/901,063, filed as application No. PCT/JP2013/080358 on Nov. 8, 2013, now abandoned.

(30) Foreign Application Priority Data

Jun. 25, 2013 (JP) .................................. 2013-132497
Oct. 29, 2013 (JP) .................................. 2013-224610
(Continued)

(51) Int. Cl.
*G01L 3/00* (2006.01)
*F16H 57/00* (2012.01)
(Continued)

(52) U.S. Cl.
CPC ....... *F16H 57/0037* (2013.01); *F16C 19/364* (2013.01); *F16C 19/463* (2013.01);
(Continued)

(58) Field of Classification Search
CPC ........... F16H 57/0037; F16H 2059/147; F16C 19/364; F16C 19/463; F16C 33/581;
(Continued)

(56) References Cited

U.S. PATENT DOCUMENTS 4,150,566 A 4/1979 Loebel et al.
4,615,212 A * 10/1986 Kugler ................ G01M 13/026
73/162
(Continued)

FOREIGN PATENT DOCUMENTS

EP 1 271 120 A1 1/2003
JP 63-036124 A 2/1988
(Continued)

OTHER PUBLICATIONS

Extended European Search Report dated Jul. 19, 2018, in European Patent Application No. 17204705.2.
(Continued)

*Primary Examiner* — Max H Noori
(74) *Attorney, Agent, or Firm* — Shapiro, Gabor and Rosenberger, PLLC

(57) ABSTRACT

A rotation transmission device having a high torque measurement resolution is provided. The rotation transmission device is provided with: a rotary-shaft unit (6) having a first and second rotary shaft (13, 14) combined so as to be coaxial and such that the end sections thereof can rotate relative to each other and a torsion bar (15) that is provided on the inner-diameter side of the first and second rotary shafts so as to be coaxial therewith, has one end section connected to the first rotary shaft (13), and has the other end section con-
(Continued)

nected to the second rotary shaft (14); a first gear (7) fastened to the outer peripheral surface of the first rotary shaft (13); a second gear (8) fastened to the outer peripheral surface of the second rotary shaft (14); a coupling shaft (9) provided on the inner-diameter side of the torsion bar (15) so as to be coaxial therewith, having one end section connected to one rotary shaft (13), and having the other end section protruding from an end of the torsion bar (15) in the axial direction; a first encoder disposed and fixed on the other end of the coupling shaft (9) so as to be coaxial with the first rotary shaft (13) and having a first detected section (39); a second encoder fastened on the other end of the second rotary shaft (14) so as to be close to the first encoder and having a second detected section (40); and a sensor unit having at least one sensor (42a, 42b) that faces the first and second detected sections (39, 40).

12 Claims, 50 Drawing Sheets

(30) Foreign Application Priority Data

| | | |
|---|---|---|
| Oct. 30, 2013 | (JP) | 2013-225481 |
| Nov. 5, 2013 | (JP) | 2013-229682 |
| Nov. 6, 2013 | (JP) | 2013-229873 |
| Nov. 6, 2013 | (JP) | 2013-229952 |
| Nov. 7, 2013 | (JP) | 2013-231070 |

(51) Int. Cl.
*G01L 3/10* (2006.01)
*F16C 33/66* (2006.01)
*F16C 19/36* (2006.01)
*F16C 19/46* (2006.01)
*F16C 33/58* (2006.01)
*F16F 15/121* (2006.01)
*F16H 59/14* (2006.01)

(52) U.S. Cl.
CPC ........ *F16C 33/581* (2013.01); *F16C 33/6677* (2013.01); *F16F 15/1216* (2013.01); *G01L 3/101* (2013.01); *G01L 3/104* (2013.01); *G01L 3/105* (2013.01); *G01L 3/109* (2013.01); *F16C 2361/65* (2013.01); *F16H 2059/147* (2013.01)

(58) Field of Classification Search
CPC .............. F16C 33/6677; F16C 2361/65; F16F 15/1216; G01L 3/101; G01L 3/104; G01L 3/105; G01L 3/109

USPC .................................................... 73/862.333
See application file for complete search history.

(56) References Cited

U.S. PATENT DOCUMENTS

| | | |
|---|---|---|
| 4,765,434 A | 8/1988 | Kawamoto |
| 4,767,925 A | 8/1988 | Kawamoto |
| 4,881,414 A | 11/1989 | Setaka et al. |
| 4,907,460 A | 3/1990 | Taniguchi et al. |
| 5,247,839 A | 9/1993 | Okutani |
| 5,265,480 A | 11/1993 | Tsuji et al. |
| 6,026,925 A * | 2/2000 | Nagao ................... B62D 5/043 180/444 |
| 6,258,007 B1 | 7/2001 | Kristjansson |
| 6,782,966 B2 | 8/2004 | Sahr et al. |
| 9,239,095 B1 | 1/2016 | Escobosa |
| 2004/0056748 A1 | 3/2004 | Masaki et al. |
| 2004/0159488 A1 | 8/2004 | Matsumoto et al. |
| 2005/0193835 A1* | 9/2005 | Kondo ..................... B62D 6/10 73/862.331 |
| 2005/0266927 A1 | 12/2005 | Kuroda et al. |
| 2010/0064822 A1 | 3/2010 | Debrailly |
| 2010/0240464 A1* | 9/2010 | Schafer ..................... F16D 1/06 464/182 |
| 2011/0015878 A1* | 1/2011 | LaVigne ................. G01L 3/109 702/41 |
| 2015/0053040 A1 | 2/2015 | Ueda |

FOREIGN PATENT DOCUMENTS

| | | |
|---|---|---|
| JP | 01-220762 A | 9/1989 |
| JP | 01-254826 A | 10/1989 |
| JP | 02-017311 Y2 | 5/1990 |
| JP | 03-099240 A | 4/1991 |
| JP | 2010-185478 A | 8/2010 |
| JP | 2013-088181 A | 5/2013 |
| WO | WO 2004/071686 A1 | 8/2004 |

OTHER PUBLICATIONS

International Search Report from International Patent Application No. PCT/JP2013/080358, dated Dec. 10, 2013.
Partial Supplementary European search report for European Patent Application No. 13887625.5, dated Jan. 20, 2017.

* cited by examiner

When torque is not transmitted

When torque is transmitted

Fig.41 (A)
When torque is not transmitted
Fig.41 (B)
When torque is transmitted
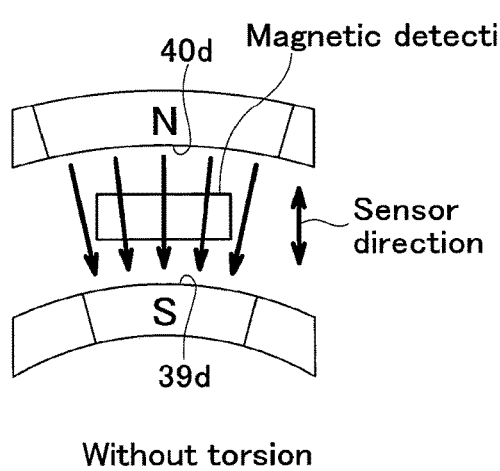
Without torsion
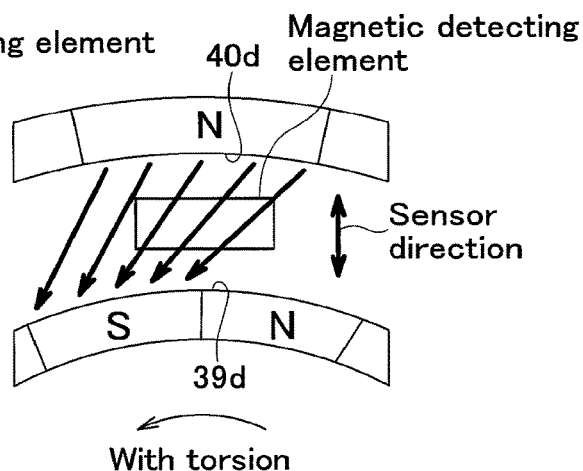
With torsion
Fig.42
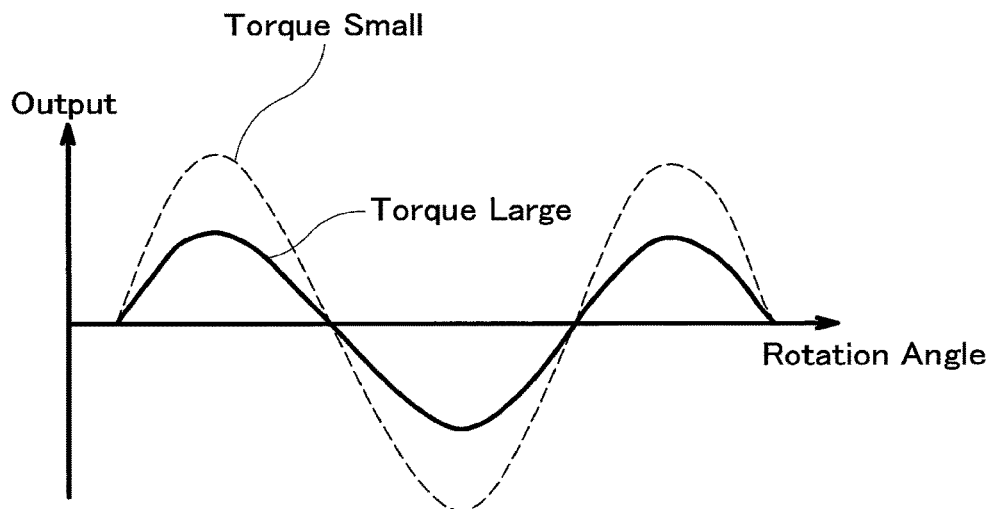

ROTATION TRANSMISSION DEVICE

TECHNICAL FIELD

The present invention relates to a rotation transmission device that is assembled in various kinds of machinery such as an automatic transmission for an automobile, and has a function for transmitting torque using a rotary shaft, as well as a function for measuring the torque that is transmitted by that rotary shaft.

BACKGROUND ART

An automatic transmission for an automobile includes a mechanism that measures the rotational speed of a rotary shaft of the automatic transmission, and measures the torque that the rotary shaft transmits, and then performs transmission control for controlling the automatic transmission itself, or output control for controlling the output of the engine. As such a device for measuring torque is a device disclosed in JPH01254826 (A) that converts the amount of elastic torsional deformation of the rotary shaft that transmits torque to a phase difference of output signals from a pair of sensors, and measures the torque based on the phase difference.

FIG. 64 illustrates a first example of a conventional torque measurement device that includes this kind of construction. This torque measurement device includes a pair of encoders 2 that are fastened on the outside of the rotary shaft 1 at two locations in the axial direction of the rotary shaft 1, and sensors 3 that correspond to each of the encoders 2 and that are supported in a housing that is not illustrated in the figure. The outer-circumferential surfaces of these encoders 2 function as detected sections, and the magnetic characteristics of these encoders 2 change in an alternating manner at a uniform pitch in the circumferential direction. The pitches at which the magnetic characteristics vary in the circumferential direction on the outer-circumferential surface of these encoders 2 are equal to each other. On the other hand, the sensors 3 are arranged so that the detecting sections of the sensors 3 face the outer-circumferential surfaces of the encoders 2. These sensors 3 cause the output signals that are outputted from the sensors 3 to change according to the change in the magnetic characteristics on the outer-circumferential surfaces of the encoders 2 that the detecting sections face.

The output signals from the sensors 3 change periodically as the encoders 2 rotate together with the rotary shaft 1. The frequency and period of this change are values that correspond to the rotational speed of the rotary shaft 1. Therefore, it is possible to find the rotational speed of the rotary shaft 1 based on that frequency and period. Moreover, as the rotary shaft 1 transmits torque, the rotary shaft 1 undergoes elastic torsional deformation, which causes relative displacement between the encoders 2. As a result, the phase difference ratio (=phase difference/1 period) between the output signals from the sensors 3 changes. This phase difference ratio is a value that corresponds to the amount of elastic torsional deformation of the rotary shaft 1 due to transmitting torque. Therefore, the torque that the rotary shaft 1 transmits can be found based on this phase difference ratio.

When trying to apply the torque measurement device of this first example of conventional construction to an automatic transmission for an automobile, the torsional rigidity of the rotary shaft 1 that is the target of torque measurement is high, so there is a problem in that it is difficult to sufficiently maintain the amount of elastic torsional deformation of the rotary shaft 1, and the resolution of the torque measurement becomes low. Moreover, it is necessary to install the two sensors 3 so as to be separated in the axial direction, so there is also a problem in that it becomes difficult to arrange two harnesses 4 that run from these sensors 3. Furthermore, in order to support the sensors 3 in a highly precise relative positional relationship, it is necessary to provide supporting and fastening sections in the housing, and thus there is also a problem in that processing of the housing becomes complicated.

In regard to this, JPH01254826 (A) discloses a torque measurement device in which the sensors have a unit-like construction. FIG. 65 illustrates a second example of a conventional torque measurement device that has this kind of construction. In this torque measurement device, the detected sections of a pair of encoders 2a that are fastened at two locations in the axial direction of the rotary shaft 1 extend toward the center section in the axial direction, and detecting sections of a pair of sensors of a single sensor unit 5 that is placed in the center section in the axial direction of the rotary shaft 1 faces the detected sections of the encoders 2a. However, in this case of applying the torque measurement device of this second example of conventional construction to an automatic transmission for an automobile as well, even though the installation of the sensor unit 5 is simplified, it does not mean that the problem of low resolution of the torque measurement has been solved.

Moreover, JPH02017311 (U) discloses a torque measurement device having construction that uses a torsion bar. More specifically, the torque measurement device of this third example of conventional construction is constructed so that encoders are fastened to the outer-circumferential surfaces of a pair of rotary shafts that are arranged along the same line, and these rotary shafts are connected by a torsion bar that undergoes elastic torsional deformation more easily than these rotary shafts. In this case, the amount of relative displacement in the rotational direction between the encoders can be made large due to the elastic torsional deformation of the torsion bar that occurs when transmitting torque, so it is possible to improve the resolution of the torque measurement. However, even when the torque measurement device of this third example of conventional construction is applied to a counter shaft of an automatic transmission for an automobile, it is difficult to sufficiently improve the resolution of the torque measurement. In other words, an input gear and output gear are fastened at two locations in the axial direction of the counter shaft, and the portion of this counter shaft that undergoes elastic torsional deformation during the transmission of torque is only the portion that is between these gears. The space in the axial direction of this portion is small, and it is difficult to sufficiently lengthen the dimension in the axial direction of the torsion bar that is to be placed in this portion, so it is not possible to sufficiently maintain the amount of elastic torsional deformation of the torsion bar.

As other related literature that is related to the present invention is JP2010185478 (A). A torsion bar having high fatigue strength and that is able to handle large stress loads, and a manufacturing method for manufacturing that torsion bar are disclosed in JP2010185478 (A).

[Related Literature]

[Patent Literature]

[Patent Literature 1] JPH01254826 (A)

[Patent Literature 2] JPH02017311 (U)

[Patent Literature 3] JP2010185478 (A)

SUMMARY OF INVENTION

[Problem to be Solved by Invention]

The object of the present invention is to achieve construction of a rotation transmission device that can measure transmitted torque by using only a pair of encoders and one sensor unit, and that can increase the resolution of the torque measurement regardless of whether the space in the axial direction between a pair of gears is large or small.

[Means for Solving Problems]

The rotation transmission device of the present invention includes a rotary-shaft unit, a first gear, a second gear, a first encoder, a second encoder and a sensor unit. Of these, the rotary-shaft unit includes: a first rotary shaft and a second rotary shaft that are both hollow, and together with being arranged so as to be concentric with each other, are combined so that the end sections of each are able to rotate relative to each other, and in this state are supported by a housing so as to rotate freely; and a torsion bar that is hollow and concentrically arranged on the inner-diameter side of the first and second rotary shafts, with one end section being connected to the first rotary shaft so that relative rotation is not possible, and the other end section being connected to the second rotary shaft so that relative rotation is not possible.

The first gear is provided in the middle section in the axial direction of the outer-circumferential surface of the first rotary shaft. The second gear is provided in the middle section in the axial direction of the outer-circumferential surface of the second rotary shaft. The first and second gears can be made to be separate from the first and second rotary shafts and fastened to the middle sections in the axial direction of the outer-circumferential surfaces of the first and second rotary shafts, or can be integrally formed with the middle sections in the axial direction of the outer-circumferential surfaces of the first and second rotary shafts.

The first encoder is fastened to one of the first and second rotary shafts so as to be concentric with the one rotary shaft, and has a first detected section that is magnetized so that the magnetic characteristics change in an alternating manner at a uniform pitch. Moreover, a second encoder is fastened to the other of the first and second rotary shafts so as to be concentric with the other rotary shaft, and has a second detected section that is magnetized so that the magnetic characteristics change in an alternating manner at a uniform pitch. The first and second detected sections can be circular ring-shaped, or can be circular disk-shaped. The first and second encoders can be made separate from the rotary shafts, or members that rotate in synchronization with the rotary shafts and fastened to and supported by the rotary shafts or these members, or can be integrally formed with these members.

The sensor unit is supported by the housing, and comprises at least one sensor that faces the first and second detected sections, and causes an output signal to change in correspondence to the change in magnetic characteristics of a portion of the first and second detected section where the at least one sensor faces.

For example, the first encoder is directly or indirectly fastened to an input shaft, which is the first rotary shaft, and the second encoder is directly or indirectly fastened to an output shaft, which is the second rotary shaft.

In one form of the present invention, one end section and the other end section of the torsion bar are connected to the end sections of the first and second rotary shafts that are opposite the end sections that are combined together. For example, when the end sections of the first and second rotary shafts that are combined together are one end section of the second rotary shaft and the other end section of the first rotary shaft, the one end section of the torsion bar is connected to the one end section of the first rotary shaft, and the other end section of the torsion bar is connected to the other end section of the second rotary shaft.

In one form of the present invention, there is a coupling shaft that is arranged on the inner-diameter side of the torsion bar and arranged concentric with the torsion bar, with one end section thereof being connected to the one rotary shafts so that relative rotation is not possible, and the other end section protruding in the axial direction from the end section of the torsion bar, the first encoder is fastened to the other end section of the coupling shaft, the second encoder is fastened to the end section of the other rotary shaft on the other end section side of the coupling shaft so as to be close to the first encoder, and the first and second detected sections are arranged so as to be close to each other (for example, arranged with a space between of less than 10 mm, and more preferably, less than 5 mm). For example, when the end sections of the first and second rotary shafts that are combined together are taken to be one end section of the second rotary shaft and the other end section of the first rotary shaft, one end section of the torsion bar is connected to the one end section of the first rotary shaft, and the other end section of the torsion bar is connected to the other end section of the second rotary shaft, one end section of the coupling shaft is connected to the one end section of the first rotary shaft, and the other end section of the coupling shaft protrudes in the axial direction of the other end section of the second rotary shaft, and together with the first encoder being fastened to the other end section of the coupling shaft, the second encoder is fastened to the other end section of the second rotary shaft. In this form, the first and second encoders and the sensor unit are arranged on one end section in the axial direction of the rotary-shaft unit (the one end section in the axial direction or the other end section in the axial direction).

In this case, preferably, a sliding bearing is provided between the inner-circumferential surface of the end section of the other rotary shaft on the other end section side of the coupling shaft and the outer-circumferential surface of the coupling shaft or a fitting cylindrical section of a metal core of the first encoder that fits on the coupling shaft.

Alternatively, a rim section is provided on the outer-circumferential surface of the one end section of the coupling shaft, and the coupling shaft is supported by the one rotary shaft so that relative rotation is not possible with the rim section being pressure fitted with the inner-circumferential surface of the end section of the one rotary shaft on the one end side of the coupling shaft.

Alternatively, the other rotary shaft is supported by the housing so as to rotate freely using a rolling bearing that is located between the portion of the outer-circumferential surface of the other rotary shaft that is near the end section on the other end section side of the coupling shaft and the inner-circumferential surface of the housing; and the sensor unit includes a sensor cover and a detecting section that is fastened to and supported by the inside of the sensor cover; and by fastening the sensor cover to and supporting the sensor cover by the end section of the outer ring of the rolling bearing on the other end section side of the coupling shaft of the other rotary shaft so that the first and second encoders are located in a space inside the sensor cover, the detecting section is made to face the first and second detected sections. For example, the second rotary shaft is supported by the housing by a rolling bearing that is located between a portion of the second rotary shaft near the other end and the inner-circumferential surface of the housing, the sensor cover of the sensor unit is fastened to and supported by the end section of the outer ring of the rolling bearing on the other end section side of the second rotary shaft, and the first encoder that is fastened to the other end section of the coupling shaft, and the second encoder that is fastened to the other end section of the second rotary shaft are located in a space inside the sensor cover. In this case, preferably, a seal device is located between the space where plural rolling bodies of the rolling bearing are located and the space on the inside of the sensor cover where the first and second detected sections are located, and functions as a partition between these spaces.

Alternatively, the other rotary shaft is supported by the housing so as to rotate freely using a rolling bearing that is located between the portion of the outer-circumferential surface of the other rotary shaft near the end section on the other end section side of the coupling shaft and the inner-circumferential surface of the housing, and the second encoder is fastened around the outside of the end section of the inner ring of the rolling bearing on the other end section side of the coupling shaft. For example, the second rotary shaft is supported by the housing using a rolling bearing that is located between a portion of the outer-circumferential surface of the second rotary shaft near the other end and the inner-circumferential surface of the housing, and the second encoder is fastened around the outside of the other end section of the inner ring of the rolling bearing.

In this case, the first and second detected sections can both be cylindrical shaped, and at least one end section in the axial direction of the first and second detected sections can be arranged around the outer-diameter side of the end section of the other rotary shaft on the other end section side of the coupling shaft, or of another part that is fastened around the outside of the end section, in a position that overlaps in the radial direction that end section of the other rotary shaft or the other part. For example, at least part of the cylindrical shaped first and second detected sections is arranged around the outer-diameter side of the other end section of the second rotary shaft or of construction that is fastened to the end section, in a position that overlaps these in the radial direction.

In one form of the present invention, the first encoder is fastened to the first rotary shaft in a position between the first and second gears in the axial direction, and the second encoder is fastened to the second rotary shaft in a position between the first and second gears in the axial direction. That is to say, in this form, the first and second encoders and the sensor unit are arranged in the middle section in the axial direction of the rotary-shaft unit.

In one form of the present invention, the rotary-shaft unit is supported by the housing by plural rolling bearings so as to rotate freely; and the first rotary shaft or second rotary shaft is integrally formed with the inner ring of at least one of the plural rolling bearings.

In one form of the present invention, the first rotary shaft or second rotary shaft is integrally formed with the torsion bar.

In one form of the present invention, the sensor unit includes a first sensor that faces the first detected section, and a second sensor that faces the second detected section, and the first and second sensors generate output signals that change in correspondence to the change in magnetic characteristics of the portions of the first and second detected sections that the first and second sensors face; where the first and second detected sections can both be circular ring-shaped and arranged close to each other in the axial direction of the rotary-shaft unit; and in that case, the first and second sensors are made to face the first and second detected sections in the radial direction of the rotary-shaft unit. Moreover, the first and second detected sections can both be circular disk-shaped and arranged close to each other in the radial direction of the rotary-shaft unit; and in that case, the first and second sensors are made to face the first and second detected sections in the axial direction of the rotary-shaft unit.

In one form of the present invention, the first and second encoders are made of a magnetic material; the first and second detected sections include sections with material removed and solid sections that are arranged in an alternating manner at a uniform pitch in the circumferential direction, and are arranged so as to be close to each other and overlap in the radial or axial direction; the sensor unit includes a stator made of a magnetic material, and plural coils that are made of one conducting wire, and is constructed so that when a driving voltage is applied to the conducting wire, the output current or the output voltage from the conducting wire is used as an output signal; the stator includes: plural core sections that are arranged at a uniform pitch in the circumferential direction, extend in the overlapping direction of the first and second detected sections, and the tip-end surfaces face one of the first and second detected sections from one side in the overlapping direction of the first and second detected sections; and a circular ring-shaped rim section that connects together the base-end sections of the plural core sections; and the plural coils are fastened one by one around the plural core sections, and are such that the winding directions of coils that are adjacent in the circumferential direction are opposite each other.

In one form of the present invention, the first and second encoders are made of a magnetic material; the first and second detected sections include sections with material removed and solid sections that are arranged in an alternating manner at a uniform pitch in the circumferential direction, and the solid sections of the first detected section and the solid sections of the second detected section are arranged in an alternating manner in the circumferential direction with a space in between each in the circumferential direction; and the sensor unit includes one sensor that faces the portion where the solid sections of the first and second detected sections are alternatingly arranged, and the sensor generates an output signal that changes in correspondence to the change in the magnetic characteristics of the portion where the sensor faces the solid sections of the first and second detected sections are alternatingly arranged.

In one form of the present invention, the first and second detected sections include a pair of cylindrical surfaces that face each other in the radial direction or a pair of circular ring surfaces that face each other in the axial direction, and are arranged so the S poles and N poles of these detected sections alternate at a uniform pitch in the circumferential direction; and the sensor unit includes a magnetism-detecting element or coil that is arranged between the first and second detected sections, and the output voltage or output current from that magnetism detecting unit, or the output voltage or output current from the coil is used as the output signal.

Furthermore, preferably the end sections of the first and second rotary shafts are combined in a state in which displacement in a direction in the axial direction toward each other is prevented, the first and second gears are both helical gears, and the directions of inclination of the first and second gears are regulated so as to be directions in which the gear reaction forces in the axial direction that act on the first and second gears during forward operation of the first and second gears (rotation in a direction of rotation that occurs often during use, for example, rotation when the automobile is moving forward) are toward each other (press toward each other).

Moreover, preferably, one of the combination cylindrical sections of the first combination cylindrical section that is provided on the other end section of the first rotary shaft and the second combination cylindrical section that is provided on one end section of the second rotary shaft is inserted into the inner-diameter side of the other combination cylindrical section, a radial bearing (radial rolling bearing, or radial sliding bearing) is placed between the opposing circumferential surfaces of the first and second combination cylindrical sections, and a thrust bearing (thrust rolling bearing, or thrust sliding bearing) is placed between a stepped surface that is provided on the base-end section of the outer-circumferential surface of one of the combination cylindrical sections, and the tip-end surface of the other combination cylindrical section.

In this case, it is possible to use for example, a circular disk shaped thrust washer that is held between the stepped surface and the tip-end surface as the thrust bearing.

In that case, preferably a pair of sections with material removed that connect a pair of spaces that exist in positions on both sides in the radial direction of the portion between the stepped surface and the tip-end surface are formed at one or plural location in the circumferential direction of the thrust washer (preferably, plural evenly spaced locations). As the sections with material removed, it is possible to use slits or through holes that pass through both side surfaces of the thrust washer, or it is also possible to use concave grooves that are provided in at least one of the side surfaces of the thrust washer.

Moreover, preferably the outer-circumferential edge of the thrust washer protrudes outward in the radial direction from a portion between the stepped surface and the tip-end surface, and a reinforcing cylindrical section is formed around the entire outer-circumferential edge.

Furthermore, preferably, a first male spline section that has a first plating layer on the surface layer thereof is provided on the outer-circumferential surface of one end section of the torsion bar, and a first female spline section that is able to engage with the first male spline section is provided on the inner-circumferential surface of the first rotary shaft. Of these, the metal of the first plating layer is a metal that is softer than the metal of the torsion bar and first rotary shaft. By pressure fitting the first male spline section into the first female spline section with interference that is less than the thickness dimension of the first plating layer in the free state (state in which no external forces act) the spline sections are connected with no looseness in the circumferential direction. Together with this, a second male spline section having a second plating layer on the surface layer thereof is provided on the outer-circumferential surface of the other end section of the torsion bar, and a second female spline section that is able to engage with the second male spline section is provided on the inner-circumferential surface of the second rotary shaft. The metal of the second plating layer is a metal that is softer than the metal of the torsion bar and second rotary shaft. By pressure fitting the second male spline section into the second female spline section with interference that is less than the thickness dimension of the second plating layer in the free state (state in which no external forces act) the spline sections are connected with no looseness in the circumferential direction. In this case, the metal material of the first and second plating layers is copper or nickel.

[Effect of Invention]

In the case of the rotation transmission device of the present invention, the output signal from the sensor unit changes in correspondence to the rotational speed due to the first and second encoders (first and second detected sections) rotating together with the rotary-shaft unit (first and second rotary shafts). Therefore, when necessary, it is possible to measure the rotational speed based on the output signal from the sensor unit. Moreover, when the rotary-shaft unit transmits torque between the first and second gears, there is relative displacement in the direction of rotation between the first and second gears (between the first and second rotary shafts, and between the first and second encoders) as elastic torsional deformation occurs in the middle section in the axial direction of the torsion bar. As a result of this kind of relative displacement in the direction of rotation between the first and second encoders, the output signal from the sensor unit changes in correspondence to that relative displacement (size of the torque). Therefore, it is possible to measure the torque based on the output signal from the sensor unit.

Particularly, in the case of the present invention, the first rotary shaft that is provided with the first gear in the middle section in the axial direction of the outer-circumferential surface thereof, and the second rotary shaft that is provided with the second gear in the middle section in the axial direction of the outer-circumferential surface are both hollow, the torsion bar is arranged on the inner-diameter side of these rotary shafts and both end sections of the torsion bar are connected to these rotary shafts so that no relative rotation is possible. Therefore, for example, it is possible to make the dimension in the axial direction of the middle section in the axial direction of the torsion bar greater than the space in the axial direction between the first and second gears, and to sufficiently maintain the amount of elastic torsional deformation of the middle section in the axial direction of the torsion bar that occurs when torque is transmitted. As a result, the case of the present invention differs from construction in which the rotary-shaft unit is one rotary in that it is possible to sufficiently increase the amount of relative displacement in the direction of rotation between the first and second gears (first and second rotary shaft, first and second encoders) that occurs when torque is transmitted, regardless of whether the space in the axial direction between the first and second gears is large or small. Therefore, it is possible to sufficiently increase the resolution of the torque measurement.

Moreover, in the case of the present invention, by adjusting the dimension in the radial direction and the dimension in the axial direction of the middle section in the axial direction of the torsion bar during the design stage, it is possible to easily adjust the torsional rigidity of the middle section in the axial direction. Therefore, when compared with construction in which the rotary-shaft unit is a single rotary shaft, it is easy to plan and design the relationship (gain) between the torque and the amount of relative displacement in the direction of rotation of the first and second encoders.

In one form of the present invention, the first and second encoders can be arranged so as to be concentrated at one end section of the rotary-shaft unit, or more specifically, at one end section of the input shaft, which is the first rotary shaft, or the other end section of the output shaft, which is the second rotary shaft. Therefore, the sensor unit can be supported by a portion of the housing that is near the end section having high rigidity, and thus it is possible to maintain precision of torque measurement by the sensor unit regardless of deformation of the housing due to gear reaction forces in the radial direction that act on the first and second gears (input gear and output gear) when torque is being transmitted.

Furthermore, in one form of the present invention, only one sensor is used, so only one harness that leads from the sensor unit needs to be used, and that harness can be easily installed. Moreover, only one support and fastening section needs to be provided in the housing for the sensor unit, so processing the housing can be performed easily.

BRIEF DESCRIPTION OF DRAWINGS

FIG. 41A is a schematic drawing illustrating the positional relationship between the magnetic poles of the first detected section and second detected section and the detecting section of the sensor in the area where the sensor unit faces the encoders in the rotation transmission device illustrated in FIG. 39 in a state in which torque is not transmitted; and FIG. 41B illustrates that positional relationship in a state in which torque is transmitted;

FIG. 42 is a graph illustrating the output signal from the sensor unit of the rotation transmission device of the twelfth example of an embodiment of the present invention;

MODES FOR CARRYING OUT INVENTION

[First Example]

Figure 1:
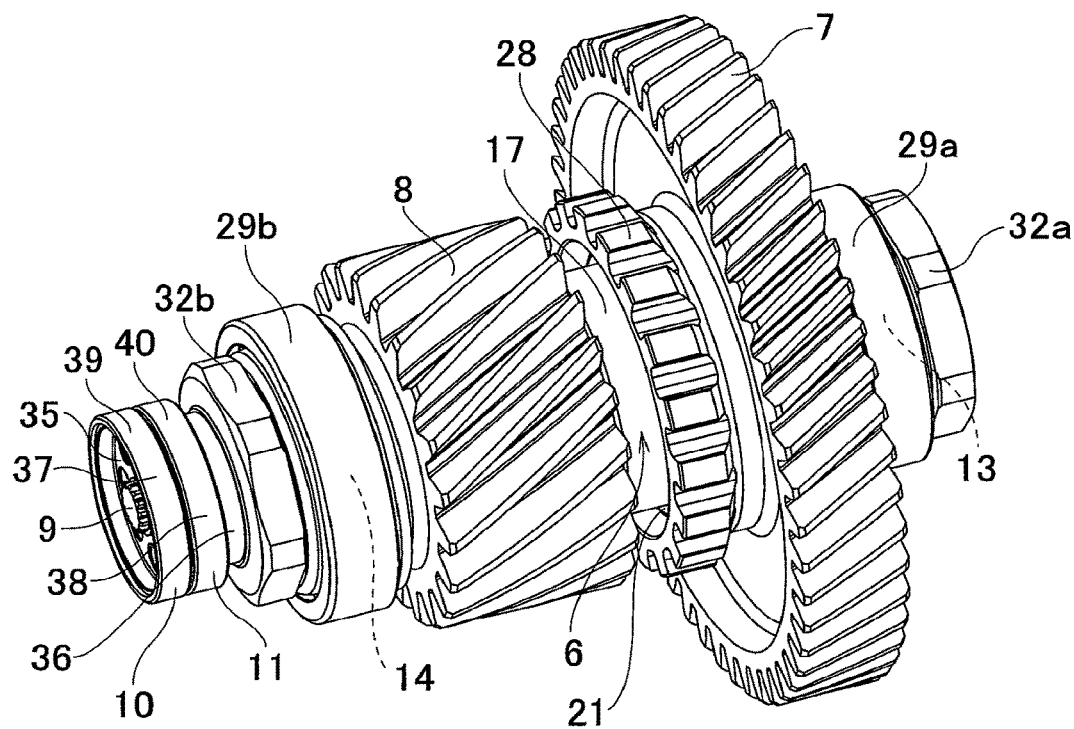
FIG. 1 is a perspective view illustrating a rotation transmission device of a first example of an embodiment of the present invention.
Figure 2:
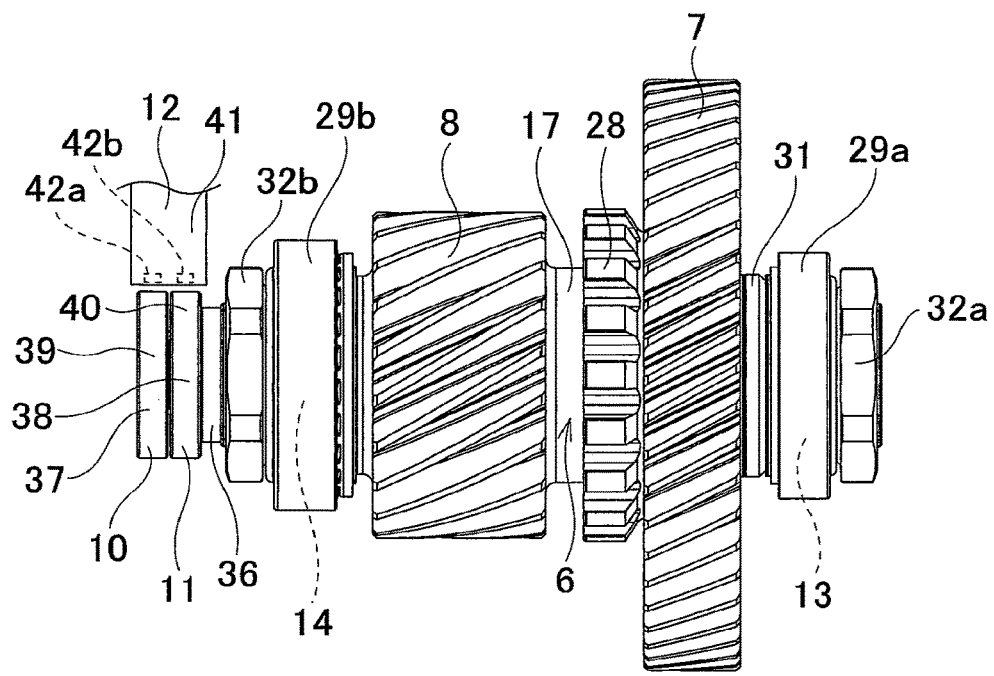
FIG. 2 is a side view of the rotation transmission device illustrated in FIG. 1.
Figure 3:
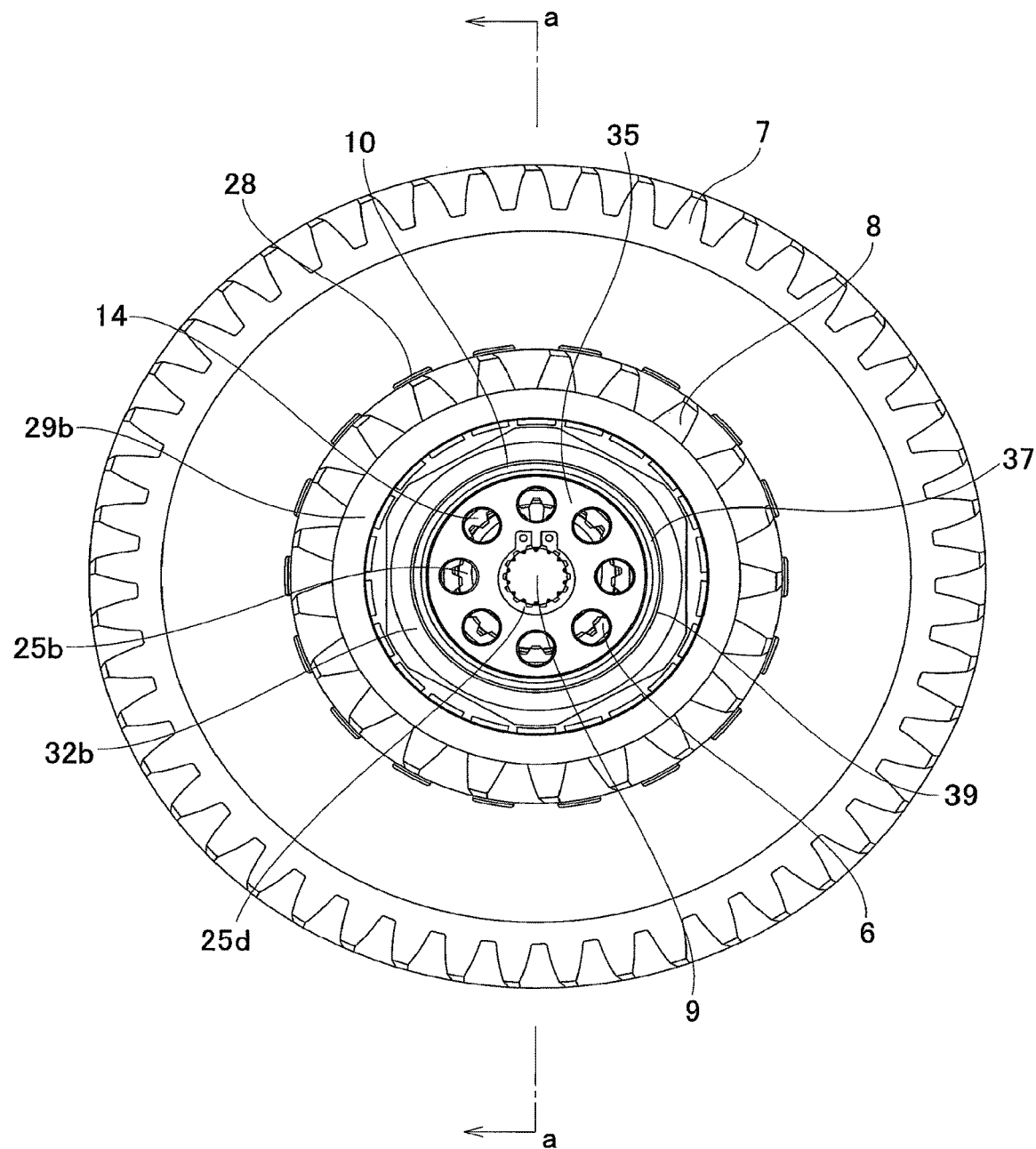
FIG. 3 is an end view of the other end side of the rotation transmission device illustrated in FIG. 1.
Figure 4:
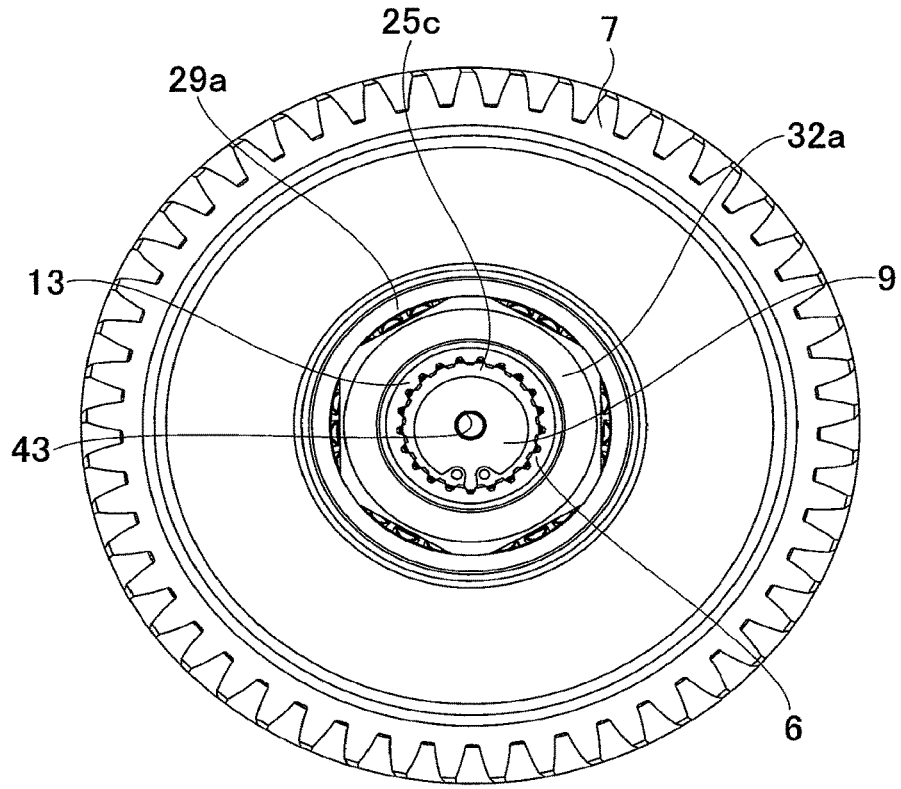
FIG. 4 is an end view of the one end side of the rotation transmission device illustrated in FIG. 1.
Figure 5:
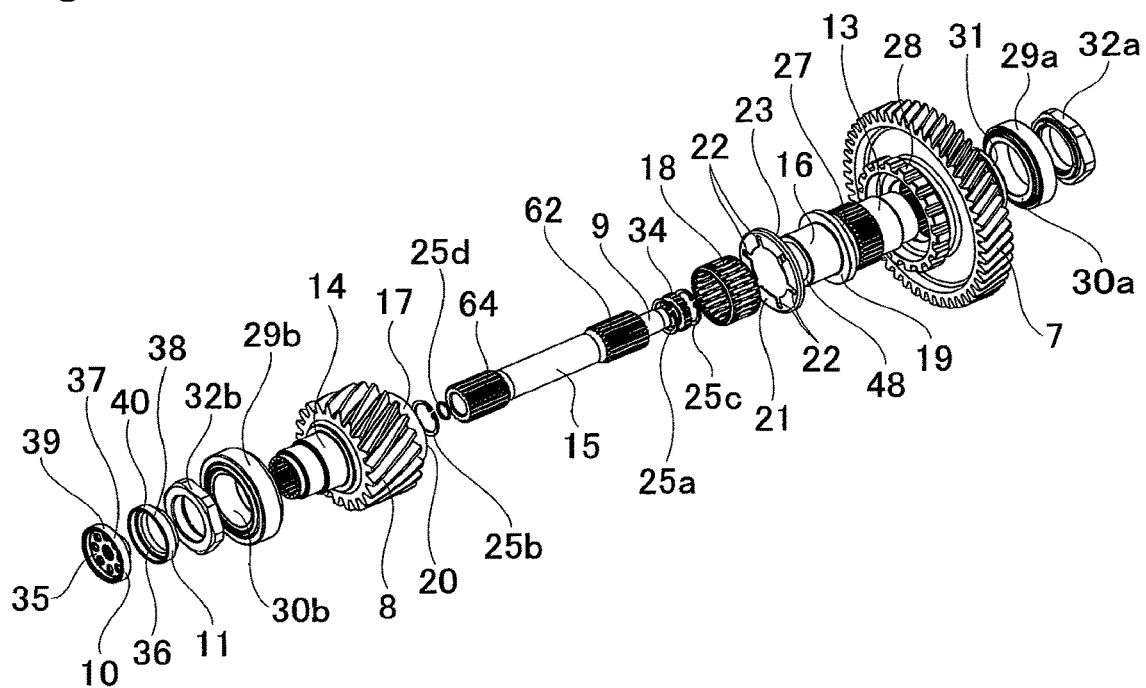
FIG. 5 is an exploded perspective view of the rotation transmission device illustrated in FIG. 1.
Figure 6:
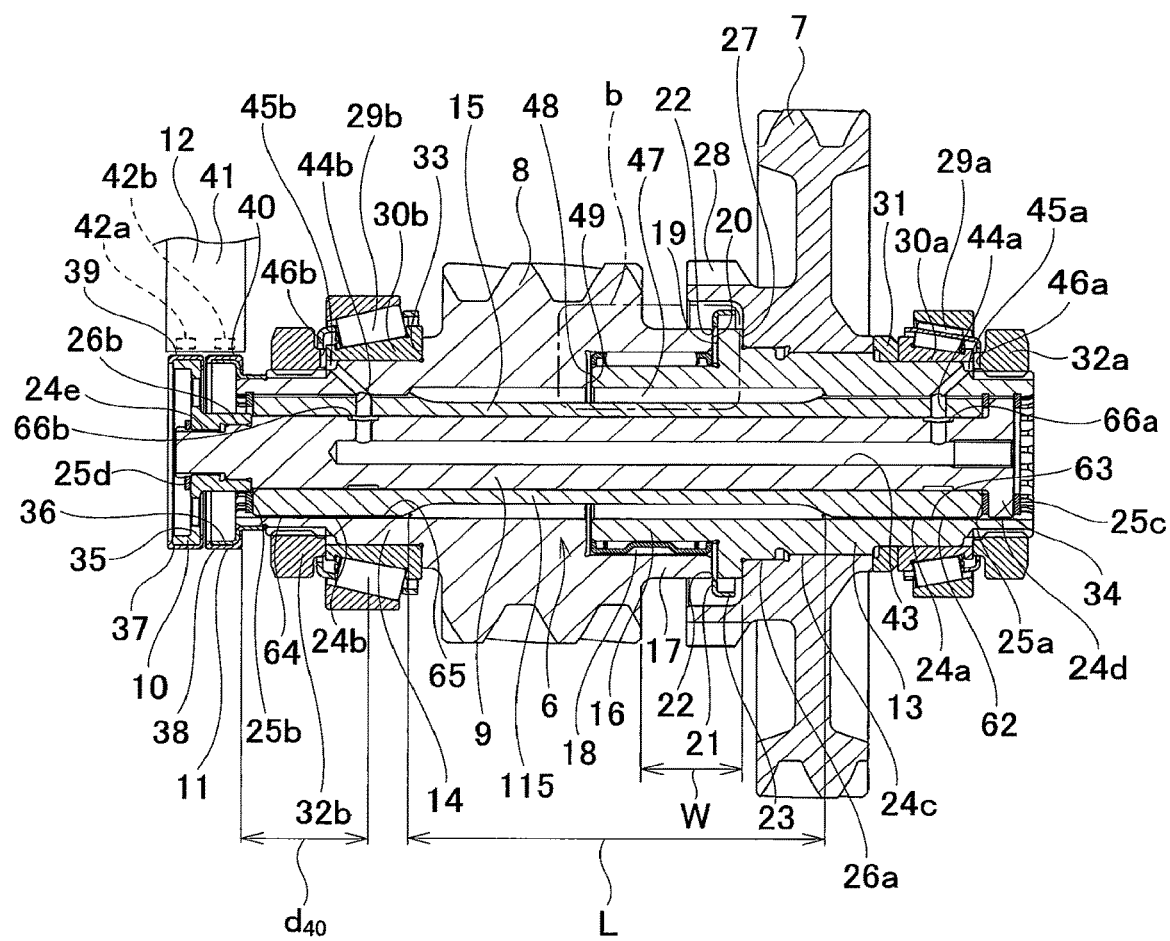
FIG. 6 is a cross-sectional view of section a-a in FIG. 3 of the rotation transmission device illustrated in FIG. 1.
Figure 7:
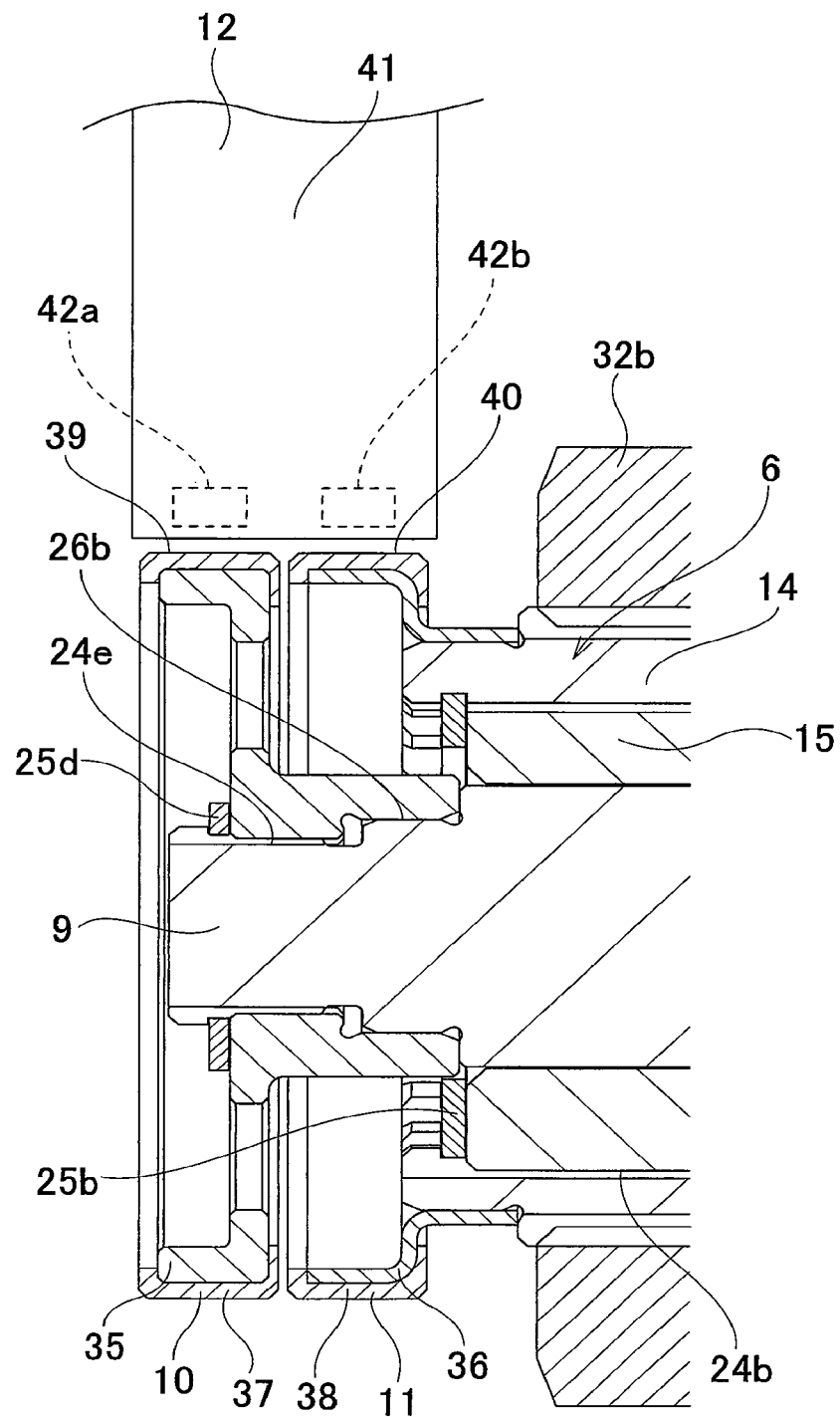
FIG. 7 is an enlarged view of the other end section of the rotation transmission device illustrated in FIG. 1.
Figure 8:
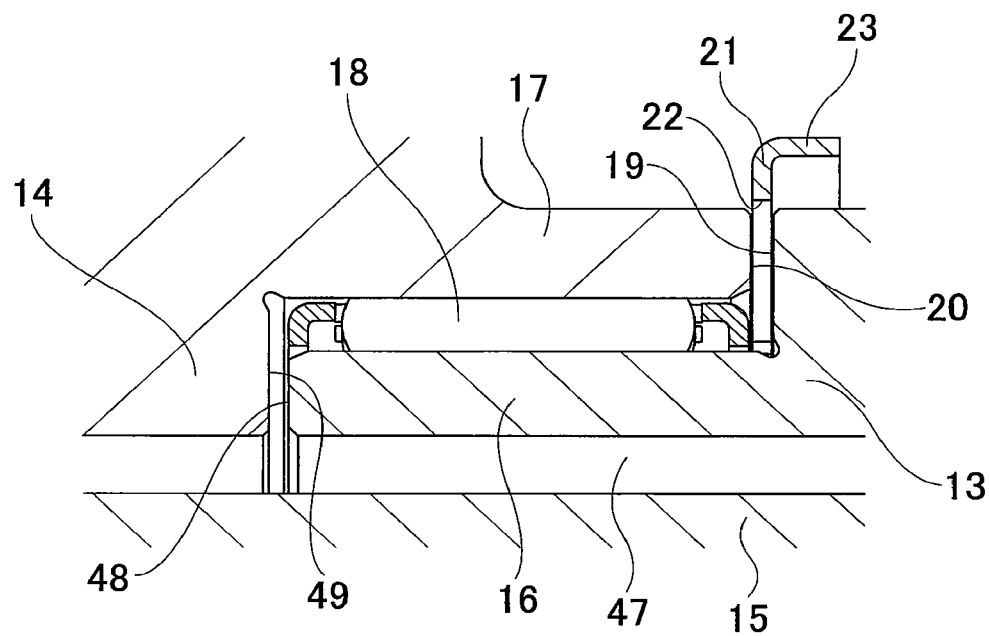
FIG. 8 is an enlarged view of area b in FIG. 6 (where the end sections of the input shaft and output shaft are combined together)

FIG. 1 to FIG. 12 illustrate a first example of an embodiment of the present invention. The rotation transmission device of this example is incorporated and used with a counter shaft and counter gear portion of an automatic transmission for an automobile such as a front-wheel drive automobile or a four-wheel drive automobile that uses the same motor and transmission arrangement as a front-wheel drive automobile in which a so-called transverse engine is mounted. The rotation transmission device of this example includes: a rotary-shaft unit 6 that functions as a counter shaft; a first gear, which is an input gear 7, and a second gear, which is an output gear 8, that function as counter gears; a coupling shaft 9, a first encoder 10, a second encoder 11 and one sensor unit 12.

The rotary-shaft unit 6 includes: an input shaft 13, which is a hollow first rotary shaft; an output shaft 14, which is a hollow second rotary shaft; and a hollow torsion bar 15. Both the input shaft 13 and the output shaft 14 are formed into a cylindrical shape using steel, are arranged concentric with each other, and the end sections of the input shaft 13 and the output shaft 14 (the other end section of the input shaft 13 and the one end section of the output shaft 14) are combined together so as to be able to rotate relative to each other. In order to simplify the explanation, the side of the rotary-shaft unit 6 where the input gear 7 and input shaft 13 are located is called the one end side, and the side where the output gear 8 and the output shaft 14 are located is cased the other end side. In this example, in order to combine the end sections of the input shaft 13 and the output shaft 14 together so as to be able to rotate relative to each other, an input-side combination cylindrical section 16, which is a first combination cylindrical section, is provided on the other end section of the input shaft 13, and an output-side combination cylindrical section 17, having an inner diameter that is larger than the diameter of the input-side combination cylindrical section 16, is provided on the one end section of the output shaft 14. The input-side combination cylindrical section 16 is inserted into the inner-diameter side of the output-side combination cylindrical section 17. Moreover, a radial needle bearing 18 is provided between the cylindrical shaped circumferential surfaces of the input-side and output side combination cylindrical sections 16, 17 that face each other. Furthermore, a circular disk-shaped thrust washer 21, which is a thrust sliding bearing, is held between a stepped surface 19 that is provided on the base end section of the outer-circumferential surface of the input-side combination cylindrical section 16 and the tip-end surface 20 of the output-side combination cylindrical section 17. By using this kind of construction, the end sections of the input shaft 13 and the output shaft 14 are combined together in a state so that relative rotation is possible, and so that displacement in the axial direction toward each other is prevented.

In this example, in the thrust washer 21, as illustrated in detail in FIG. 11A, slits 22 that are long in the radial direction are formed by removing material at plural locations that are uniformly spaced in the circumferential direction of a circular disk-shaped main portion so as to be open on the inner-circumferential edge of the main portion. Moreover, a reinforcing cylindrical section 23 that is bent in the radial direction at a right angle from the outer-circumferential edge of the main portion of the thrust washer 21 is formed around the entire outer-circumferential edge. The thrust washer 21 is fitted around the base end section of the input-side combination cylindrical section 16 with the edge of the tip end of the reinforcing cylindrical section 23 facing the one end side of the input shaft 13 so that there is no large looseness in the radial direction. The middle section in the radial direction of the main portion of the thrust washer 21 is held between the stepped surface 19 and the tip-end surface 20. In this state, the slits 22 connect a pair of spaces that exist on both sides in the radial direction of the portion between the stepped surface 19 and the tip-end surface 20 with each other. In other words, in order to achieve this kind of connected state, the diameter of the inscribed circle of the slits 22 (the inner diameter of the main portion of the thrust washer 21) is made to be smaller than the diameter of the inner-circumferential edge of the tip-end surface 20, and the diameter of the circumscribed circle of the slits 22 is made to be larger than the diameter of the outer-circumferential edge of the tip-end surface 20.

The torsion bar 15 is formed into a cylindrical shape using a steel alloy such as carbon steel, and is concentrically arranged on the inner-diameter side of the input shaft 13 and output shaft 14. One end section of the torsion bar 15 is connected to the input shaft 13 so that relative rotation is not possible, and the other end section is connected to the output shaft 14 so that relative rotation is not possible. In this example, in order to achieve this kind of connected state, the outer-diameter dimensions of both end sections of the torsion bar 15 are made to be a little less than the outer-diameter dimension of the middle section of the torsion bar 15, and the outer-circumferential surfaces of both end sections of the torsion bar 15 fit with the portion near one end of the inner-circumferential surface of the input shaft 13 and with the portion near the other end of the inner-circumferential surface of the output shaft 14 so that relative rotation is not possible. More specifically, an involute spline connection 24a is formed by fitting a first male involute spline section 62, which is a first male spline section that is provided on the outer-circumferential surface of one end section of the torsion bar 15, with a first female involute spline section 63, which is a first female spline section that is provided on the inner-circumferential surface of the one end section of the input shaft 13 so that there is no looseness in the circumferential direction. Moreover, an involute spline connection 24b is formed by fitting a second male involute spline section 64, which is a second male spline section that is provided on the outer-circumferential surface of the other end section of the torsion bar 15, with a second female involute spline section 65, which is a second female spline section that is provided on the inner-circumferential surface of the other end section of the input shaft 14 so that there is no looseness in the circumferential direction. It is also possible to use other construction for preventing rotation such as a key connection as the connections between the torsion bar 15 and the input shaft 13 and output shaft 14. By holding the torsion bar 15 on both sides in the axial direction by a pair of retaining rings 25a, 25b that are fastened around the inner-circumferential surfaces of the input shaft 13 and output shaft 14, the torsion bar 15 is prevented from displacing in the axial direction. In this example, the dimension L of the portion in the middle section in the axial direction of the torsion bar 15 that undergoes elastic torsional deformation when torque is transmitted (portion that is between the involute spline connections 24a, 24b) is made to be larger than the space W in the axial direction between the input gear 7 and output gear 8 (L>W) (in the example in the figures, L is a little over 4 times W).

The input gear 7 is a helical gear that is formed using a steel alloy such as carbon steel, and is fastened around the outside of the middle section of the input shaft 13. The connection between the inner-circumferential surface of the input gear 7 and the outer-circumferential surface of the input shaft 13 is formed by arranging a cylindrical connecting section 26a that is for maintaining concentricity (connecting section that is formed by pressure fitting together the cylindrical surface sections of the inner-circumferential surface of the input gear 7 and outer-circumferential surface of the input shaft 13) and an involute spline connection 24c that is for preventing relative rotation so as to be adjacent to each other in the axial direction. Moreover, positioning the input gear 7 in the axial direction with respect to the input shaft 13 is accomplished by bringing the inner-circumferential portion of the other end side of the input gear 7 in contact with a stepped surface 27 that is formed on a portion of the middle section of the outer-circumferential surface of the input shaft 13 that is near the other end. In this example, a parking-lock gear 28 is integrally formed with the inner-circumferential portion of the side surface of the other end side of the input gear 7. When the parking lock is engaged, the tip-end section of a locking member (not illustrated in the figures) engages with a portion in the circumferential direction of the outer-circumferential surface of the parking-lock gear 28, which makes rotation of the rotary-shaft unit 6 impossible. On the other hand, the output gear 8 is also a helical gear that is formed using a steel alloy such as carbon steel, and is integrally formed with the output shaft 14 in a portion near one end of the middle section of the outer-circumferential surface of the output shaft 14. It is also possible to separately form the output gear 8 and fasten the output gear 8 around the outside of the output shaft 14. In this example, when the rotary-shaft unit 6 is rotating in the forward direction (when the automobile is advancing in a forward direction), the torque that is inputted to the input shaft 13 from the input gear 7 is transmitted to the output shaft 14 by way of the torsion bar 15 and outputted from the output gear 8. When this happens, the middle section in the axial direction of the torsion bar 15 undergoes elastic torsional deformation by an amount that corresponds to the size of the torque.

The rotary-shaft unit 6 is supported so as to be able to freely rotate with respect to a housing (transmission case) that is not illustrated in the figures by a pair of conical roller bearings 29a, 29b that are arranged such that the contact angles are opposite each other. In this example, in order to install these conical roller bearings 29a, 29b in the rotary-shaft unit 6, an inner ring 30a of one of the conical roller bearings 29a is fitted around a portion near one end of the input shaft 13. Moreover, a spacer 31 is held between the end surface on the large-diameter side of the inner ring 30a and the side surface of the one end side of the input gear 7. Furthermore, the inner ring 30a and the input gear 7 are joined and fastened to the input shaft 13 by pressing the end surface on the small-diameter side of the inner ring 30 with a nut 32a that is tightly screwed onto and fastened to the one end section of the outer-circumferential surface of the input shaft 13. On the other hand, an inner ring 30b of the other conical roller bearing 29b is fitted around the outside of a portion near the other end of the output shaft 14. Moreover, the end surface on the large-diameter side of the inner ring 30b is brought into contact with a stepped surface 33 that is formed on a portion near the other end of the output shaft 14. Furthermore, the inner ring 30b is fastened to and supported by the output shaft 14 by pressing the end surface on the small-diameter side of the inner ring 30b with a nut 32b that is tightly screwed onto and fastened to the other end section of the outer-circumferential surface of the output shaft 14.

In this example, the direction of inclination of the teeth of the input gear 7 and output gear 8, which are both helical gears, is regulated so that when these gears 7, 8 are rotating in the forward direction (when the rotary-shaft unit 6 is rotating in the forward direction), the gear reaction forces in the axial direction that act on these gears 7, 8 are in directions toward each other (press against each other). As a result, when these gears 7, 8 are rotating in the forward direction, the gear reaction forces in that axial direction that act on the input gear 7 and output gear 8 are able to at least partially cancel each other out. With this kind of construction, the axial loads that are applied to the conical roller bearings 29a, 29b when these gears 7, 8 are rotating in the forward direction are suppressed, and the friction loss (dynamic torque) of these bearings 29a, 29b is suppressed by that amount.

The coupling shaft 9 is concentrically arranged on the inner-diameter side of the torsion bar 15. When one end section of the coupling shaft 9 is connected to the input shaft 13 so that relative rotation is not possible, the other end section of the coupling shaft 9 protrudes from an opening on the other end side of the output shaft 14. In order to connect the one end section of the coupling shaft 9 to the input shaft 13 so that relative rotation is not possible, an outward-facing flange-shaped rim section 34 is formed around a portion of the outer-circumferential surface of the one end section of the coupling shaft 9 that protrudes from the opening on the one end side of the torsion bar 15, and by forming an involute spline connection 24d between the outer-circumferential surface of the rim section 34 and the inner-circumferential surface of the input shaft 13, the rim section 34 and the input shaft 13 fit together so that relative rotation is not possible. For this connection, it is also possible to use other construction for preventing rotation such as a key connection. Furthermore, by holding the rim section 34 on both sides in the axial direction using the retaining ring 25a that is fastened around the inner-circumferential surface of the one end section of the input shaft 13 and another retaining ring 25c, the coupling shaft 9 is prevented from displacement in the axial direction. The first male involute spline section 62 of the involute spline connection 24a that is provided on the one end section of the torsion bar 15, and a male involute spline section of an involute spline connection 24d that is provided on the rim section 34 of the coupling shaft 9 are provided so as to be connected together on the one end section of the inner-circumferential surface of the input shaft 13, and the specifications of each are the same. In other words, the involute spline connections 24a, 24d share the first involute spline section 63 that is provided around the inner-circumferential surface of the one end section of the input shaft 13 as the female involute spline sections of these involute spline connections 24a, 24d.

The first encoder 10 is concentrically fastened around the outside of the other end section of the coupling shaft 9. In other words, the first encoder 10 is fastened to and supported by the input shaft 13 via the coupling shaft 9. Therefore, the first encoder 10 is able to rotate in synchronization with the input shaft 13. Moreover, the second encoder 11 is concentrically fastened around the outside of the other end section of the output shaft 14. Therefore, the second encoder 11 is able to rotate in synchronization with the output shaft 14. The first encoder 10 includes a circular ring-shaped metal core 35 that is made of a magnetic metal and that is fastened around the outside of the other end section of the coupling shaft 9, and a cylindrical permanent magnet 37 that is fastened around the outer-circumferential surface of a cylindrical section that is located on the outer-circumferential section of the metal core 35. The second encoder 11 also includes a circular ring-shaped metal core 36 that is made of a magnetic metal and that is fastened around the outside of the other end section of the output shaft 14, and a cylindrical permanent magnet 38 that is fastened around the outer-circumferential surface of a cylindrical section that is located on the outer-circumferential section of the metal core 36.

Figure 9:
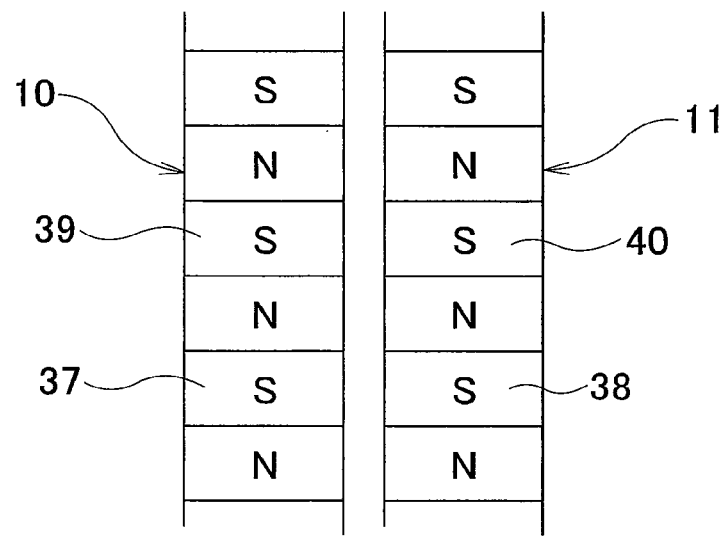
FIG. 9 is a view as seen from the outer-diameter side of part in the circumferential direction of the first detected section and second detected section of the encoder of the rotation transmission device illustrated in FIG. 1.

The outer-circumferential surface of the permanent magnet 37 of the first encoder 10 functions as a first detected section 39, and the outer-circumferential surface of the permanent magnet 38 of the second encoder 11 functions as a second detected section 40. The first and second detected sections 39, 40 have the same diameter as each other, are concentric with each other, and are arranged so as to be closely adjacent to each other in the axial direction; for example, are separated in the axial direction by 10 mm or less, and preferably 5 mm or less. Moreover, as illustrated in FIG. 9, the S poles and N poles of the detected sections 39, 40 are arranged on these detected sections 39, 40 so as to alternate at a uniform pitch in the circumferential direction. The total number of magnetic poles (S poles and N poles) is the same for both of these detected sections 39, 40. In this example, when torque is not being transmitted, or in other words, when the torsion bar 15 is not in a state of elastic torsional deformation, the detected sections 39, 40 have not rotated relative to each other in the direction of rotation, and the phases in the circumferential direction of the magnetic poles of the detected sections 39, 40 coincide with each other. In other words, the poles are arranged so that poles of these detected sections 39, 40 that are the same as each other are adjacent to each other in the axial direction. In this example, the fitted section where the inner-circumferential surface of the metal core 35 of the first encoder 10 fits with the outer-circumferential surface of the other end section of the coupling shaft 9 is formed by arranging a cylindrical fitting section 26b for maintaining concentricity, and an involute spline connection 24e for preventing relative rotation so as to be adjacent in the axial direction. Furthermore, the metal core 35 is prevented from coming out by a retaining ring 25d that is fastened around the outer-circumferential surface of the other end section of the coupling shaft 9. On the other hand, the metal core 36 of the second encoder 11 is fastened around the outside of the other end section of the output shaft 14 by an interference fit.

Figure 10:
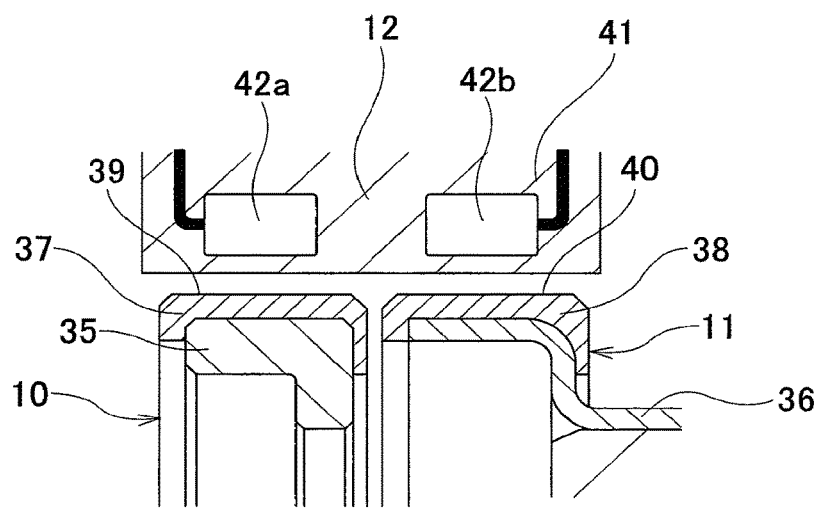
FIG. 10 is an enlarged cross-sectional view of the area of the rotation transmission device illustrated in FIG. 1 where the sensor unit faces the encoders.
Figure 11:
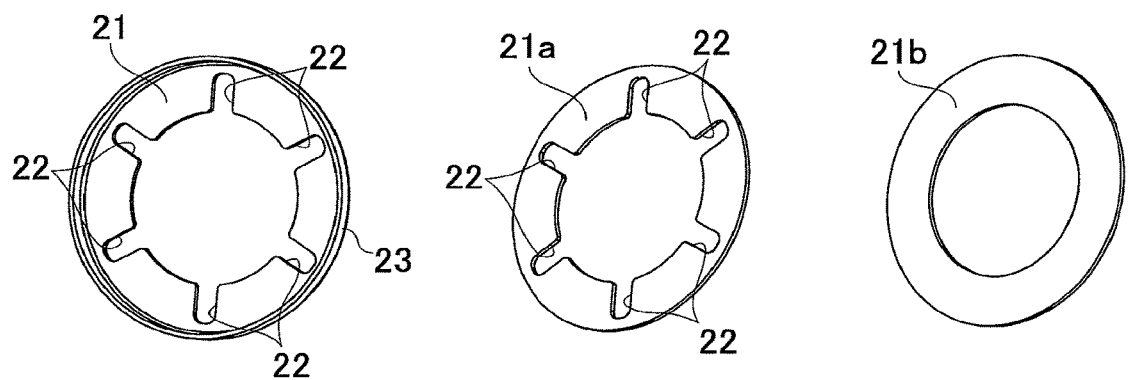
FIG. 11A to FIG. 11C are perspective views that illustrate three examples of a thrust washer that can be applied in the rotation transmission device illustrated in FIG. 1.
Figure 12:
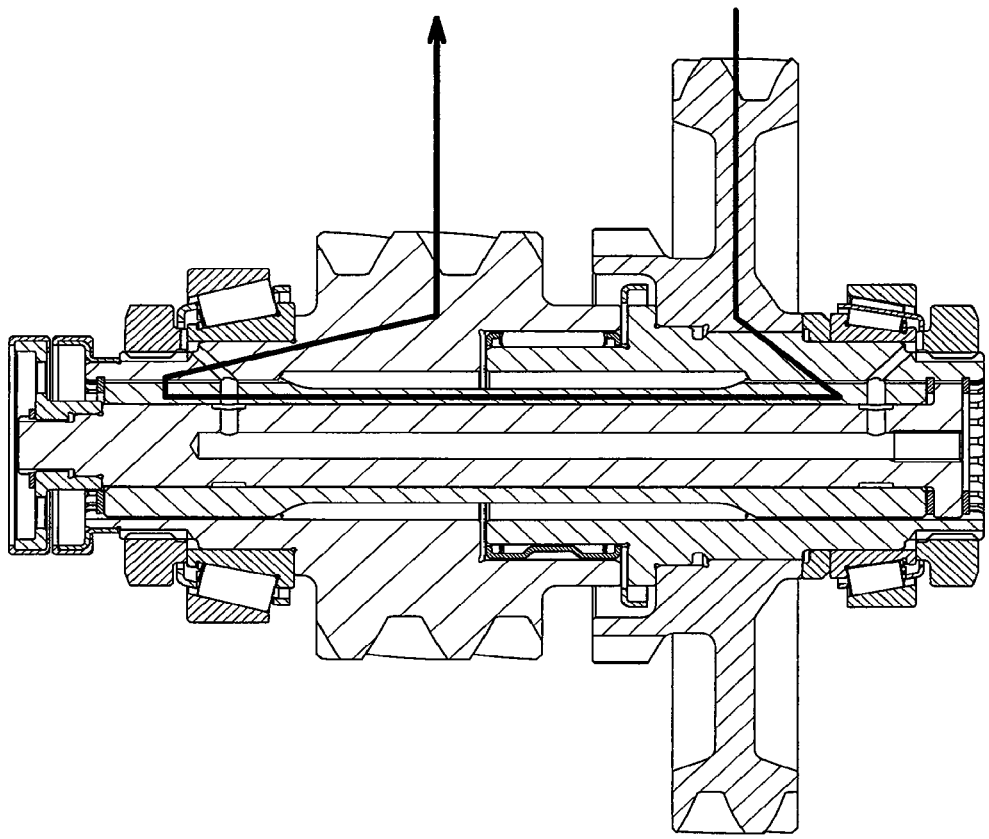
FIG. 12 is a cross-sectional view for explaining the torque transmission path in the rotation transmission device illustrated in FIG. 1.

The sensor unit 12 includes a holder 41 made of a synthetic resin, and a first sensor 42a and second sensor 42b that are embedded in the tip-end section of the holder 41. A magnetic detecting element such as a Hall element, Hall IC, MR element, GNR element or the like is embedded in the detecting sections of the first and second sensors 42a, 42b. The sensor unit 12 is supported by a housing so that the detecting section of the first sensor 42a closely faces the first detected section 39, and the detecting section of the second sensor 42b closely faces the second detected section 40. In this example, as illustrated in FIG. 10, the first and second sensors 42a, 42b are arranged in opposite directions, and the detecting sections of the first and second sensors 42a, 42b face the same position in the circumferential direction of detected sections 39, 40. As a result, when the transmitted torque is in a rotated state of zero, the phase difference between the output signals of the sensors 42a, 42b is 180 degrees (the phase difference ratio is 0.5).

Moreover, in this example, an oil inlet passage 43 that is open on only the one end surface of the coupling shaft 9 is provided in the center section in the radial direction of the coupling shaft 9. Furthermore, oil passages 44a, 44b are provided in portions near both ends of the coupling shaft 9, torsion bar 15, input shaft 15 and output shaft 14. These oil passages 44a, 44b connect the portions near both ends of the oil inlet passage 43 with minute ring-shaped spaces 45a, 45b that are located on the inner-diameter side of the small-diameter end sections of the inner rings 30a, 30b of the conical roller bearings 29a, 29b. Furthermore, oil grooves 46a, 46b that extend in the radial direction are formed at one location or plural locations in the circumferential direction of the tip-end surfaces of the nuts 32a, 32b. With this kind of construction, lubrication oil that is introduced from the opening on the one end section of the oil inlet passage 43 can pass through the oil passages 44a, 44b, ring-shaped spaces 45a, 45b and oil grooves 46a, 46b and be supplied to the inside of the conical roller bearings 29a, 29b.

In this example, part of the lubrication oil that is fed into the oil passages 44a, 44b passes from the middle sections of these oil passages 44a, 44b through spaces that exist in the involute spline connections 24a, 24b, and then fed to the outer-circumferential surface of the middle section of the torsion bar 15 and to the inside of a cylindrical space 47 that exists between the inner-circumferential surfaces of the middle sections of input shaft 13 and output shaft 14. Then, the lubrication oil that is fed inside the cylindrical space 47 passes through the space that exists between the tip-end surface 48 of the input-side combination cylindrical section 16 and a stepped surface 49 that exists at the base-end section of the inner-circumferential surface of the output-side combination cylindrical section 17, and is supplied to the area where the radial needle bearing 18 is installed and the area where the thrust washer 21 is held so as to lubricate these portions. The lubrication oil that reaches the area where the thrust washer 21 is held provides lubrication to this area where the thrust washer 21 is held, and also smoothly passes through this area where the thrust washer 21 is held by passing through the plural slits 22 that are provided in the thrust waster 21. As a result, the supply of lubrication oil to the area where the radial needle bearing 18 is installed and the area where the thrust washer 21 is held is performed efficiently, and the lubricated state of the area where the radial needle bearing 18 is installed and the area where the thrust washer 21 is held becomes good.

Instead of the thrust washer 21 that is illustrated in FIG. 11A, it is also possible to use a thrust washer 21a such as illustrated in FIG. 11B in which the reinforcing cylindrical section on the outer circumference is omitted, or a simple circular disk-shaped thrust washer 21 such as illustrated in FIG. 11C in which the reinforcing cylindrical section on the outer circumference and the plural slits are omitted. However, as explained above, from the aspect of improving the lubricated state of the area where the radial needle bearing is installed and the area where the thrust washer is held, preferably a thrust washer 21, 21a having slits 22 such as illustrated in FIG. 11A and FIG. 11B is preferred, and furthermore, from the aspect of maintaining the strength of the outer-circumferential section of the thrust washer (particularly the peripheral edge of the slits 22), using a thrust washer 21 having a reinforcing cylindrical section 23 as illustrated in FIG. 11A is preferred.

In this example, lubrication oil is also fed from the center section of the oil passages 44a, 44b into the inside of a minute space that exists between the inner-circumferential surface of the torsion bar 15 and the outer-circumferential surface of the coupling shaft 9 (cylindrical space having a thickness in the radial direction of about 0.2 mm). In order that feeding lubrication oil to the inside of this kind of minute space is performed smoothly, concave grooves 66a, 66b are provided around the entire circumference of the portion of the outer-circumferential surface of the coupling shaft 9 that is aligned in the axial direction with the oil passages 44a, 44b. During operation, the lubrication oil that is filled into a minute space that exists between the inner-circumferential surface of the torsion bar 15 and the outer-circumferential surface of the coupling shaft 9 functions as a film damper that dampens small vibration of the coupling shaft 9.

In the case of the rotation transmission device with a torque measurement device of this example, the output signals from the first and second sensors 42a, 42b of the sensor unit 12 change periodically as the first and second encoders 10, 11 rotate together with the input shaft 13 and output shaft 14 of the rotary-shaft unit 6. Here, the frequency and period of this change are values that correspond to the rotational speed of the rotary-shaft unit 6. Therefore, by investigating beforehand the relationship between the frequency or period of the output signal from the first and second sensors 42a, 42b and the rotational speed, it is possible to find the rotational speed based on the frequency or period of these output signals. Moreover, in this example, when the rotary-shaft unit 6 transmits torque between the input gear 7 and output gear 8, the input gear 7 (input shaft 13, first encoder 10) and the output gear 8 (output shaft 14, second encoder 11) undergo relative displacement in the direction of rotation as the middle section in the axial direction of the torsion bar 15 undergoes elastic torsional deformation. As a result of the relative displacement in the direction of rotation of the first and second encoders 10, 11, the phase difference ratio (=phase difference/1 period)

between the output signals from the first and second sensors 42a, 42b changes. Here, this phase difference ratio is a value that corresponds to the torque that is transmitted by the rotation transmission device. Therefore, by investigating beforehand the relationship between the phase difference ratio of the output signals from the first and second sensors 42a, 42b and the torque of the rotation transmission device, it is possible to find the torque that is transmitted by the rotation transmission device based on this phase difference ratio.

In this example, the shaft is divided into two, an input shaft 13 and an output shaft 14; the input gear 7 is fastened around the middle section in the axial direction of the outer-circumferential surface of the input shaft 13, and the output gear 8 is fastened around the middle section in the axial direction of the outer-circumferential surface of the output shaft 14; and both the input shaft 13 and output shaft 14 have hollow construction. Moreover, a torsion bar 15 that is connected to the input shaft 13 and the output shaft 14 so that both end sections are not capable of relative rotation is arranged on the inner-diameter side of the input shaft 13 and output shaft 14, and furthermore, a coupling shaft 9 that supports a first encoder 10 on the other end section is arranged on the inner-diameter side of the torsion bar 15. In other words, the rotation transmission device with a torque measurement device has a triple structure that includes an input shaft 13 and output shaft 14, a torsion bar 15 and a coupling shaft 9. In the case of the rotation transmission device of this example having this kind of construction, torque that is inputted from the input gear 7 is transmitted to the output gear 8 along a path such as illustrated by the arrow in FIG. 12 (input gear 7→involute spline connection 24c→input shaft 13→involute spline connection 24a→torsion bar 15→involute spline connection 24b→output shaft 14→output gear 8).

Therefore, in this example, the dimension L in the axial direction of the middle section in the axial direction of the torsion bar 15 is sufficiently longer than the space W between the input gear 7 and the output gear 8 (L>W). Therefore, it is possible to sufficiently maintain the amount of elastic torsional deformation of the middle section in the axial direction of the torsion bar 15 that occurs when transmitting torque. As a result, differing from construction in which the rotary-shaft unit 6 has only a single rotary shaft, it is possible to sufficiently increase the resolution of torque measurement by sufficiently increasing the amount of relative displacement in the direction of rotation between the input gear 7 (input shaft 13, first encoder 10) and the output gear 8 (output shaft 14, second encoder 11) that occurs during the transmission of torque regardless of whether the space W in the axial direction between the input gear 7 and the output gear 8 is large or small. Moreover, in this example, by adjusting the dimension in the radial direction and dimension in the axial direction of the middle section in the axial direction of the torsion bar 15 during the design stage, it is possible to easily adjust the torsional rigidity of this middle section in the axial direction. Therefore, when compared with construction in which the rotary-shaft unit 6 has only a single rotary shaft, the relationship between the torque that is transmitted by the rotation transmission device and the amount of relative displacement in the direction of rotation of the first and second encoders 10, 11 (gain) can be easily designed to obtain a desired value.

Moreover, in this example, the sensor unit 12 is a single unit, so it is possible to run only one harness (not illustrated in the figures) from the sensor unit 12, so it is possible to easily install the required harness. In addition, only one area inside the housing is needed for supporting and fastening the sensor unit 12, so processing of the housing is simplified.

Furthermore, in this example, when transmitting torque, it is possible to maintain the precision of torque measurement by the sensor unit 12 regardless of deformation (elastic deformation) of the housing due to gear reaction forces in the radial direction that act on the input gear 7 and output gear 8. In other words, in this example, the first and second encoders 10, 11 are arranged so as to be concentrated on the other end side of the output shaft 14, so the sensor unit 12 can be supported by a portion of the housing that is near the end section with high rigidity. Therefore, even when the housing is deformed due to gear reaction forces, contact between the sensor unit 12 and the first and second encoders 10, 11 is prevented. Consequently, it is possible to reduce the space between the first detected section 39 of the first encoder 10 and the detected section 40 of the second encoder 11, and to improve the precision of torque measurement.

Moreover, in this example, when transmitting torque, it is possible to prevent stress that is due to gear reaction forces in the radial direction that act on the input gear 7 and output gear 8 from becoming concentrated in the torsion bar 15. In other words, the rotary-shaft unit 6 is constructed by combining an input-side combination cylindrical section 16 of the input shaft 13 and an output-side combination cylindrical section 17 of the output shaft 14 together by way of a radial needle bearing 18 and a thrust washer 21, so gear reaction forces are mainly applied to the connection between the input-side combination cylindrical section 16 and the output-side combination cylindrical section 17, and supported by the radial needle bearing 18 and thrust washer 21. As a result, the gear reaction forces are prevented from becoming concentrated in the torsion bar 15.

In the rotation transmission device of this example, it is also possible to use construction in which the direction that the detected sections of the first and second encoders face the detecting sections of the pair of sensors of the sensor unit is changed from the radial direction to the axial direction. In that case, the detected sections of the first and second encoders are a pair of circular disk-shaped detected sections having radial dimensions that differ from each other, and these detected sections are arranged so as to be concentric with each other when facing in the same axial direction (overlap in the radial direction), and the detecting sections of the pair of sensors of the sensor unit that are arranged so as to be separated in the radial direction of the rotary-shaft unit are made to face these detected sections in the axial direction.

[Second Example]

Figure 13:
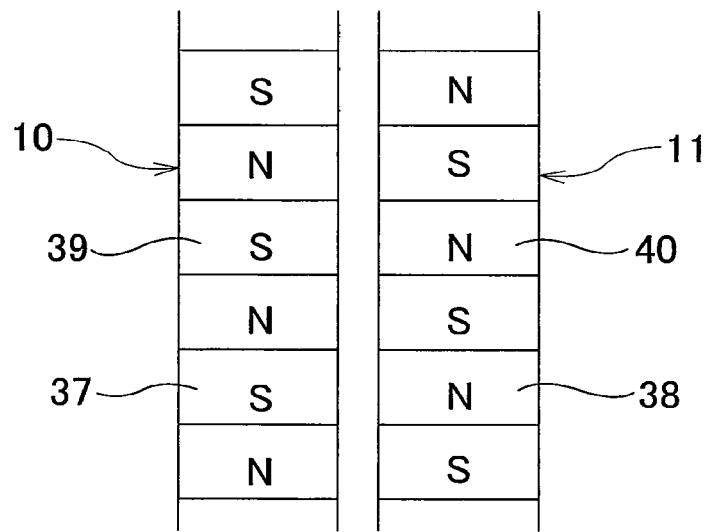
FIG. 13 is a view as seen from the outer-diameter side of the a portion in the circumferential direction of the first detected section and second detected section of the encoder in a rotation transmission device of a second example of an embodiment of the present invention.
Figure 14:
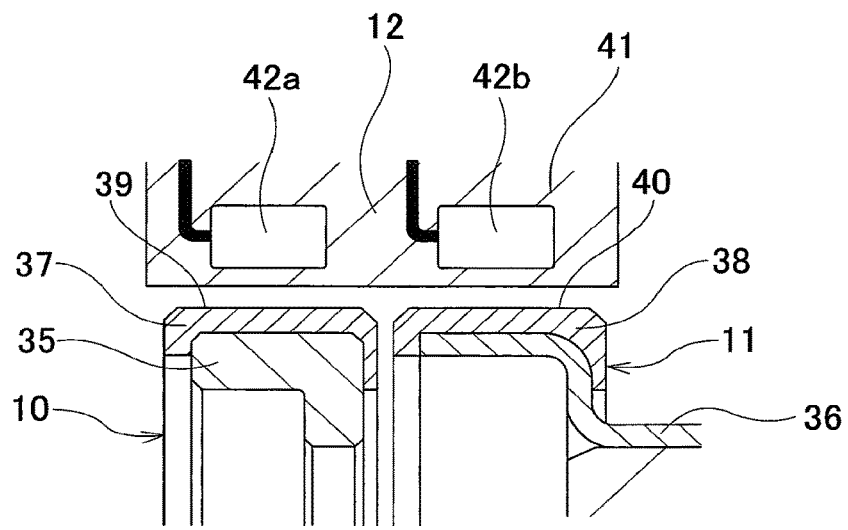
FIG. 14 is an enlarged cross-sectional view of the area where the sensor unit faces the encoders in the rotation transmission device of the second example of an embodiment of the present invention.

FIG. 13 and FIG. 14 illustrate a second example of an embodiment of the present invention. In this example, when torque is not being transmitted, the phases in the circumferential direction of the magnetic poles of the detected sections 39, 40 of the first and second encoders 10, 11 are shifted 180 degrees from each other. In other words, poles of these detected sections 39, 40 that are different from each other are arranged so as to be adjacent to each other in the axial direction. Moreover, when the pair of sensors 42a, 42b of the sensor unit 12 are arranged so that each faces in the same direction, the detecting sections of these sensors 42a, 42b face the same position in the circumferential direction of the detected sections 39, 40. As a result, when the transmitted torque is in a rotated state of zero, the phase difference between the output signals of the sensors 42a, 42b is 180 degrees (the phase difference ratio is 0.5).

In this example, in the state before installing the first and second encoders 10, 11 in the locations where the encoders 10, 11 will be used, and the end surfaces in the axial direction of the permanent magnets 37, 38 of these encoders 10, 11 that face each other are magnetically stuck together, and as a result, the phase in the circumferential direction of the magnetic poles of these encoders 10, 11 are shifted 180 degrees from each other. By installing these encoders 10, 11 in this state, a positional arrangement of the magnetic poles after installation such as illustrated in FIG. 13 is easily achieved. The other construction and functions are the same as in the first example of an embodiment.

[Third Example]

Figure 15:
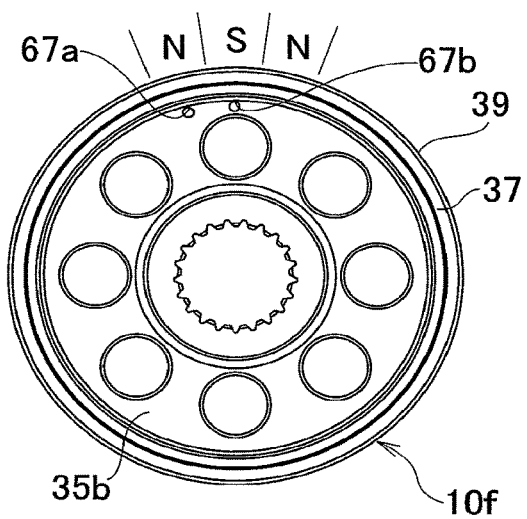
FIG. 15A is an end view of a first encoder.
FIG. 15B is an end view of a second encoder of the rotation transmission device of a third example of an embodiment of the present invention.
Figure 15:
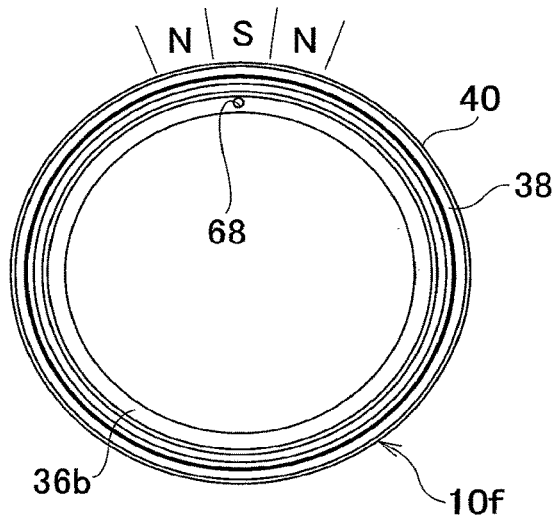
Figure 16:
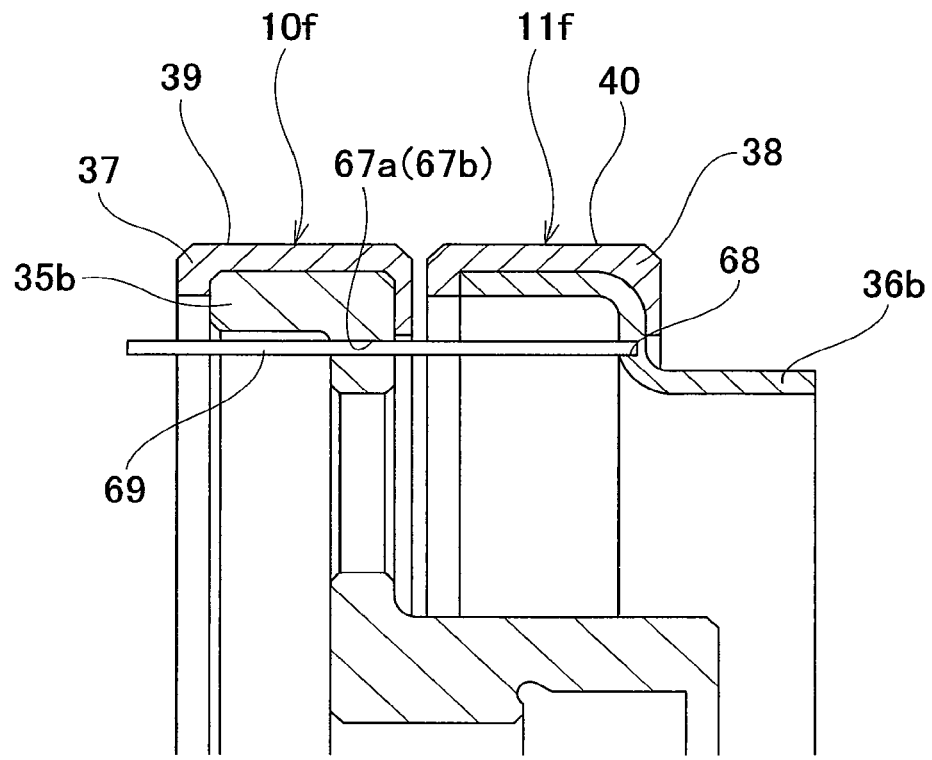
FIG. 16 is an enlarged cross-sectional view of the area where the sensor unit faces the encoders in the rotation transmission device of the third example of an embodiment of the present invention, and illustrates a state in which the first encoder and second encoder are joined by pins.

FIG. 15A, FIG. 15B and FIG. 16 illustrate a third example of an embodiment of the present invention. In this example, as illustrated in FIG. 15A, two through holes 67a, 67b, which are both regulating parts, are provided in the metal core 35b of the first encoder 10f and are separated in the circumferential direction. Moreover, as illustrated in FIG. 15B, one concave hole 68, which is a regulating part, is provided in the metal core 36b of the second encoder 11f. When the center axes of these encoders 10f, 11f coincide with each other, the positions in the radial direction of the through holes 67a, 67b and the convex hole 68 are the same as each other. Moreover, the pitch of these through holes 67a, 67b (distance in the circumferential direction between centers) is the same as the pitch of one magnetization (distance in the circumferential direction between centers of an S pole and N pole that are adjacent in the circumferential direction) of the encoders 10f, 11f.

In this example, when magnetizing the encoders 10f, 11f in the manufacturing stage, the center axes of these encoders 10f, 11f are made to coincide with each other, and a pin 69 is passed through or inserted into one of the through holes 67a, 67b and into the concave hole 68 as a regulating member so that there is no looseness. As a result the encoders 10f, 11f can be positioned in the circumferential direction. In this state, S poles and N poles are simultaneously magnetized on the detected sections 39, 40 of the encoders 10f, 11f so that the phases in the circumferential direction are the same as each other, and so as to alternate in the circumferential direction at a uniform pitch.

When installing the magnetized encoders 10f, 11f in the location of use with a positional relationship as illustrated in FIG. 9, the pin 69 passes through one of the through holes 67a, 67b and is inserted into the concave hole 68 positions the encoders 10f, 11f in the circumferential direction, and these encoders 10f, 11f are then installed in the location of use. On the other hand, when installing the encoders 10f, 11f in the location of use with a positional relationship as illustrated in FIG. 13, the through hole of the encoder 10f though which the pin 69 is passed is changed from the one though hole of the through holes 67a, 67b to the other through hole, and then with the relative positional relation in the circumferential direction of the encoders 10f, 11f shifted an amount of the pitch of one magnetization from the positional relationship at the time of magnetization, the encoders 10f, 11f are installed and fastened in the location of use, after which the pin 69 is removed from the through hole 67a or 67b and the concave hole 68.

By installing the encoders 10f, 11f in this way, the work of installing these encoders 10f, 11f in the location of use can be performed easily and accurately. Instead of the concave hole 68, it is possible to provide a through hole through which the pin 69 can be passed though with no looseness. The other construction and functions are the same as those of the first and second examples of embodiments.

[Fourth Example]

Figure 17:
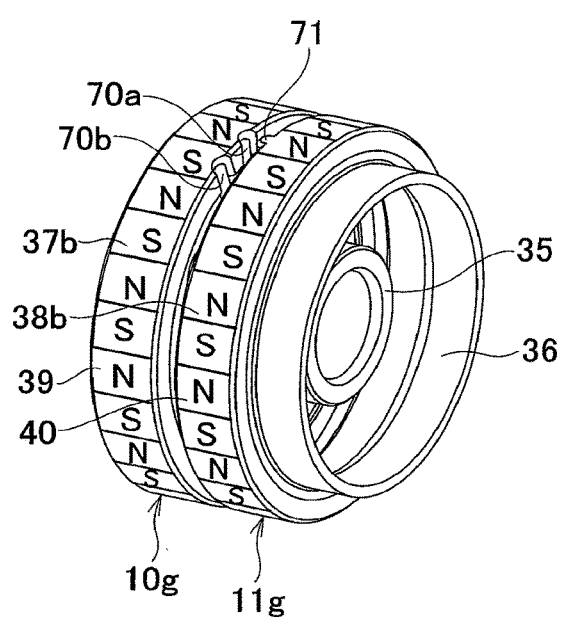
FIG. 17A is a perspective view of a first encoder.
FIG. 17B is a perspective view of a second encoder of a rotation transmission device of a fourth example of an embodiment of the present invention.
Figure 17:
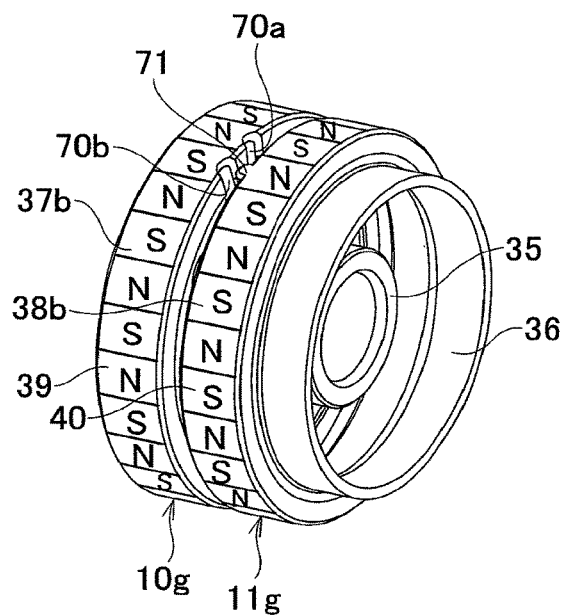

FIG. 17A and FIG. 17B illustrate a fourth example of an embodiment of the present invention. In this example, a pair of concave sections 70a, 70b, which are regulating sections, are provided in one end surface in the axial direction (the end surface on the second encoder 11g side) of the permanent magnet 37b of the first encoder 10g so as to be separated in the circumferential direction. Moreover, one convex section 71, which is a regulating section, is provided on one end surface in the axial direction (end surface on the first encoder 10g side) of the permanent magnet 38b of the second encoder 11g. The pitch of the concave sections 70a, 70b is equal to the pitch of one magnetization of the encoders 10g, 11g.

In this example, when magnetizing the encoders 10g, 11g in the manufacturing stage, the ends in the axial direction of the permanent magnets 37b, 38b of the encoders 10g, 11g are placed against each other, and by fitting one of the concave sections 70a, 70b with the convex section 71, the encoders 10g, 11g are positioned in the circumferential direction. In this state, the detected sections 39, 40 of the encoders 10g, 11g are simultaneously magnetized so that the S poles and N poles are in the same phase in the circumferential direction, and so as to alternate at a uniform pitch in the circumferential direction.

When installing the encoders 10g, 11g in the location of use with a positional relationship such as illustrated in FIG. 9, one of the concave sections 70a, 70b is fitted with the convex section 71, which positions the encoders 10g, 11g in the circumferential direction, and then the encoders 10g, 11g are installed in the location of use. On the other hand, when installing the encoders 10g, 11g in the location of use with a positional relationship such as illustrated in FIG. 13, one of the end surfaces in the axial direction of the permanent magnets 37b, 38b of the encoders 10g, 11g are placed together, and by fitting the other concave section of the concave sections 70a, 70b with the convex section 71 as illustrated in FIG. 17B, the encoders 10g, 11g are positioned in the circumferential direction, and then the encoders 10g, 11g are installed in the location of use. As a result, the work of installing the encoders 10g, 11g in the location of use can be performed easily and accurately. The other construction and functions are the same as in the first and second examples of embodiments.

[Fifth Example]

Figure 18:
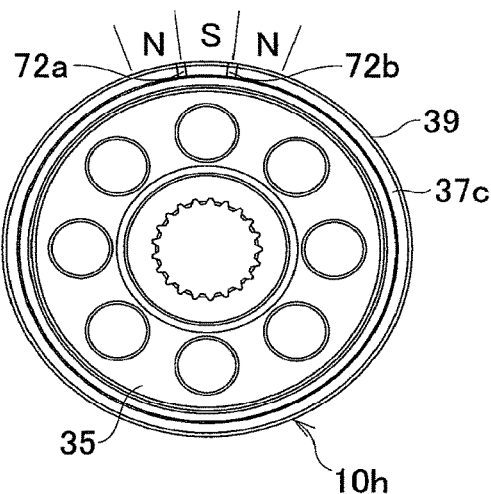
FIG. 18A is an end view of a first encoder.
FIG. 18B is an end view of a second encoder in a rotation transmission device of a fifth example of an embodiment of the present invention.
Figure 18:
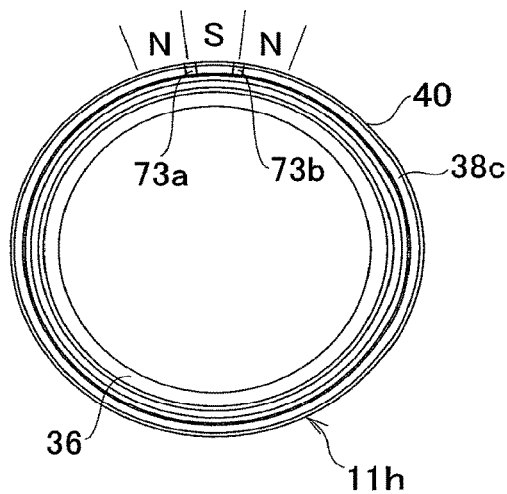

FIG. 18 illustrates a fifth example of an embodiment of the present invention. In this example, a pair of markings 72a, 72b, 73a, 73b such as concave sections or convex sections, which are regulating sections, are provided on the other end surface in the axial direction (end surface on the side opposite from the second encoder 11h) of the permanent magnet of the first encoder 10h, and on the one end surface in the axial direction (end surface on the first encoder 10h side) so as to be separated in the circumferential direction. The positions in the circumferential direction of the marking 72a, 72b that are provided on the first encoder 10h coincide with the positions in the circumferential direction of two magnetization boundaries (boundaries between S pole and N pole) that are adjacent in the circumferential direction of the detected section 39 of the first encoder 10h. Moreover, the positions in the circumferential direction of the marking 73a, 73b that are provided on the second encoder 11h coincide with the positions in the circumferential direction of two magnetization boundaries that are adjacent in the circumferential direction of the detected section 40 of the second encoder 11h.

In this example, the work of installing the encoders 10*h*, 11*h* in the location of use is performed in the assembled state, making sure that the positions in the circumferential direction of both the markings 72*a*, 72*b* and the markings 73*a*, 73*b* coincide, or so that the positions in the circumferential direction of the marking 72*a* and the marking 73*b* (or the marking 72*b* and the marking 73*a*) coincide. As a result, the work of installing the encoders 10*h*, 11*h* in the location of use can be performed easily and accurately. The other construction and functions are the same as those of the first and second examples of embodiments.

[Sixth Example]

Figure 19:
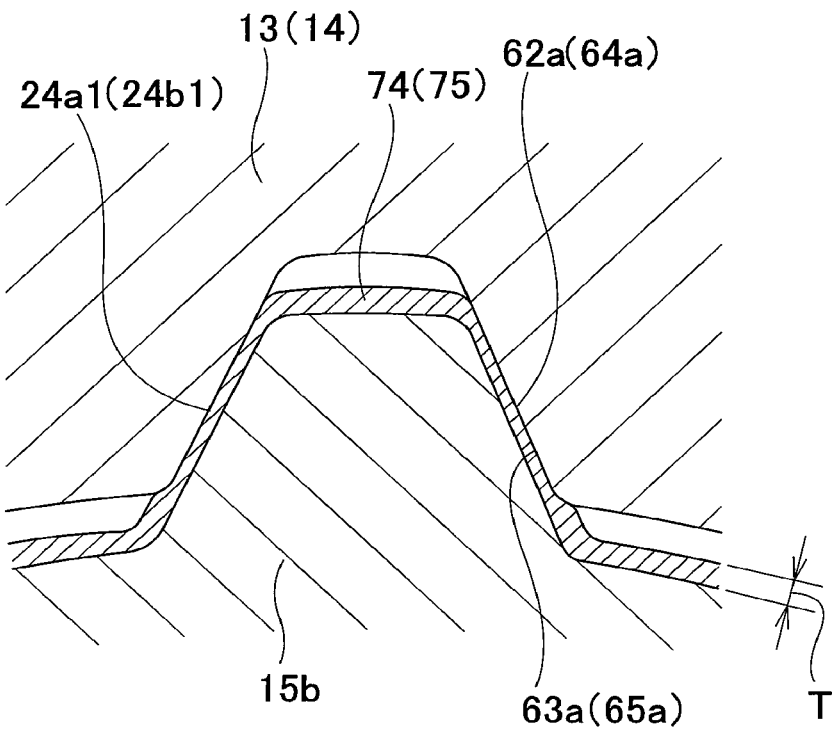
FIG. 19 is an enlarged cross-sectional view of a part in the circumferential direction of an involute spline engagement between a torsion bar and input shaft or output shaft in a rotation transmission device of a sixth example of an embodiment of the present invention.
Figure 20:
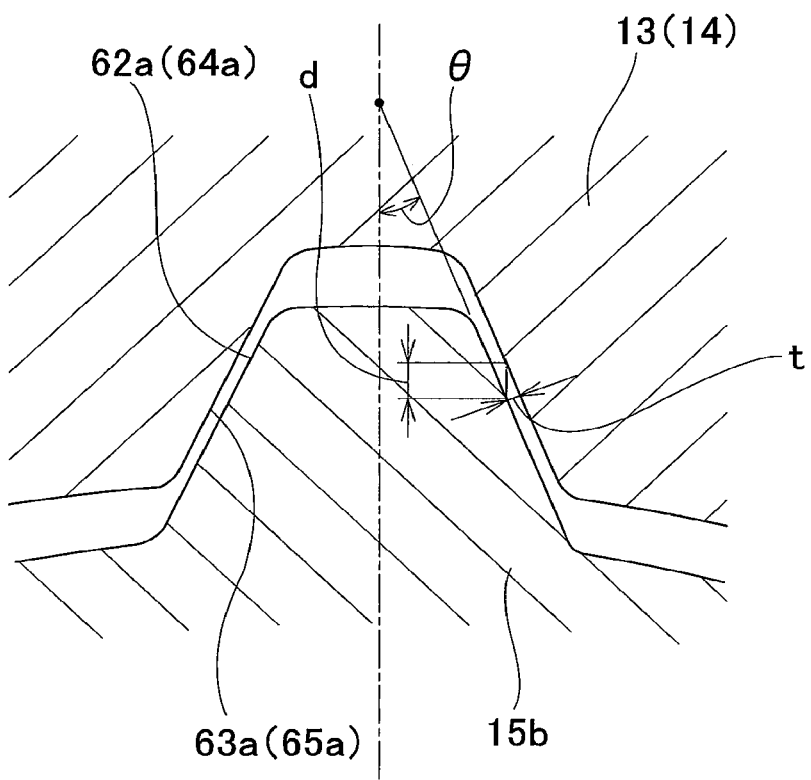
FIG. 20 is an enlarged cross-sectional view of part in the circumferential direction of the involute spline engagement illustrated in FIG. 19, and illustrates a state before providing a plating layer on the surface of the male involute spline section.
Figure 21:
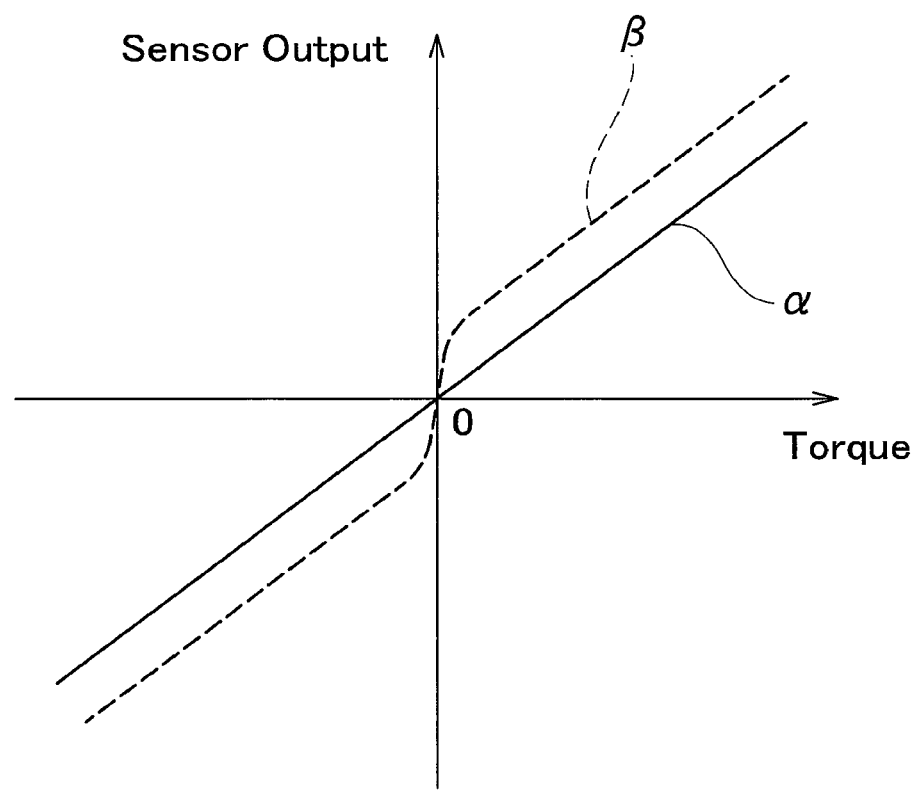
FIG. 21 is a graph illustrating the relationship between the sensor output and the transmitted torque in the rotation transmission device of the sixth example of an embodiment of the present invention.

FIG. 19 to FIG. 21 illustrate a sixth example of an embodiment of the present invention. In this example, a first plating layer 74 is provided on the surface layer of a first male involute spline section 62*a* that is provided on the outer-circumferential surface of the one end of the torsion bar 15*a*, and a second plating layer 75 is provided on the surface layer of a second male involute spline section 64*a* that is provided on the outer-circumferential surface of the other end section of the torsion bar 15*a*. The first and second plating layers 74, 75 are formed using a metal such as copper or nickel that are softer than the steel alloy such as carbon steel of the torsion bar 15, input shaft 13 and output shaft 14 (see FIG. 6). The first male involute spline section 62*a* (second male involute spline section 64*a*) is press fitted into a first female involute spline section 63*a* that is provided on the inner-circumferential surface of the input shaft 13 (second female involute spline section 65*a* that is provided on the inner-circumferential surface of the output shaft 14) so that the interference is less than the thickness dimension in the free state of first plating layer 74 (second plating layer 75). As a result, an involute spline connection 24*a*1 (involute spline connection 24*b*1) can be formed by fitting the first male involute spline section 62*a* (second male involute spline section 64*a*) with the first female involute spline section 63*a* (second female involute spline section 65*a*) so that there is no looseness in the circumferential direction. In this example, by the first plating layer 74 (second plating layer 75) being crushed between the teeth surfaces of the first male involute spline section 62*a* (second male involute spline section 64*a*) and the first female involute spline section 63*a* (second female involute spline section 65*a*), a function of eliminating looseness in the in the circumferential direction of the involute spline connection 24*a*1 (involute spline connection 24*b*1) is achieved. On the other hand, a space remains between the tip of the tooth and bottom of the tooth of the first male involute spline section 62*a* (second male involute spline section 64*a*) and the first female involute spline section 63*a* (second female involute spline section 65*a*), and these spaces function as passages for lubrication oil.

In this example, in order to set the interference described above, the thickness dimension T in the free state of the first plating layer 74 (second plating layer 75) is greater than the space t between the teeth surfaces in the state before forming the first plating layer 74 (second plating layer 75) on the first male involute spline section 62*a* (second male involute spline section 64*a*) illustrated in FIG. 20 (T>t). In the state illustrated in FIG. 20, this space t can be found as t=d·sin θ (θ: angle of the tooth surface with respect to the radial line that is set in the design) based on the measurement of 2d, which is the amount that the first male involute spline section 62*a* (second male involute spline section 64*a*) and first female involute spline section 63*a* (second female involute spline section 65) can move relative to each other in the radial direction. This space t can also be found by measurement using a conventionally known measurement pin or by using some other method.

In this example as well, the involute spline connections 24*a*1, 24*b*1 are connections in which there is no looseness in the circumferential direction. Therefore, when the direction of rotation of the input shaft 3, which is the rotary shaft on the side where torque is inputted, rotates in the reverse direction, it is possible to prevent relative rotation in the space in the circumferential direction in the involute spline connections 24*a*1, 24*b*1 that is the cause of looseness. In other words, when the direction of rotation of the input shaft 13 is in the reverse direction and relative rotation occurs in the involute spline connections 24*a*1, 24*b*1 in the spaces in the circumferential direction, relative rotation also occurs between the first and second encoders 10, 11. As a result, as illustrated by the dashed line β in FIG. 21, the characteristic curve that expresses the relationship between the sensor output and the torque suddenly changes and is non-linear when the torque=0 and near 0, so it becomes difficult to accurately measure minute torque. On the other hand, in this example, when the direction of rotation of the input shaft 13 is reversed, the occurrence of relative rotation in the spaces in the involute spline connections 24*a*1, 24*b*1 that are the cause of looseness is prevented. The occurrence of relative rotation between the first and second encoders 10, 11 is also prevented. As a result, as illustrated by the solid line a in FIG. 21, linearity of the characteristic curve that expresses the relationship between the sensor output and the torque is maintained overall, and so it is possible to accurately measure minute torque.

In this example, when press fitting the first and second male involute spline sections 62*a*, 64*a* into the first and second female involute spline sections 63*a*, 65*a*, a large portion of the deformation (elastic deformation or plastic deformation) of the interference area occurs in the first and second plating layers 74, 75 that are relatively soft. Therefore, the spaces in the circumferential direction that are the cause of looseness in the involute spline connections 24*a*1, 24*b*1 can be effectively filled in by the first and second plating layers 74, 75. Moreover, deformation of the copper or nickel of the first and second plating layers 74, 75 occurs at a smaller force than the deformation of the steel of the main portion of the involute spline sections 62*a*, 64*a*, 63*a*, 65*a*, so it is possible to keep the force required for performing a press fit low. Moreover, in this example, metal such as copper, nickel or the like that has suitable crushing characteristics and rigidity is used as the metal of the first and second plating layers 74, 75, so even when used over a long period of time, it is possible to make it difficult for spaces to occur between the plating layers 74, 75 and the teeth surfaces of the female involute spline sections 63*a*, 65*a*. In addition to the involute spline connections 24*a*1, 24*b*1, it is also possible to apply construction for eliminating looseness in the circumferential direction by using a suitable and relatively soft plating layer in the involute spline connections 24*c* to 24*e* (se FIG. 6). Moreover, in applications in which it is not necessary to measure minute torque, it is also possible to use connections having a little looseness in the circumferential direction for any of the involute spline connections 24*a* to 24*e* (see FIG. 6) without applying the construction of this example, and that construction is also within the scope of the present invention. The other construction and functions are the same as those of the first through fifth examples of embodiments.

[Seventh Example]

Figure 22:
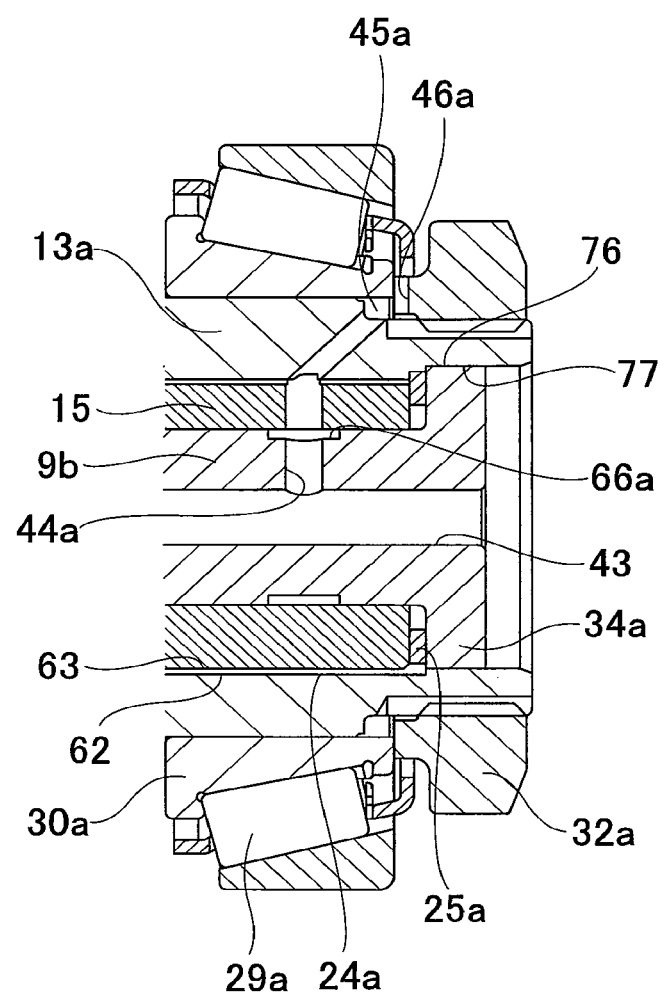
FIG. 22 is an enlarged cross-sectional view of one end of a rotation transmission device of a seventh example of an embodiment of the present invention.
Figure 23:
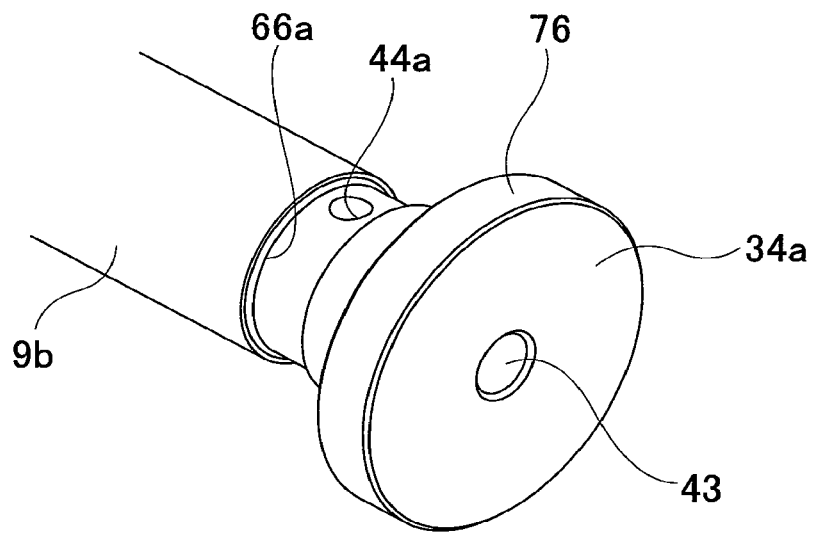
FIG. 23 is an enlarged perspective view of one end of a coupling shaft that is used in the seventh example of an embodiment of the present invention.

FIG. 22 and FIG. 23 illustrate a seventh example of an embodiment of the present invention. In this example, a rim section 34a that is provided on one end section of the coupling shaft 9b is fastened around the inside of the one end section of the input shaft 13a with an interference fit. More specifically, the outer-circumferential surface of the rim section 34a is taken to be a cylindrical surface 76, and that cylindrical surface 76 is fitted around a cylindrical surface 77 that is provided on the inner-circumferential surface of the other end section of the input shaft 13a with an interference fit. With this kind of construction, it is possible to simplify the construction of the portion where the one end section of the coupling shaft 9b is connected to the input shaft 13a so that relative rotation is not possible, and thus manufacturing cost can be suppressed by that amount. The other construction and functions are the same as those of the first through sixth examples of embodiments.

[Eighth Example]

Figure 24:
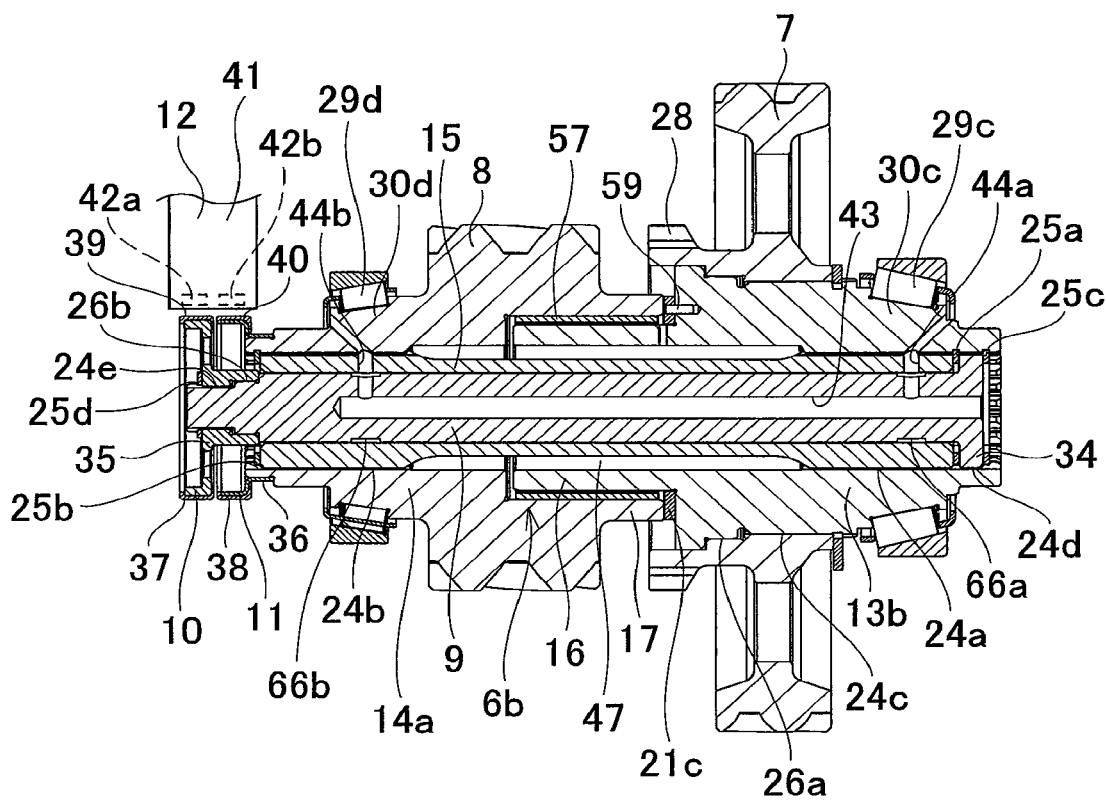
FIG. 24 is a cross-sectional view in the axial direction that illustrates a rotation transmission device together with the sensor of an eighth example of an embodiment of the present invention.
Figure 25:
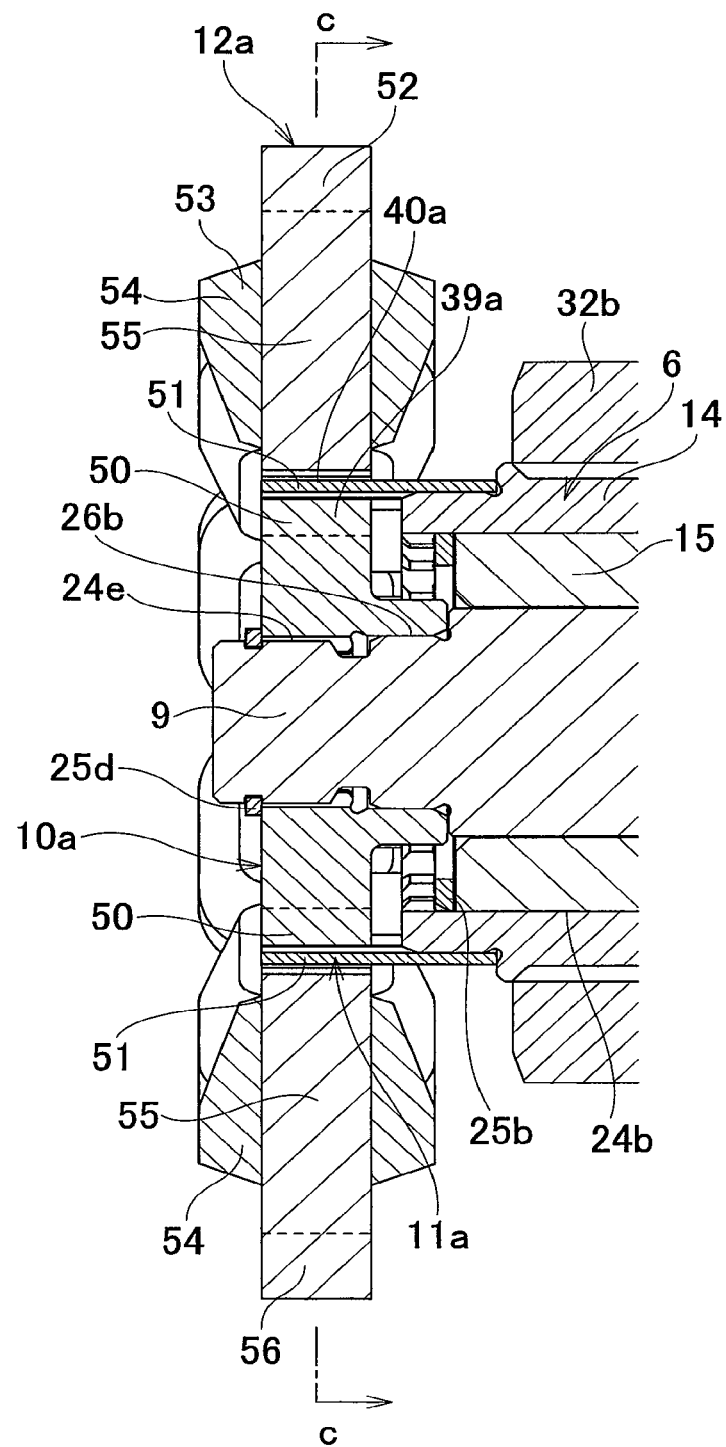
FIG. 25 is an enlarged cross-sectional view of the other end section of a rotation transmission device of a ninth example of an embodiment of the present invention.
Figure 26:
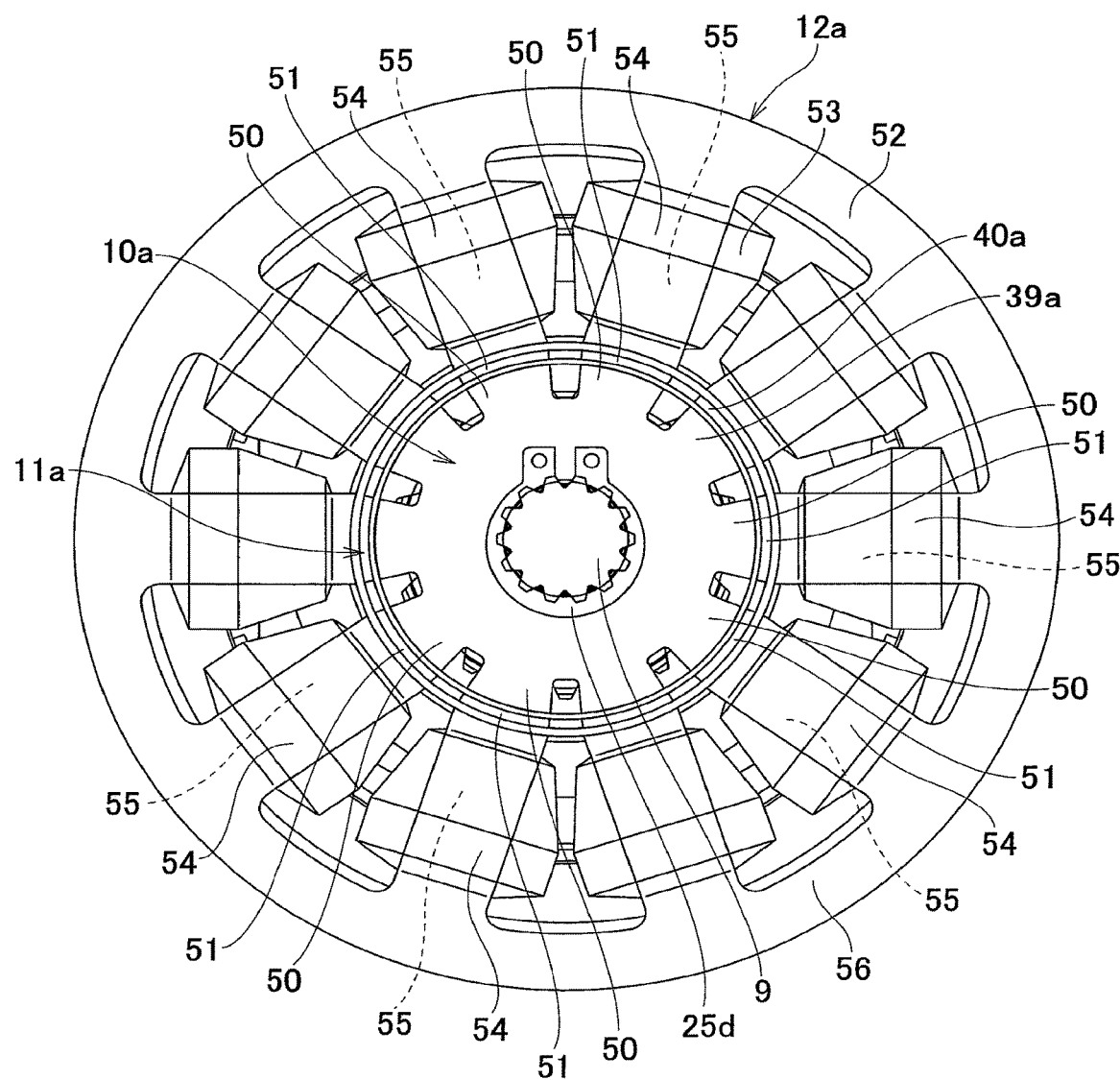
FIG. 26 is an end view of the other end side of the rotation transmission device illustrated in FIG. 25.
Figure 27:
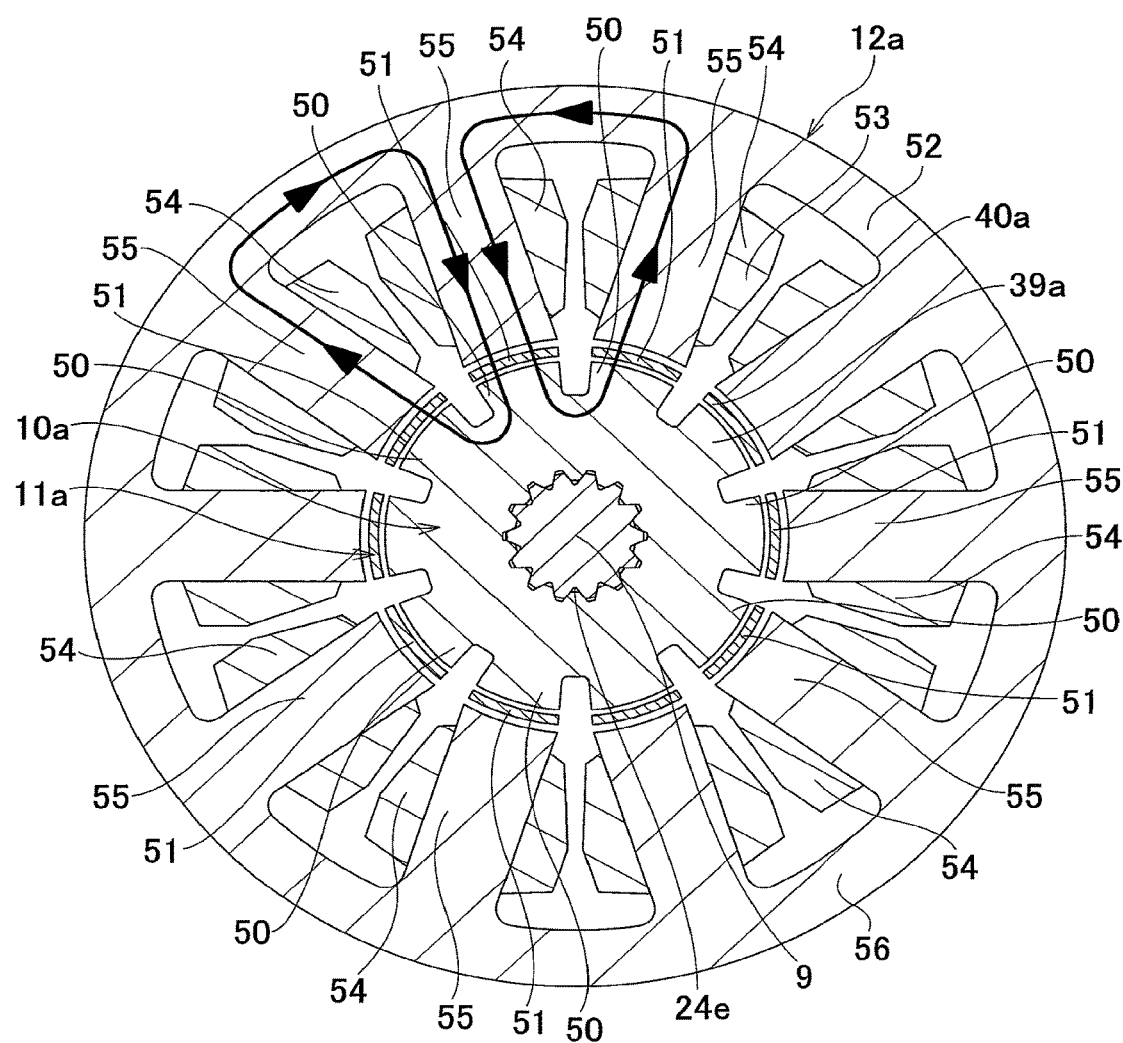
FIG. 27 is a cross-sectional view of section c-c in FIG. 25 of the rotation transmission device illustrated in FIG. 25.
Figure 28:
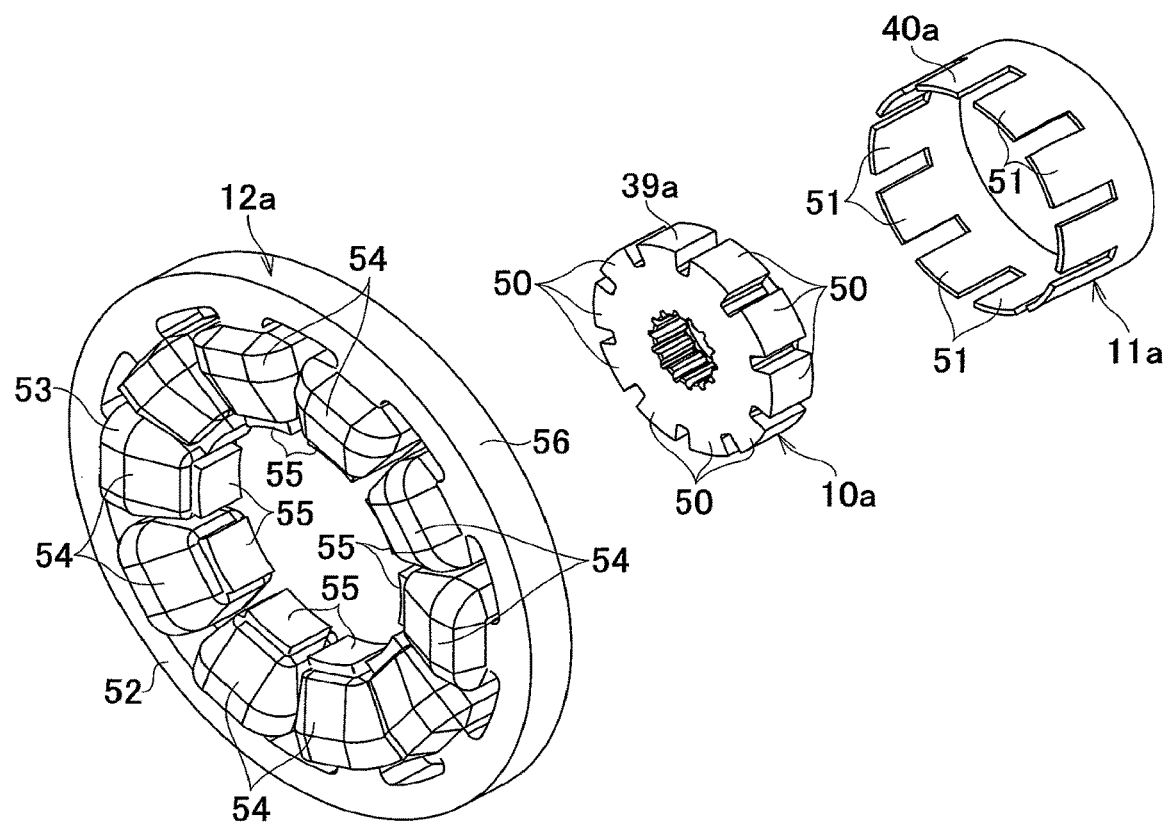
FIG. 28 is an exploded perspective view of the first encoder, the second encoder and the sensor unit of the rotation transmission device illustrated in FIG. 25.
Figure 29:
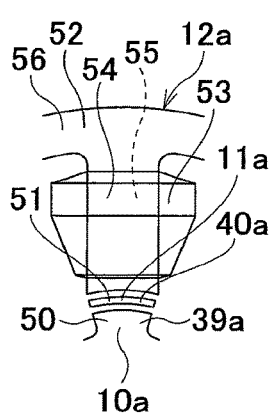
FIG. 29A is a view of a part in the circumferential direction of the area where the sensor unit faces the encoders in the rotation transmission device illustrated in FIG. 25, and illustrates a state in which torque is not transmitted.
FIG. 29B illustrates this part in a state in which torque is transmitted.
FIG. 29C is a graph illustrating the output signals from the sensor unit of this device when torque is not transmitted and when torque is transmitted.
Figure 29:
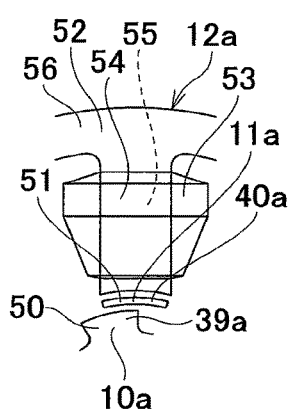
Figure 29:
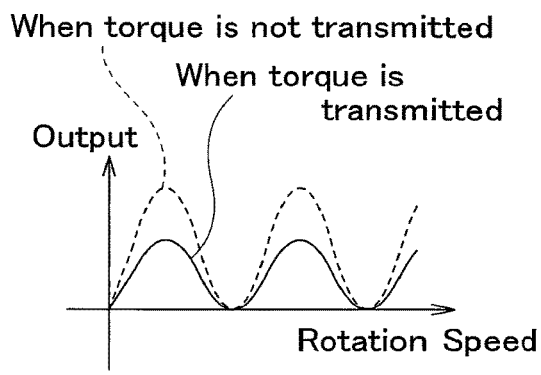
Figure 30:
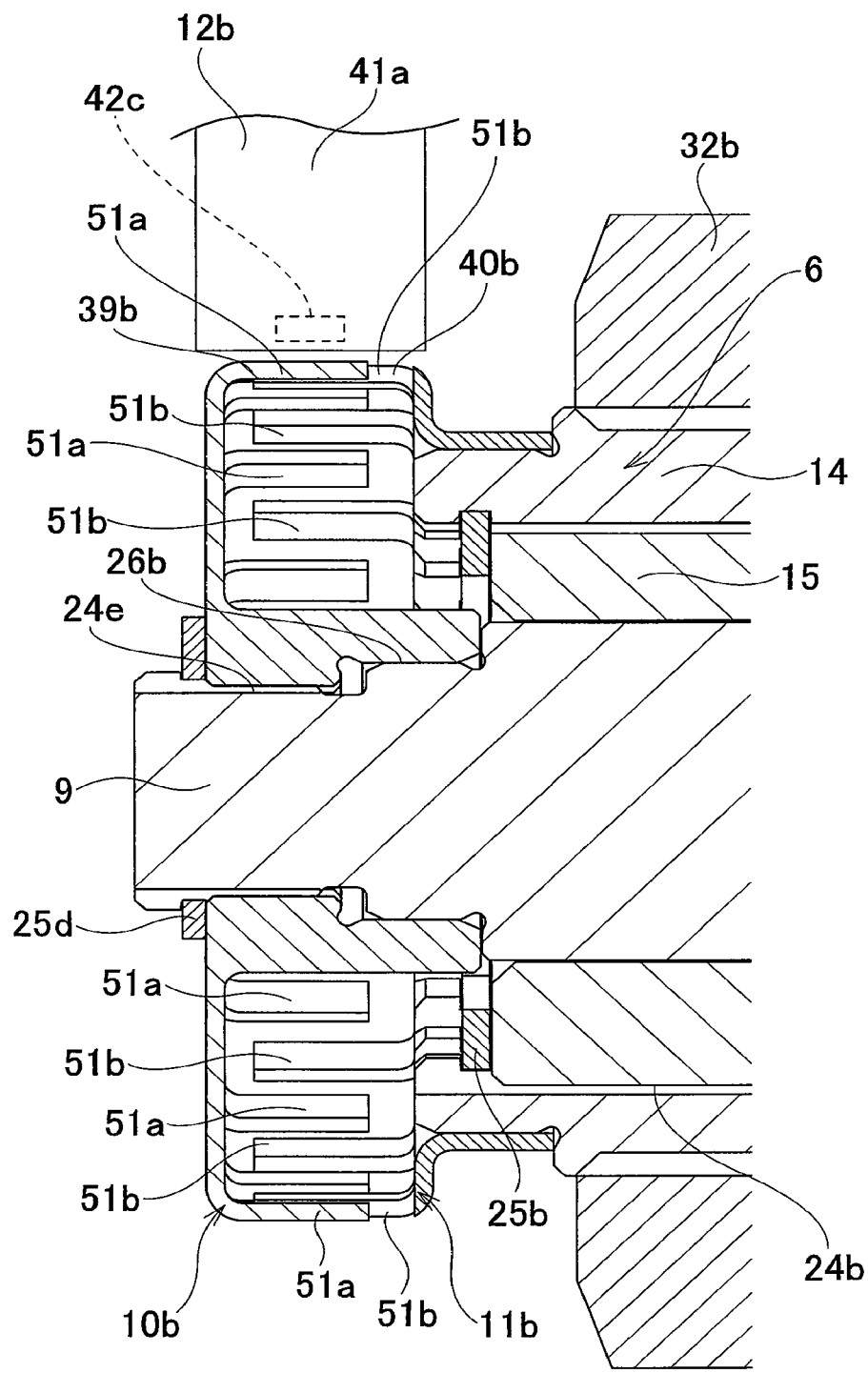
FIG. 30 is an enlarged vice of the other end section of a rotation transmission device of a tenth example of an embodiment of the present invention.
Figure 31:
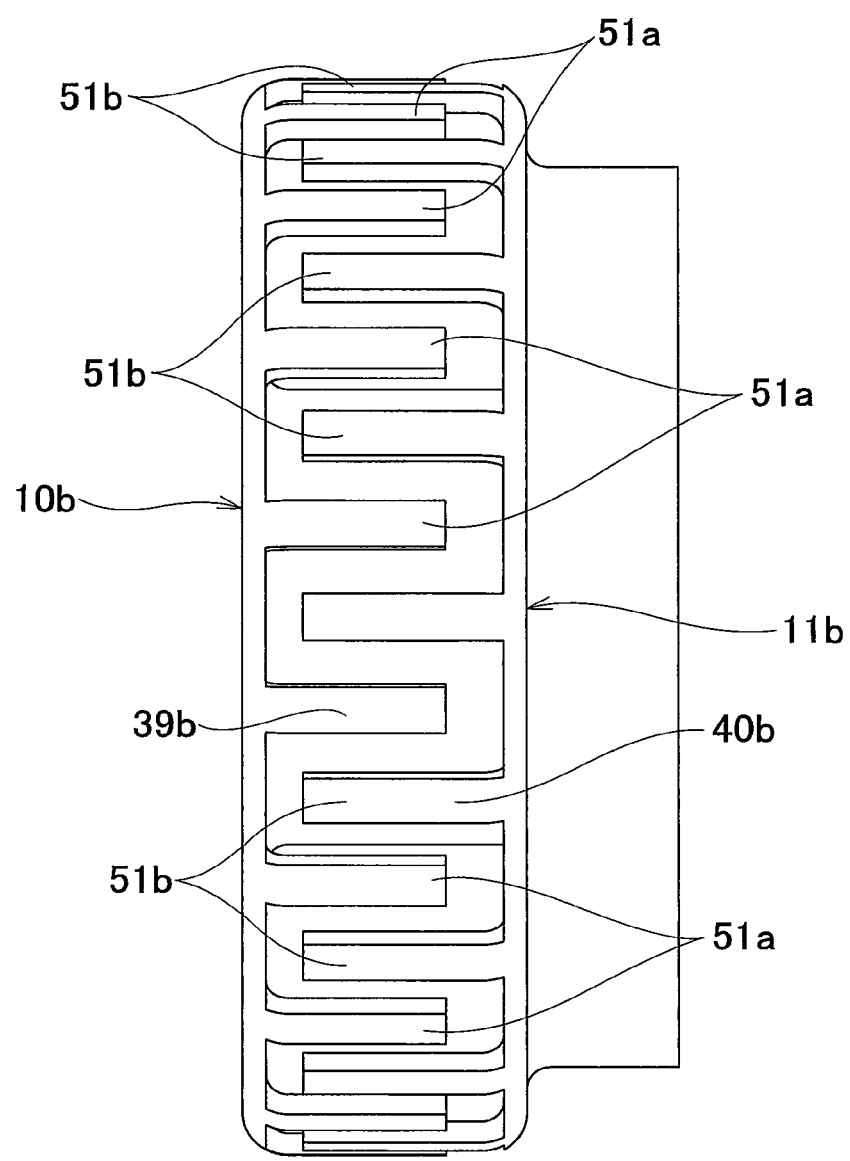
FIG. 31 is a view as seen from the outer-diameter side of an encoder of the rotation transmission device illustrated in FIG. 30.
Figure 32:
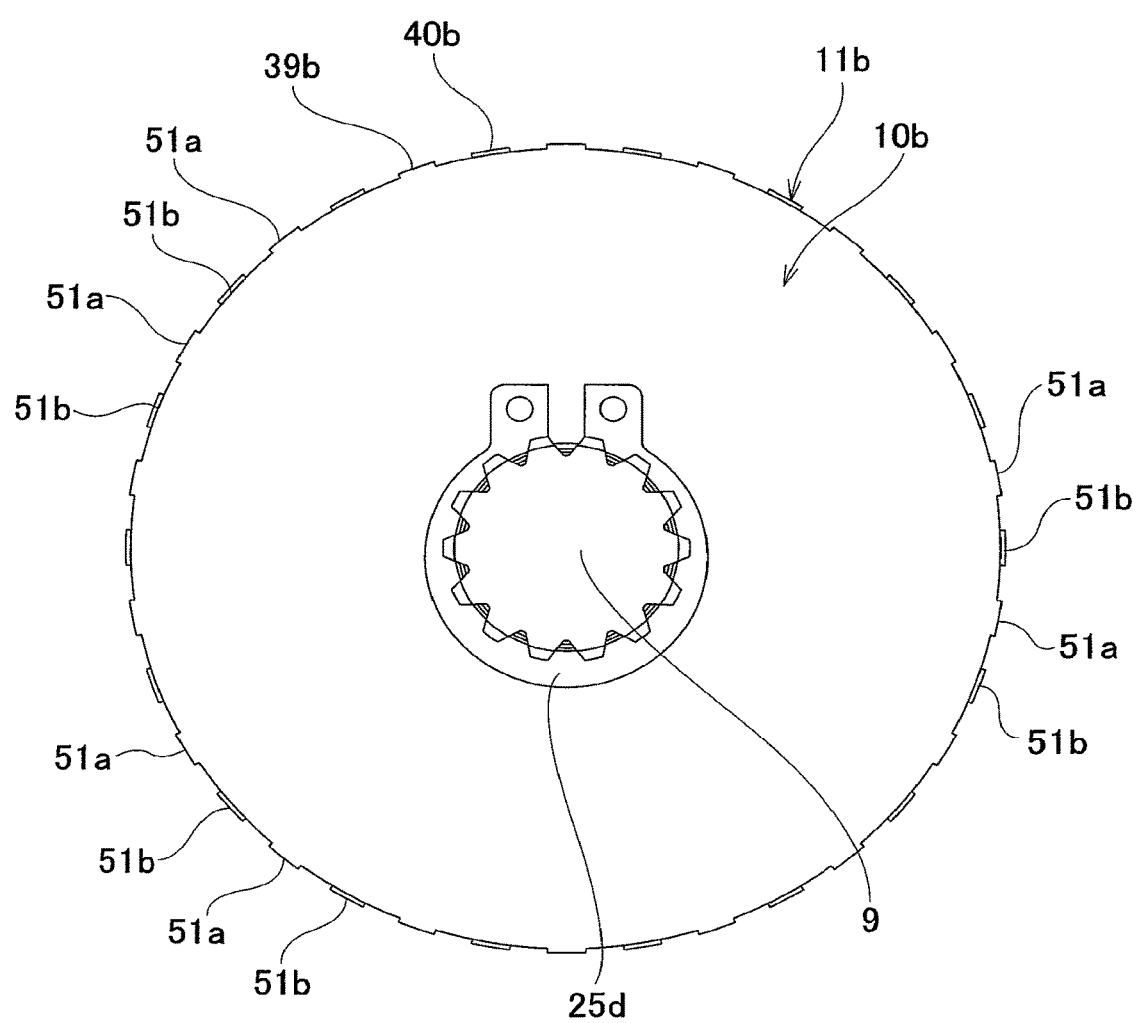
FIG. 32 is an end view of the other end section of the rotation transmission device illustrated in FIG. 30, and illustrates a state in which the sensor unit is omitted.
Figure 33:
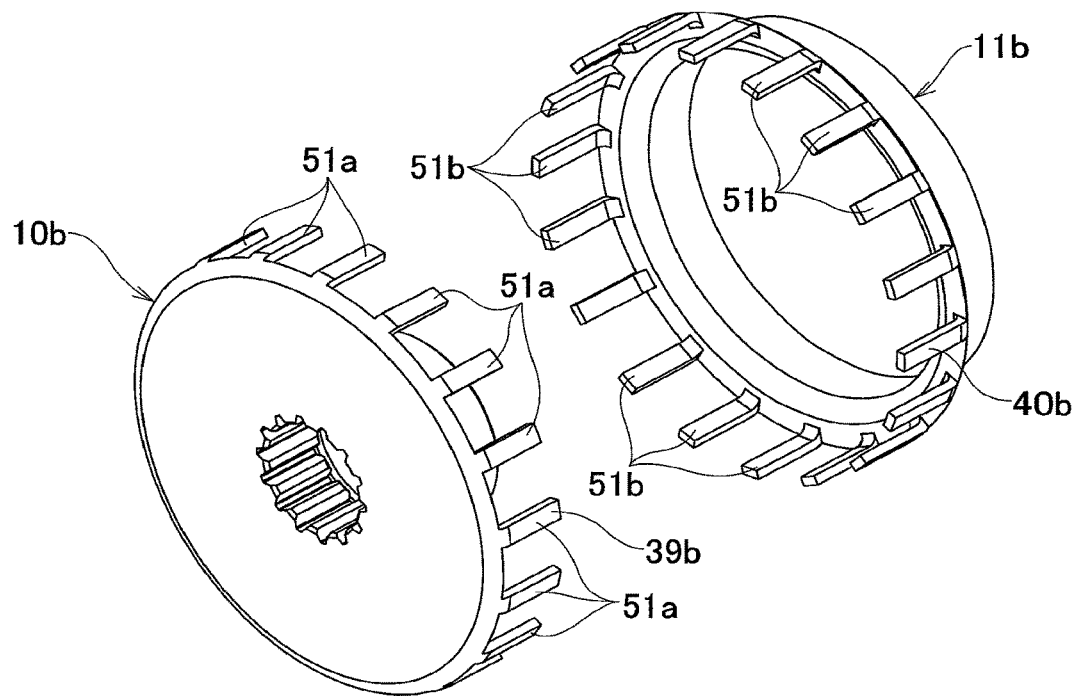
FIG. 33 is an exploded perspective view of the encoders of the rotation transmission device illustrated in FIG. 30, and illustrates a state in which the first encoder and second encoder are separated.
Figure 34:
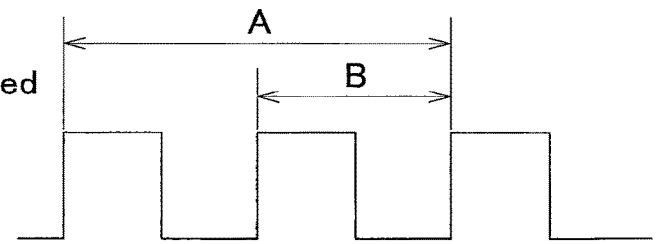
FIG. 34A is a graph for the rotation transmission device of the tenth example of an embodiment of the present invention, and illustrates the output signal of the sensor unit when torque is not transmitted.
FIG. 34B is a graph that illustrates the output signal of the sensor unit when torque is transmitted.
Figure 34:
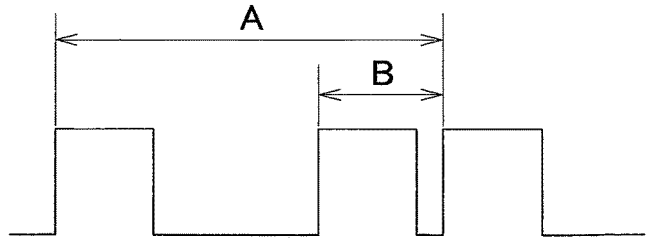

FIG. 24 illustrates an eighth example of an embodiment of the present invention. In this example, of the pair of conical roller bearings 29c, 29d that support the rotary-shaft unit 6b so as to be able to freely rotate with respect to the housing, the inner ring 30c of one of the conical roller bearings 29c is made so as to be integrated with the input shaft 13b, and the inner ring 30d of the other conical roller bearing 29d is made so as to be integrated with the output shaft 14a. As a result, the nuts 32a, 32b for preventing the inner rings 30c, 30d from coming out (see FIG. 6) are eliminated. Moreover, the dimension of the inner diameter of the input gear 7 that is fastened around the outside of the input shaft 13b is made to be larger than the dimension of the outer diameter of the inner ring 30c. As a result, when installing the input gear 7 onto or removing the input gear 7 from the input shaft 13b, the input gear 7 can pass in the axial direction over the inner ring 30c. In this example, separate inner rings 30c, 30d, and nuts 32a, 32b are eliminated, so it is possible to reduce the number of parts and assembly steps, simplify construction, make construction more compact and lightweight, and reduce manufacturing costs, and it is possible to improve the strength of the rim sections of the inner rings 30c, 30d, and improve the freedom of placement of the conical roller bearings 29c, 29d. The other construction and functions are the same as those of the first through seventh examples of embodiments.

[Ninth Example]

FIG. 25 to FIG. 29 illustrate a ninth example of an embodiment of the present invention. In this example, the first encoder 10a that is fastened around the outside of the other end section of the coupling shaft 9 is formed into a complete ring shape having an L-shaped cross section using a magnetic metal, and the outer circumference of the first encoder 10a functions as a flat gear shaped first detected section 39a. In other words, the first detected section 39a is constructed so that plural convex sections 50 that protrude to the outer-diameter side from the portion near the outer circumference of the first encoder 10a are arranged at a uniform pitch in the circumferential direction. In this example, of the first detected section 39a, the convex sections correspond to solid sections, and portions between convex sections 50 that are adjacent in the circumferential direction correspond to sections where material has been removed.

Moreover, the second encoder 11a that is fastened around the outside of the other end section of the output shaft 14 is formed into a complete cylindrical shape using magnetic metal plate, and the tip half section that protrudes in the axial direction from the other end surface of the output shaft 14 functions as a comb shaped second detected section 40a. In other words, the second detected section 40a is constructed so that plural tongue pieces 51 that extend in the axial direction toward the tip end side from the middle section in the axial direction of the second encoder 11a are arranged at a uniform pitch in the circumferential direction. The total number of these tongue pieces 51 is the same as the total number of convex section 50. Moreover, the width in the circumferential direction that is expressed by the center angle of these tongue pieces 51 is equal to the width in the circumferential direction that is expressed by the center angle of the convex sections 50. In this example, of the second detection section, the tongue pieces 51 correspond to solid sections, and the spaces between tongue pieces that are adjacent in the circumferential direction correspond to sections with material removed.

In this example, with the inner-circumferential surface of the second detected section 40a closely facing the outer-circumferential surface of the first detected section 39a, the first and second detected sections 39a, 40a are arranged so as to be concentric with each other, or in other words, so as to overlap in the radial direction. Moreover, when torque is not being transmitted, or in other words, when the torsion bar 15 has not undergone elastic torsional deformation, and the detected sections 39a, 40a have not undergone relative displacement in the direction of rotation, the phases in the circumferential direction of the convex sections 50 and the tongue pieces 51 coincide with each other.

Furthermore, the sensor unit 12a is formed into a complete circular ring shape, and concentrically arranged around the outer-diameter side of the first and second detected sections 39a, 40a. The sensor unit 12a includes a stator 52 made of a magnetic material, and plural coils 54 that are formed using one conducting wire 53. The stator 52 includes plural core sections 55 that are long in the radial direction, and a circular ring-shaped rim section 56 that connects the base-end sections, on the outer-diameter side of the core sections 55. The total number of core sections 55 is the same as the total number of convex sections 50 and tongue pieces 51. Moreover, the width in the circumferential direction that is expressed by the center angle of the tip-end surfaces on the inner-diameter side of the core sections 55 is equal to the width in the circumferential direction of the tongue pieces 51 (width in the circumferential direction of the convex sections 50). In this example, the end surfaces on the inner-diameter side of such core sections 55 are made to closely face the outer-circumferential surface of the second detected section 40a. Moreover, the coils 54, together with being wound around the core sections 55, are such that the winding directions of coils that are adjacent to each other in the circumferential direction are opposite each other. Therefore, in this example, the total number of coils 54 is an even number (10 coils 54 in the example in the figures), and the total number of convex sections 50 and tongue pieces is also an even number.

In this example, the coils 54 have both a driving function for generating a magnetic field, and a detection function for detecting change in the magnetic field. In other words, by applying a driving voltage to the coils 54 (conducting wire 53), a driving current flows through these coils 54, and between coils 54 that are adjacent in the circumferential direction, a loop-shaped magnetic fluxes such as illustrated by the bold arrow lines in FIG. 27 flow inside the stator 52 and first and second encoders 10a, 11a. In this state, when the first and second encoders 10a, 11a rotate together with the rotary-shaft unit 6, the density of the loop-shaped magnetic flux periodically changes, and as this occurs, a periodic induced current flows in the coils 54. As a result, the output of the conducting wire 53, which is the output of the sensor unit 12*a*, and more specifically, the voltage and current (when the driving voltage is an alternating-current voltage, the peak values or effective values of these) periodically change as illustrated in FIG. 29C. Here, the frequency (and period) of this output is a value that corresponds to the rotational speed of the rotary-shaft unit 6. Therefore, by investigating the relationship between the frequency (or period) of this output and the rotational speed, it is possible to find the rotational speed based on this frequency (or period).

In this example, when torque is being transmitted, the encoders 10*a*, 11*a* displace relative to each other in the direction of rotation due to elastic torsional deformation of the torsion bar 15, and as a result, the phase in the circumferential direction of the convex sections 50 and the tongue pieces 51 of the detected sections 39*a*, 40*a* shift in the order as illustrated from FIG. 29A to FIG. 29B. As this occurs, the widths in the circumferential direction of the magnetic paths inside the encoders 10*a*, 11*a*, which are the portions where the convex sections 50 overlap the tongue pieces in the radial direction, decreases. As a result, the size of the output of the conducting wire 53 decreases in the order as illustrated from the dashed line to the solid line in FIG. 29C. Here, the shift in phase (the amount of decrease in the width in the circumferential direction of the magnetic path) becomes larger the larger the torque becomes. Therefore, the size of the output decreases more the larger the torque becomes. However, the size of the output not only changes due to the torque, but also changes due to the rotational speed. In other words, the size of the induced current that flows in the coils 54 (induced electromotive force in the coils 54) is proportional to the rate of change in the magnetic flux that passes through the coils 54. The rate of change of this magnetic flux becomes large in proportion to the rotational speed. Therefore, the size (amplitude) of the output becomes larger in proportion to the rotational speed. In this example, the effect that the torque has on the size of the output, and the effect that the rotational speed has on the size of the output are both investigated beforehand. As described above, the rotational speed is found based on the frequency (or period) of the output, and correction is performed to return the size of the output that has changed due to the effect of the rotational speed to the original size. By doing so, it is possible to accurately find the torque based on the size of the output after this correction. The driving voltage that is applied to the conducting wire 53 can also be a direct-current voltage, however, in order to increase the resistance to noise, an alternating-current voltage is preferred.

In this example, the sensor unit 12*a* is combined with the stator 52 and coils 54 and does not include precision electronic parts such as a magnetism-detecting device, so has excellent heat resistance and vibration resistance. Moreover, in this example, there is only one output that is used for measuring the rotational speed and the torque, so there is no need for complex signal processing when performing measurement. Consequently, it is possible to use an inexpensive computing device that does not have very high processing capability as the computing device used in performing this signal processing.

It is also possible to use construction wherein the direction in which the detected sections of the first and second encoders face the tip-end surfaces of the core sections of the sensor unit can be changed from the radial direction to the axial direction. In that case, the detected sections of the first and second encoders are a pair of circular disk-shaped detected sections having the same dimensions in the radial direction, and these detected sections are arranged so as to overlap in the axial direction. On the other hand, the core sections of the sensor unit are formed so as to be long in the axial direction. The tip-end surfaces of these core sections can face the detected sections from one side in the axial direction, which is the direction in which these detected sections overlap. The other construction and functions are the same as those of the first through eighth examples of embodiments.

[Tenth Example]

FIG. 30 to FIG. 35 illustrate a tenth example of an embodiment of the present invention. In this example, the first encoder 10*b* that is fastened around the outside of the other end section of the coupling shaft 9, and the second encoder 11*b* that is fastened around the outside of the other end section of the output shaft 14 are formed into a complete circular ring shape using a magnet metal, and each encoder 10*b*, 11*b* includes a comb-shaped cylindrical detection section 39*b* (40*b*). In other words, the first detected section 39*b* of the first encoder 10*b*, and the second detected section 40*b* of the second encoder 11*b* are formed so that plural tongue pieces 51*a* (51*b*) that are long in the axial direction are arranged at a uniform pitch in the circumferential direction, and so that the base-end sections of these tongue pieces 51*a* (51*b*) are connected together. Moreover, the shape and dimensions of the detected sections 39*b*, 40*b* are the same as each other, however, the direction that each faces in the axial direction is opposite of each other. The tongue pieces 51*a* of the first detected section 39*b* and the tongue pieces 51*b* of the second detected section 40*b* are arranged so that when located in a space in the circumferential direction, the tongue pieces alternate one tongue piece at a time in the circumferential direction. In this example, when torque is not being transmitted, the widths in the circumferential direction of the portions between tongue pieces 51*a*, 51*b* that are adjacent in the circumferential direction are all the same. Furthermore, the widths in the circumferential direction of the portions between tongue pieces 51*a*, 51*b* that are adjacent in the circumferential direction are the same as the widths in the circumferential direction of the tongue pieces 51*a*, 51*b*. This is so that the duty ratio c when torque is not being transmitted is 0.5. In this example, of the detected sections 39*b* (40*b*), the tongue pieces 51*a* (51*b*) correspond to solid sections, and the portions between tongue pieces 51*a* (51*b*) that are adjacent in the circumferential direction correspond to sections where material has been removed.

In this example, the sensor unit 12*b* includes a holder 41*a* that is made of a synthetic resin, and one sensor 42*c* that is embedded in the tip-end section of the holder 41*a*; and the detecting section of the sensor 42*c* is made to closely face the outer-circumferential surface of the detected sections 39*b*, 40*b* (portions where the tongue pieces 51*a*, 51*b* are arranged in an alternating manner in the circumferential direction). The sensor 42*c* includes a permanent magnet that is magnetized in the direction that the outer-circumferential surfaces of the detected sections 39*b*, 40*b* face the detecting section of the sensor 42*c*, and a magnetic detecting element such as Hall element, Hall IC, MR element, GMR element and the like that is arranged on the end surface of both end surfaces in the magnetized direction of the permanent magnet that faces the outer-circumferential surfaces of the detected sections 39*b*, 40*b*.

Figure 35:
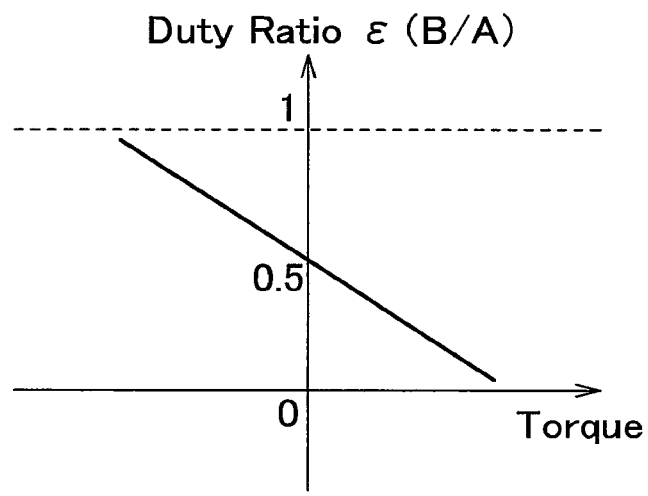
FIG. 35 is a graph for the rotation transmission device of the tenth example of an embodiment of the present invention, and illustrates the relationship between the duty ratio ε of the output signal of the sensor and the torque.

In this example, the output signal from the sensor 42*c* of the sensor unit 12*b* periodically changes as the first and second encoders 10*b*, 11*b* rotate together with the rotary-shaft unit 6. Moreover, as the first and second encoders displace relative to each other in the direction of rotation due to elastic torsional deformation of the torsion bar 15 when torque is being transmitted by the rotary-shaft unit 6, the widths in the circumferential direction of the portions between tongue pieces 51a, 51b that are adjacent in the circumferential direction change. More specifically, the widths in the circumferential direction of every other one of the portions between the tongue pieces 51a, 51b become larger, and the widths in the circumferential direction of the remaining portions become smaller. As a result, the duty ratio ε (=time ratio B/A) of the output signal of the sensor 42c changes as illustrated in the order from FIG. 34A to FIG. 34B. Here, the amount that the widths in the circumferential direction of the portions between tongue pieces 51a, 51b that become larger (smaller) is a value that corresponds to the torque that is transmitted by the rotation transmission device, so the duty ratio ε is also a value that corresponds to the torque. Therefore, by investigating in advance the relationship between the duty ratio ε and the torque such as illustrated in FIG. 35, the torque can be found based on this duty ratio ε. Furthermore, in regard to the output signal of the sensor 42c, the 2-pulse period A is a value that corresponds to the rotational speed of the rotary-shaft unit 6. Therefore, by investigating the relationship between the 2-pulse period A and the rotational speed, it is possible to find the rotational speed based on the 2-pulse period A.

In this example, the detected sections of the first and second encoders 10b, 11b are made to overlap in the circumferential direction, so it is possible to shorten the dimension in the axial direction of the portions where these detected sections 39b, 40b are located, and thus construction that conserves space by this amount is possible. Moreover, it is sufficient to install only one magnetism-detecting element in the sensor unit 12b, so the cost of the sensor unit 12b can be suppressed. The other construction and functions are the same as those of the first through eighth examples of embodiments.

[Eleventh Example]

Figure 36:
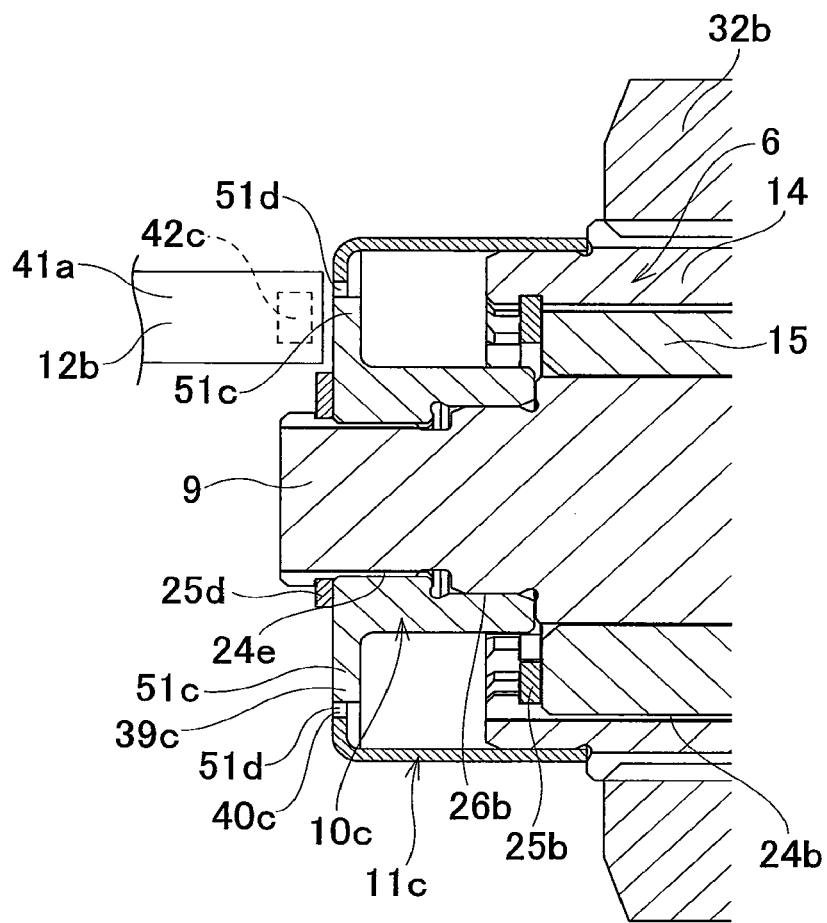
FIG. 36 is an enlarged cross-sectional view that illustrates the other end section of a rotation transmission device of an eleventh example of an embodiment of the present invention.
Figure 37:
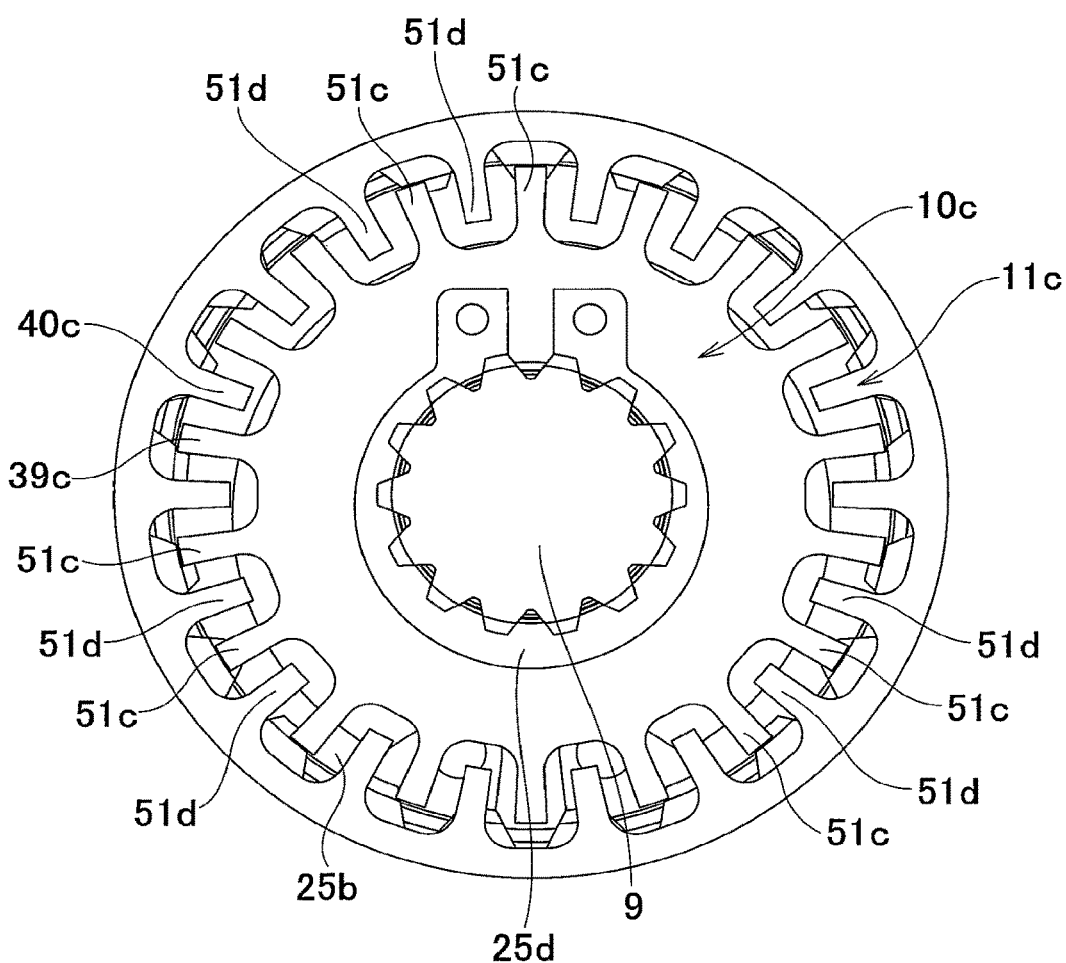
FIG. 37 is an end view of the other end side of the rotation transmission device illustrated in FIG. 36.
Figure 38:
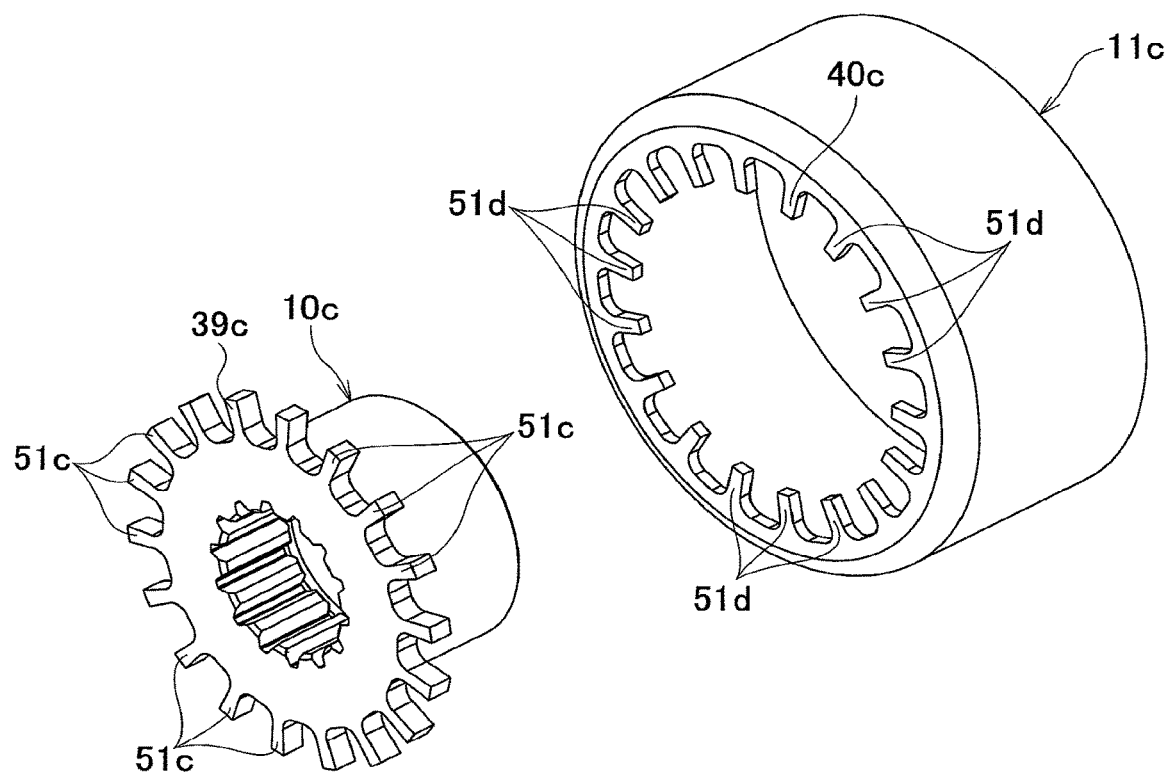
FIG. 38 is an exploded perspective view of the encoders of the rotation transmission device illustrated in FIG. 36, and illustrates a state in which a first encoder and a second encoder are separated.
Figure 39:
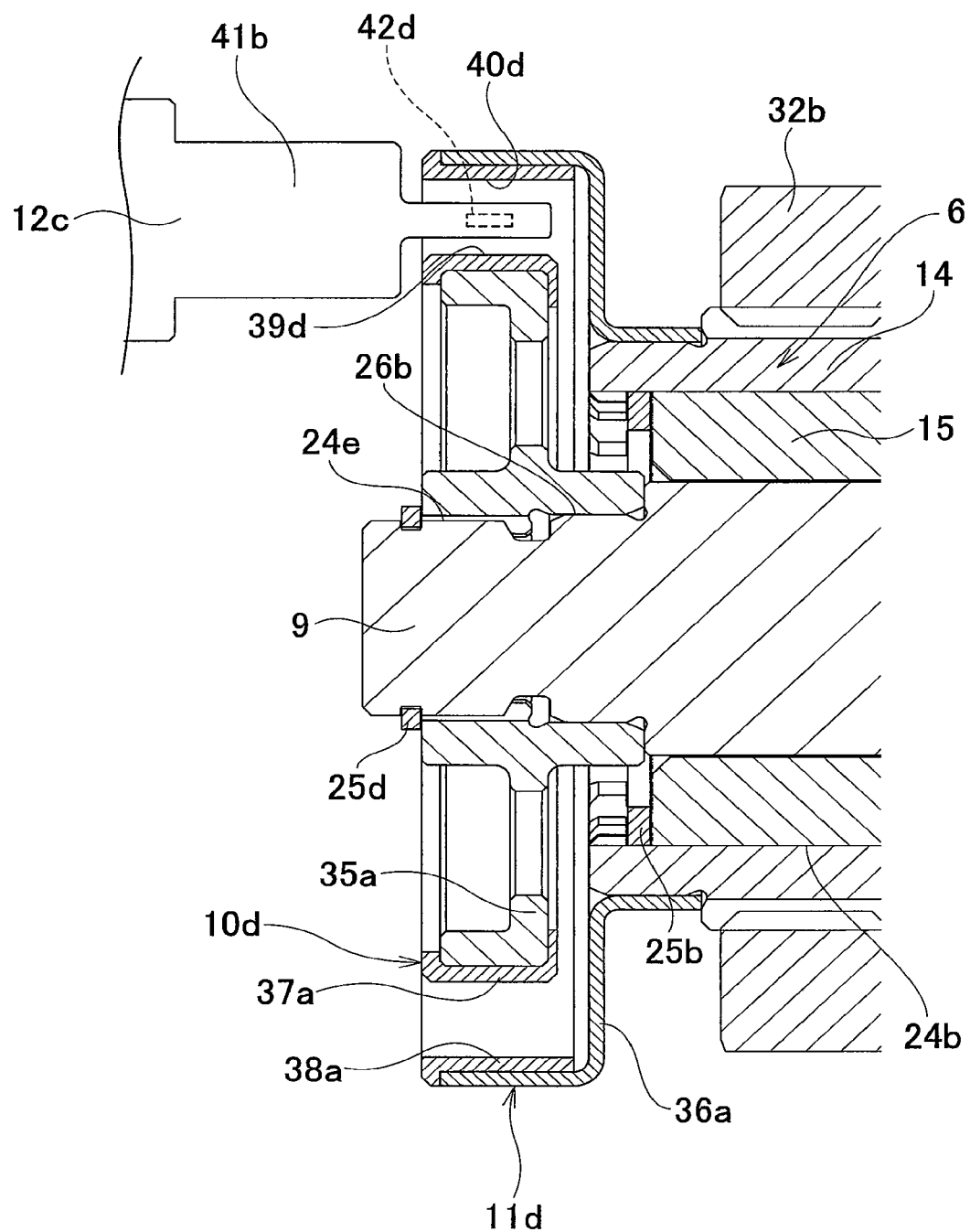
FIG. 39 is an enlarged cross-sectional view of the other end section of a rotation transmission device of a twelfth example of an embodiment of the present invention.
Figure 40:
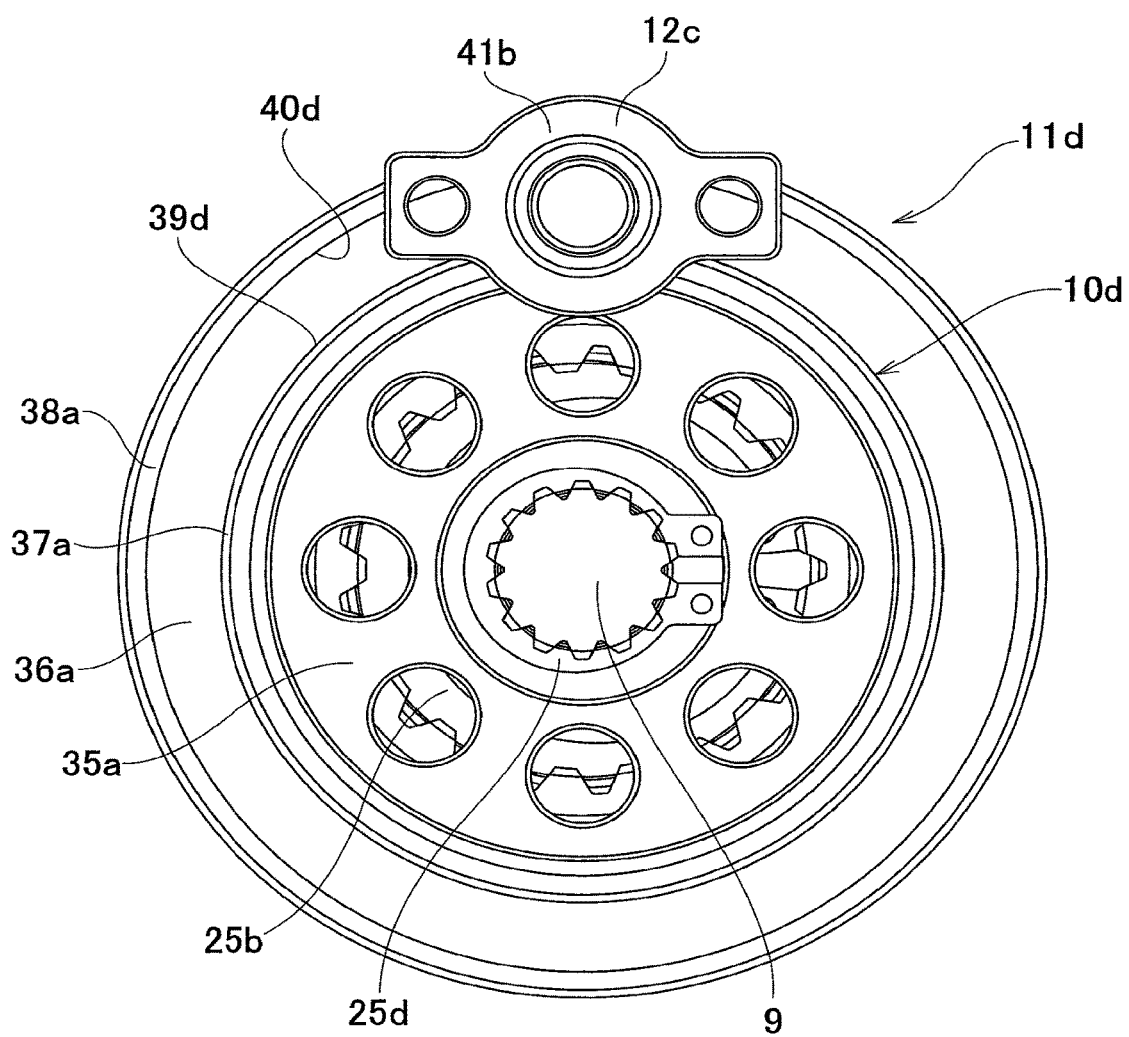
FIG. 40 is an end view of the other end side of the rotation transmission device illustrated in FIG. 39.

FIG. 36 to FIG. 38 illustrate an eleventh example of an embodiment of the present invention. In this example, the first detected section 39c of the first encoder 10c that is fastened around the outside of the other end section of the coupling shaft 9, and the second detected section 40c of the second encoder 11c that is fastened around the outside of the other end section of the output shaft 14 are both formed into a comb-like circular ring shape. Moreover, when the positions in the axial direction of these detected sections 39c, 40c coincide with each other, the tongue pieces 51c, 51d of the detected sections 39c, 40c are arranged in an alternating manner in the circumferential direction when located in a space in the circumferential direction. The detecting section of one sensor 42c of the sensor unit 12b is made to face in the axial direction the side surface in the axial direction of the portion where the tongue pieces 51c, 51d are arranged.

Except for changing the shape of the detected sections 39c, 40c to a circular disk shape, and changing the direction in which the detected sections 39c, 40c face the detecting section of the sensor 42 to the axial direction, the other construction and functions are the same as those of the tenth example of an embodiment.

[Twelfth Example]

FIG. 39 to FIG. 42 illustrate a twelfth example of an embodiment of the present invention. In this example, the first encoder 10 that is fastened to and supported by the other end section of the coupling shaft 9 includes a ring-shaped metal core 35a that is made of a magnetic material and that is fastened around the outside of the other end section of the coupling shaft 9, and a cylindrical-shaped permanent magnet 37a that is fastened around the outer-circumferential surface of a cylindrical section that exists on the outer circumference of the metal core 35a. S poles and N poles are arranged on the first detected section 39a, which is the outer-circumferential surface of the permanent magnet 37a, at a uniform pitch and so as to alternate in the circumferential direction. On the other hand, the second encoder 11d that is fastened to and supported by the other end section of the output shaft 14 includes a ring-shaped metal core 36a that is made of magnetic metal sheet and that is fastened around the outside of the other end section of the output shaft 14, and a cylindrical shaped permanent magnet 38a that is fastened around the inner-circumferential surface of a cylindrical section that exists on the outer circumference of the metal core 36a. The second detected section 40d, which is the inner-circumferential surface of the permanent magnet 38a, is concentrically arranged on the outer-diameter side of the first detected section 39d so that there is a specified space in the radial direction. In other words, the first and second detected sections 39, 40d face each other through a specified space in the radial direction. There are also S poles and N poles arranged on the second detected section 40d at a uniform pitch and so as to alternate in the circumferential direction. The total number of magnetic poles (S poles, N poles) that are arranged on the second detected section 40d and the total number of magnetic poles that are arranged on the first detected section 39d are the same as each other. Moreover, when torque is not being transmitted, the detected sections 39d, 40d are arranged so that the centers of different poles face each other in the radial direction.

In this example, the sensor unit 12c that is supported by the housing (not illustrated in the figures) includes a holder 41b made of a synthetic resin, and one sensor 42d that is embedded in the tip-end section of the holder 41b; and the sensor 42d is arranged so as to be in the center position in the radial direction between the detected sections 39d, 40d. A magnetism-detecting element such as a Hall element, Hall IC, MR element, GMR element or the like is assembled in the detecting section of the sensor 42d, and the sensing direction of that magnetism-detecting element is such that the center section of the element coincides with the radial direction of the first and second detected sections 39d, 40d. In other words, the sensing direction of this magnetism-detecting element is in the up-down direction in FIG. 41A and FIG. 41B, and the magnetic flux density in this up-down direction is proportional to the size of the output (voltage, current) of the magnetism-detecting element, which is the output signal of the sensor unit 12c.

In the rotation transmission device of this example, when torque is not being transmitted as illustrated in FIG. 41A, or in other words, when there is no relative displacement in the direction of rotation between the detected sections 39d, 40d, the different poles of the detected sections 39d, 40d face each other in the radial direction, so the direction of the magnetic flux that passes through the magnetism-detecting element mostly coincides overall with the direction of sensitivity of the detecting element. In other words, in this state, the magnetic flux density in the direction of sensitivity is a maximum, so the output of the magnetism-detecting element is also a maximum. On the other hand, when torque is being transmitted as illustrated in FIG. 41B, or in other words, when there is relative displacement in the direction of rotation between the detected sections 39d, 40d, the positional relationship of different poles of the detected sections 39d, 40d shifts in the circumferential direction, so the direction of the magnetic flux that passes through the magnetism-detecting element becomes inclined overall with respect to the direction of sensitivity of the element. In other words, in this state, the magnetic flux density decreases by the amount of this inclination, and thus the output of the magnetism-detecting element also decreases by that amount. Here, the size of this inclination becomes larger the larger the torque (shift in the circumferential direction) is. Therefore, the output of the magnetism-detecting element becomes a maximum when torque is zero, and becomes small as the torque becomes larger.

When torque is being transmitted, the detected sections 39*d*, 40*d* rotate together with the rotary-shaft unit 6. Therefore, the output of the magnetism-detecting element has a sinusoidal shape as illustrated in FIG. 42. The size (amplitude) of this output becomes larger as the torque becomes larger. Therefore, by investigating the relationship between the size of the output and the torque beforehand, the torque can be found based on the size of the output. Moreover, the frequency (and period) of the output is a value that corresponds to the rotational speed of the rotary-shaft unit 6. Therefore, by investigating the relationship between the frequency (or period) and the rotational speed beforehand, it is possible to find the rotational speed based on the frequency (or period).

When embodying this example, when torque is not being transmitted, the location of the magnetic poles of the detected sections 39*d*, 40*d* are shifted at an electrical angle of 90 degrees with respect to the circumferential direction, or in other words, it is possible to make the center of the magnetic poles of one of the detected sections face in the radial direction the boundary between magnetic poles of the other detected section. In this case, opposite from the explanation above, the output of the magnetism-detecting element becomes a minimum when torque is not being transmitted, and becomes larger as the torque being transmitted becomes larger.

Moreover, when embodying this example, it is also possible to use a coil instead of using a magnetism-detecting element as the detecting section of the sensor 42*d* of the sensor unit 12*c*. When using a coil, the center axis of the coil is made to coincide with the radial direction of the first and second detected sections 39*d*, 40*d*. When using this kind of construction, as the detected sections 39*d*, 40*d* rotate together with the rotary-shaft unit 6, the direction and size of the magnetic flux that passes through the coil changes periodically, so the output (voltage, current) of the coil, which is the output signal of the sensor unit 12*c*, changes periodically. The frequency (and period) of this output is a value that corresponds with the rotational speed, so it is possible to find the rotational speed based on the frequency (or period). Moreover, the density of the magnetic flux that passes perpendicular to the coil changes according to the size of the torque (amount of shift in the position in the circumferential direction of the different poles of the detected sections 39*d*, 40*d*). Therefore, the size of the output of the coil changes according to the size of the torque. However, as in the case of the sensor unit 12*a* of the ninth example of an embodiment (see FIG. 25 to FIG. 28), the size of the output of the coil also changes according to the rotational speed. Therefore, as in the case of the ninth example of an embodiment, after the rotational speed is found based on the frequency (or period) of the output of the coil, correction is performed to return the size of the output that was changed due to the effect of the rotational speed to the original size. By doing so, it is possible to accurately find the torque based on the size of the output after this correction.

In this example as well, it is sufficient to install only one sensor 42*d* in the sensor unit 12*c*, so it is possible to suppress the cost of the sensor unit 12*c*. It is also possible to use construction in which the direction that the detected sections of the first and second encoders face the one sensor of the sensor unit is changed from the radial direction to the axial direction. In that case, the detected sections of the first and second encoders are a pair of circular disk-shaped detected sections that have the same radial dimensions, and are arranged so that these detected sections face each other in the axial direction. The detecting section of the one sensor of the sensor unit is arranged between these detected sections. The other construction and functions are the same as those of the first through eighth examples of embodiments.

[Thirteenth Example]

Figure 43:
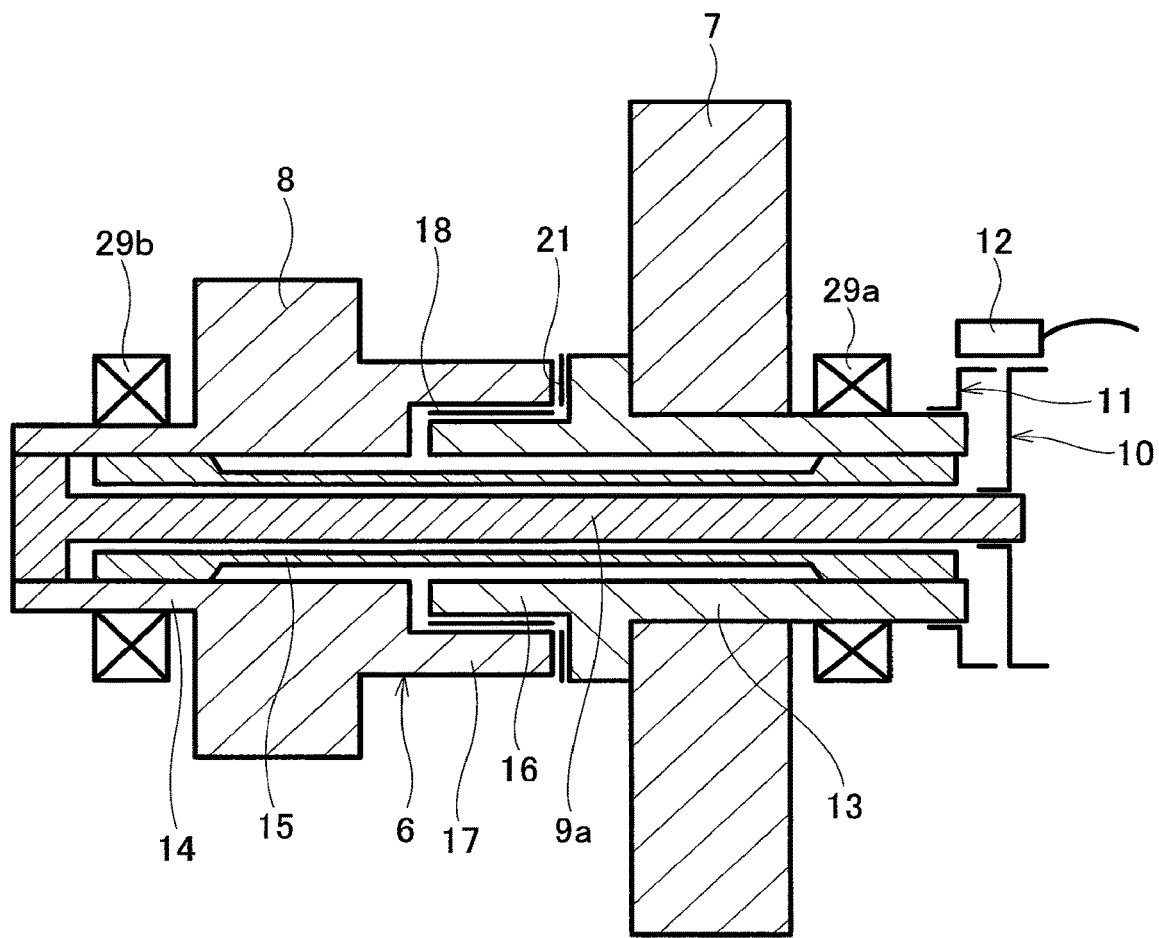
FIG. 43 is a cross-sectional view illustrating a rotation transmission device of a thirteenth example of an embodiment of the present invention.
Figure 44:
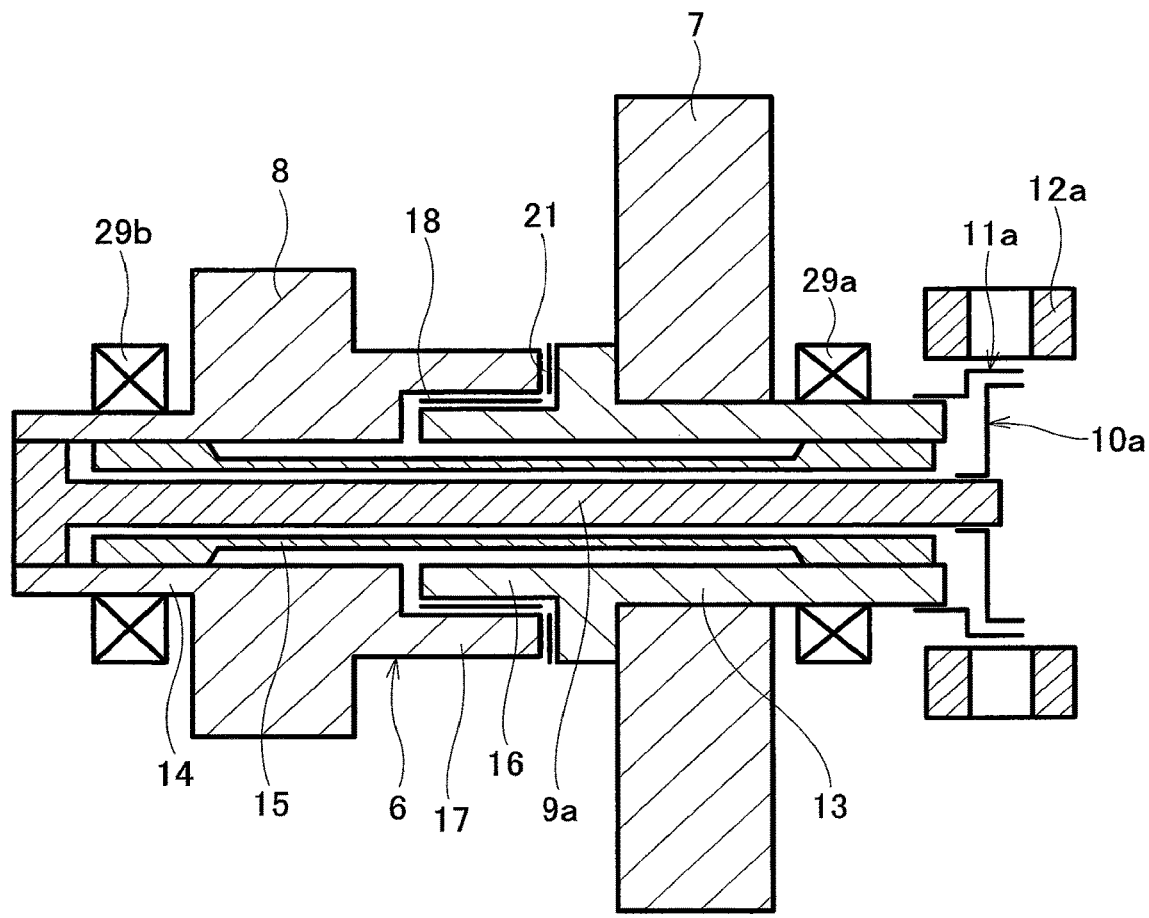
FIG. 44 is a cross-sectional view illustrating a rotation transmission device of a fourteenth example of an embodiment of the present invention.
Figure 45:
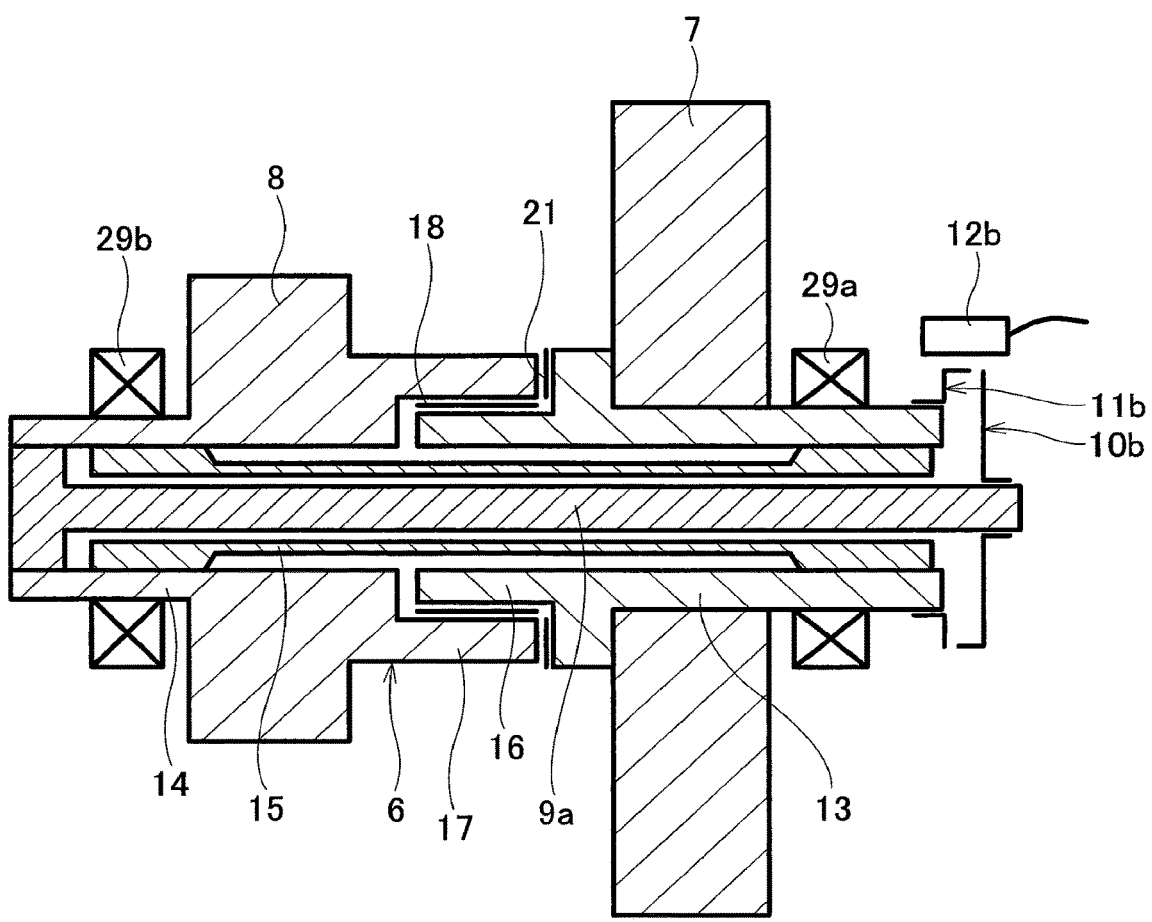
FIG. 45 is a cross-sectional view illustrating a rotation transmission device of a fifteenth example of an embodiment of the present invention.
Figure 46:
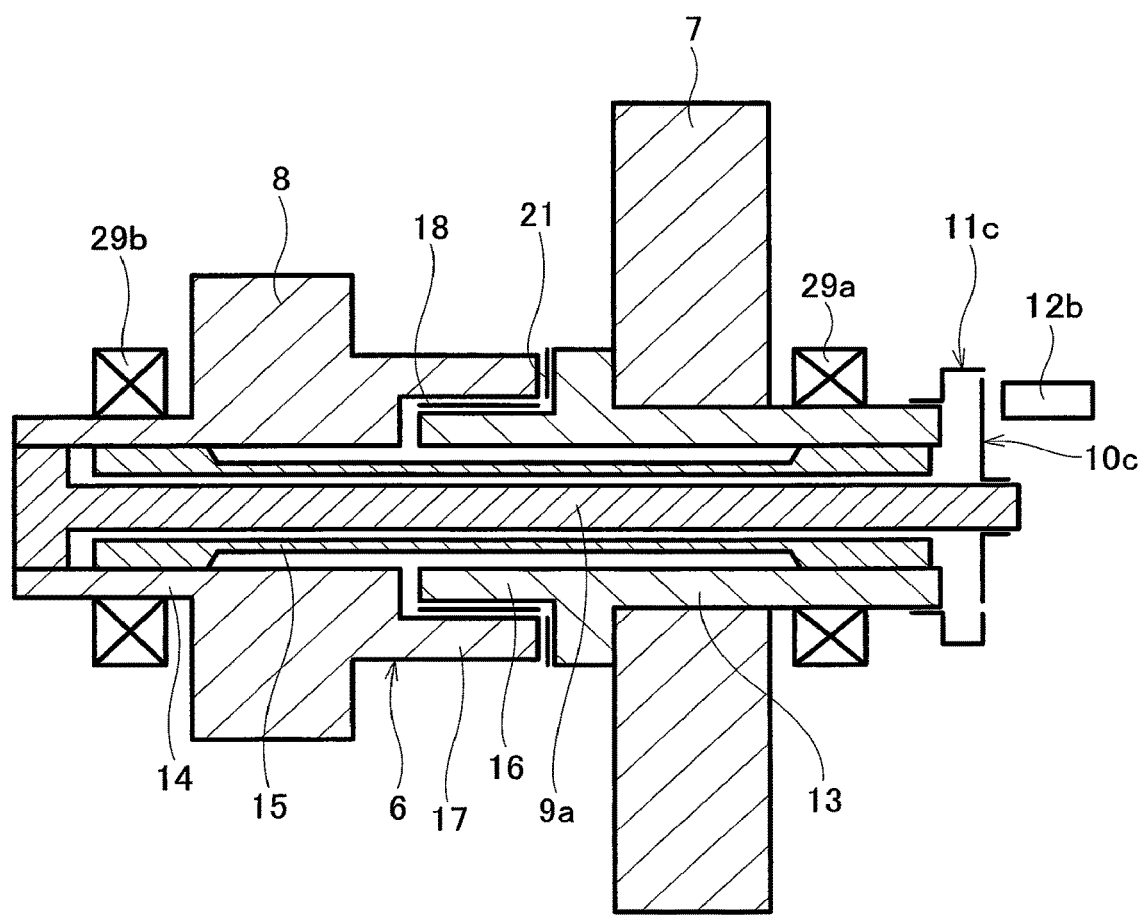
FIG. 46 is a cross-sectional view illustrating a rotation transmission device of a sixteenth example of an embodiment of the present invention.
Figure 47:
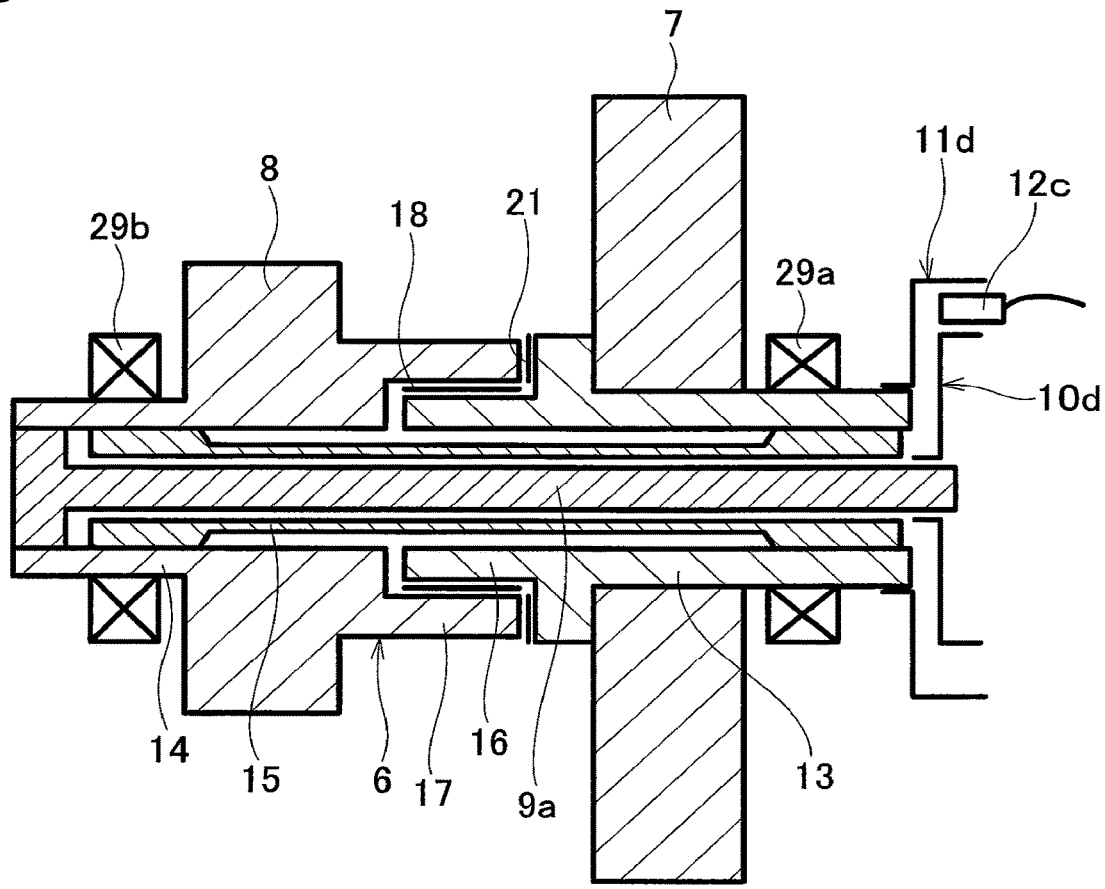
FIG. 47 is a cross-sectional view illustrating a rotation transmission device of a seventeenth example of an embodiment of the present invention.

FIG. 43 illustrates a thirteenth example of an embodiment of the present invention. In this example, the first and second encoders 10, 11 and the sensor unit 12 are arranged so as to be concentrated around one end section of the input shaft 13. More specifically, the outer-circumferential surface of the other end section (left-end section in FIG. 43 of the coupling shaft 9*a* that is arranged on the inner-diameter side of the torsion bar 15 is connected to the inner-circumferential surface of the other end section of the output shaft 14 by an involute spline connection or key connection so that relative rotation is not possible. Moreover, a retaining ring (not illustrated in the figure) is used to prevent displacement in the axial direction of the coupling shaft 9*a* with respect to the output shaft 14. On the other hand, one end section of the coupling shaft 9*a* (right-end section in FIG. 43) protrudes from an opening on the one end side of the input shaft 13. The first encoder is fastened around the outside of the one-end section of the coupling shaft 9*a*, and the second encoder is fastened around the outside of the one end section of the input shaft 13. Moreover, with the detecting section of a pair of sensors of the sensor unit 12 facing the detected sections of these encoders 10, 11, the sensor unit 12 is supported by the housing (not illustrated in the figure). FIG. 43 is a simplified drawing, and part of the drawing and reference numbers are omitted. The other construction and functions are the same as those of the first example of an embodiment.

[Fourteenth to Seventeenth Examples]

FIG. 44 to FIG. 47 illustrate fourteenth to seventeenth examples of embodiments of the present invention. In these examples, the arrangement of the thirteenth example of an embodiment is applied to the construction of the ninth to twelfth examples of embodiments, and the first and second encoders 10*a* to 10*d*, 11*a* to 11*d* and the sensor units 12*a* to 12*d* are arranged so as to be concentrated around one end of the input shaft 13. FIG. 44 to FIG. 47 are simplified drawings, and part of the drawing and reference numbers are omitted. The other construction and functions are the same as those of the ninth to twelfth examples and thirteenth example of embodiments.

[Eighteenth and Nineteenth Examples]

Figure 48:
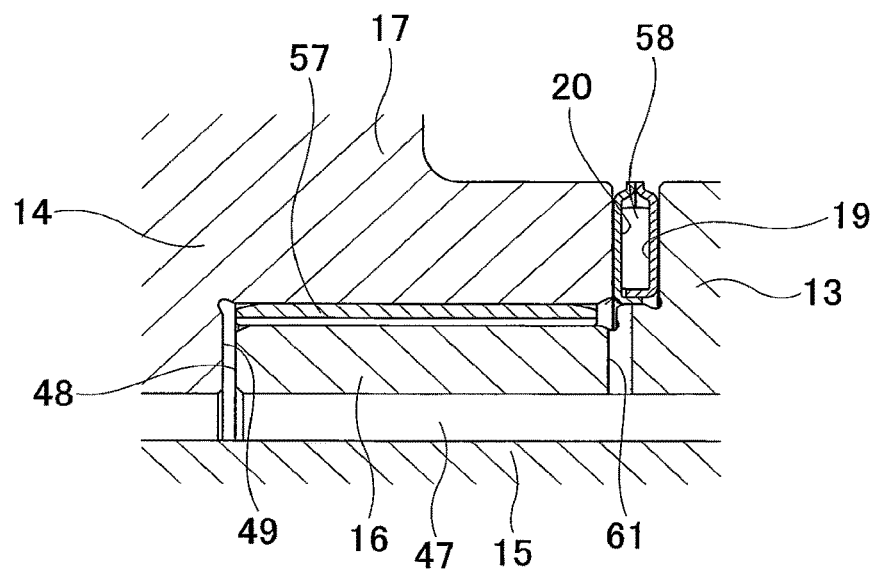
FIG. 48 is an enlarged view illustrating the section where the end sections of the input shaft and output shaft of a rotation transmission device of an eighteenth example of the present invention are combined together.
Figure 49:
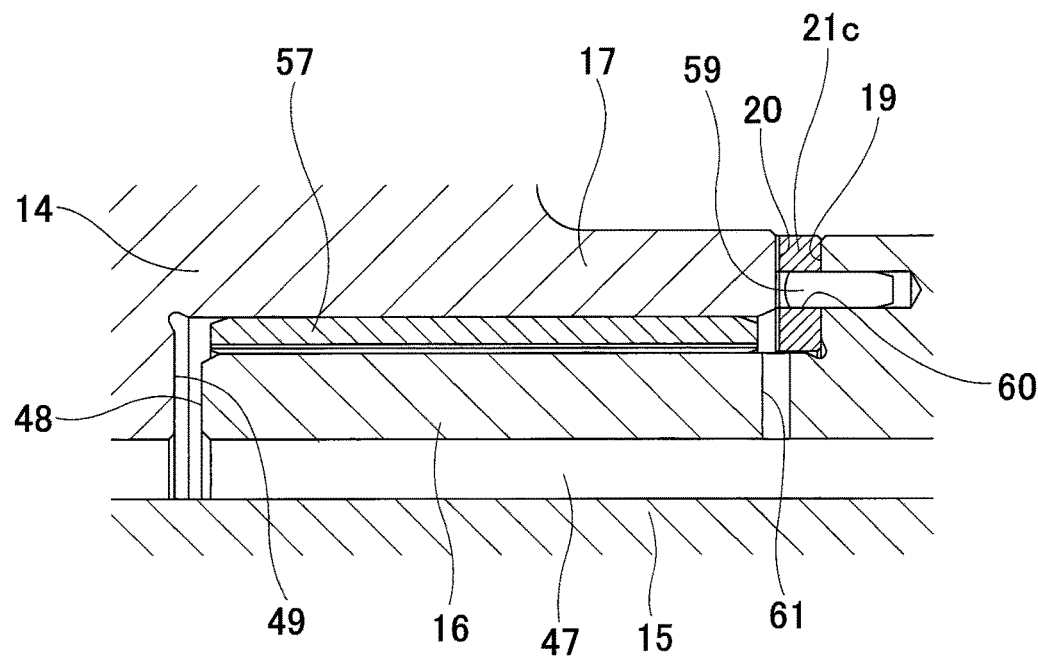
FIG. 49 is an enlarged view illustrating the section where the end sections of the input shaft and output shaft of a rotation transmission device of a nineteenth example of the present invention are combined together.

FIG. 48 and FIG. 49 illustrate eighteenth and nineteenth examples of embodiments of the present invention. In the construction of an eighteenth example of an embodiment illustrated in FIG. 48, in regard to the combination section of the end sections of the input shaft 13 and the output shaft 14, of the radial bearing and thrust bearing that are installed in this combination section, the radial bearing is a cylindrical sleeve bearing 57, which is a radial sliding bearing, and the thrust bearing is a thrust needle bearing 58. The thrust needle bearing 58 is fastened around the outside of the base-end section of the input-side combination cylindrical section 16 so that there is no large looseness in the radial direction, and as a result, the position of thrust needle bearing 58 is set in the radial direction.

On the other hand, in the construction of the nineteenth example of an embodiment illustrated in FIG. 49, the radial bearing and thrust bearing that are installed in the combination section of the input shaft 13 and output shaft 14 are a cylindrical shaped sleeve bearing 57 and a circular disk-shaped thrust washer 21c. By fastening the thrust washer 21c around the outside of the base-end section of the input-side combination cylindrical section 16 so that there is no large looseness in the radial direction, the position of the thrust washer 21c is set in the radial direction. Moreover, the thrust washer 21c is such that by fitting a pin 59 that is embedded in the stepped surface 19 in an engagement hole 60 that is formed in part of the thrust washer 21c itself, the position in the circumferential direction of the thrust washer 21c is set.

In either case, an oil passage 61 is formed in the base-end section of the input-side combination cylindrical section 16. Lubrication oil can be supplied though this oil passage 61 from a cylindrical space 47 to the space where the radial bearing is installed and the space where the thrust bearing is installed, which improves the lubrication of these bearings. The other construction and functions are the same as those of the first through eighteenth examples of embodiments.

[Twentieth Example]

Figure 50:
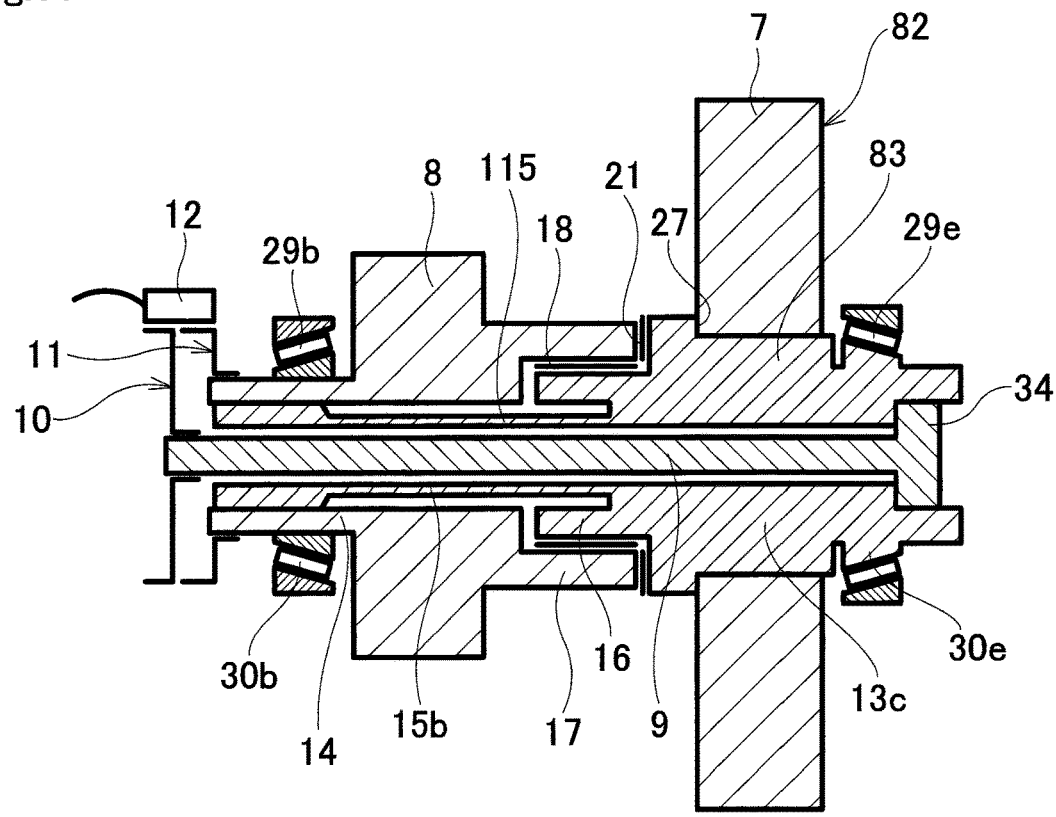
FIG. 50 is a cross-sectional view illustrating a rotation transmission device of a twentieth example of an embodiment of the present invention.

FIG. 50 illustrates a twentieth example of an embodiment of the present invention. A feature of the rotation transmission device of this example the reduction in manufacturing cost by integrating part of the members of this device. In other words, an input-side rotating body 82 is constructed by fastening an input gear 7 around the outside of the middle section in the axial direction of an input-side unit 83 so as to be concentric with the input-side unit 83, and so as to be able to rotate in synchronization with the input-side unit 83. Moreover, the input-side unit 83 is an integrally formed part that is formed by integrating together an input shaft 13c, an inner ring 30e of a conical roller bearing 29e that supports the input shaft 13c so as to be able to freely rotate with respect to the housing, and a torsion bar 15b. The input-side unit 83 is such that a stepped surface 27 that faces one end side in the axial direction of the input shaft 13c is provided around the outer-circumferential surface of the middle section in the axial direction. The input-side unit 83 is made by performing plastic working such as forging or by cutting a metal material such as a chromium steel like SCr420 or SCM420, or a chromium molybdenum steel such as SCM420 or the like, and then performing heat treatment such as carburizing or carbo-nitriding.

Moreover, the input gear 7 is positioned in the axial direction with respect to the input-side unit 83 by the portion near the inner circumference of one side surface (left side surface of FIG. 50) coming in contact with the stepped surface 27. In this state, the input gear 7 is prevented from displacing in the axial direction with respect to the input-side unit 83 by a retaining ring engaging with a portion on the outer-circumferential surface of the input-side unit 83 that comes in contact with the one end side in the axial direction of the input gear 7. In this example, the inner-diameter dimension of the input gear 7 is larger than the outer-diameter dimension of the inner ring 30e. As a result, input gear 7 is able to pass over the inner ring 30e when installing the input gear 7 in the input-side unit 83 or removing the input gear from the input-side unit 83.

In this example, the input shaft 13c, the inner ring 30e of the conical roller bearing 29e that supports the input shaft so as to be able to freely rotate with respect to the housing, and the torsion bar 15b are integrally formed, so it is possible to suppress the cost of managing parts and the assembly cost. Furthermore, there is no need for parts such as the retaining ring 25a, spacer 31, nut 32a and the like that are used for assembling the members 13c, 30e, 15b so as not to separate from each other; and from this aspect as well, it is possible to suppress the cost of managing parts. As a result, it is possible to reduce the manufacturing cost of the rotation transmission device.

When embodying this example, it is also possible to integrally form an output shaft 14, and an inner ring 30b of a conical roller bearing 29b that supports the output shaft 14 so as to rotate freely with respect to the housing. As a result, it is possible to further suppress the cost of managing parts and the assembly cost, and thus it is possible to further reduce the manufacturing cost of the rotation transmission device. The other construction and functions are the same as those of the first through nineteenth examples of embodiments.

[Twenty-first Example]

Figure 51:
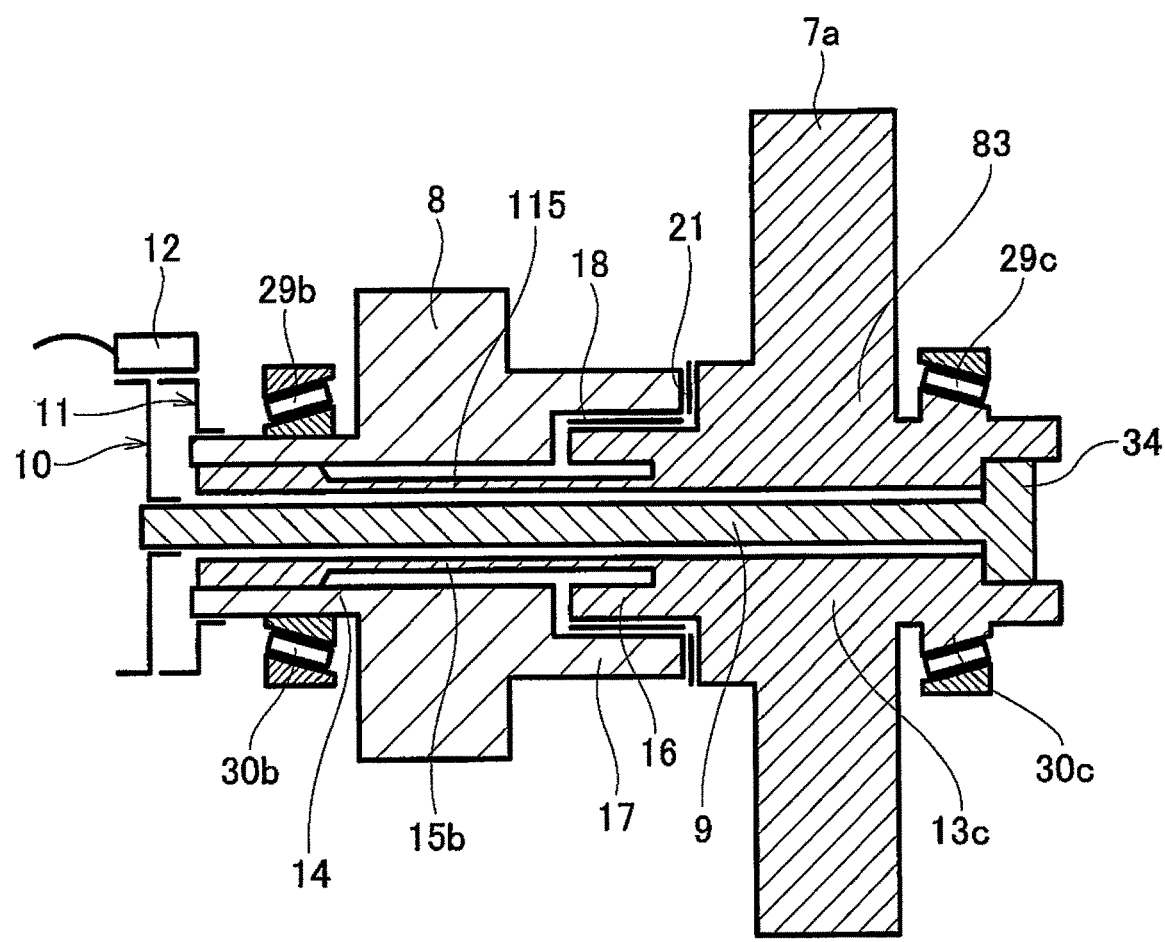
FIG. 51 is a cross-sectional view illustrating a rotation transmission device of a twenty-first example of an embodiment of the present invention.

FIG. 51 illustrates a twenty-first example of an embodiment of the present invention. In this example, in addition to the inner ring 30e, input shaft 13c and torsion bar 15b, the input gear 7a is also integrally formed. Therefore, the input gear 7a does not need to be formed as an independent part, and thus it is possible to eliminate parts such as the retaining ring for preventing the input gear 7a from displacing in the axial direction with respect to the input shaft 13c. Consequently, it is possible to suppress the cost for managing parts and the assembly cost by that amount, and thus it is also possible to further reduce the manufacturing cost of the rotation transmission device. The other construction and functions are the same as those of the twentieth example of an embodiment.

[Twenty-second Example]

Figure 52:
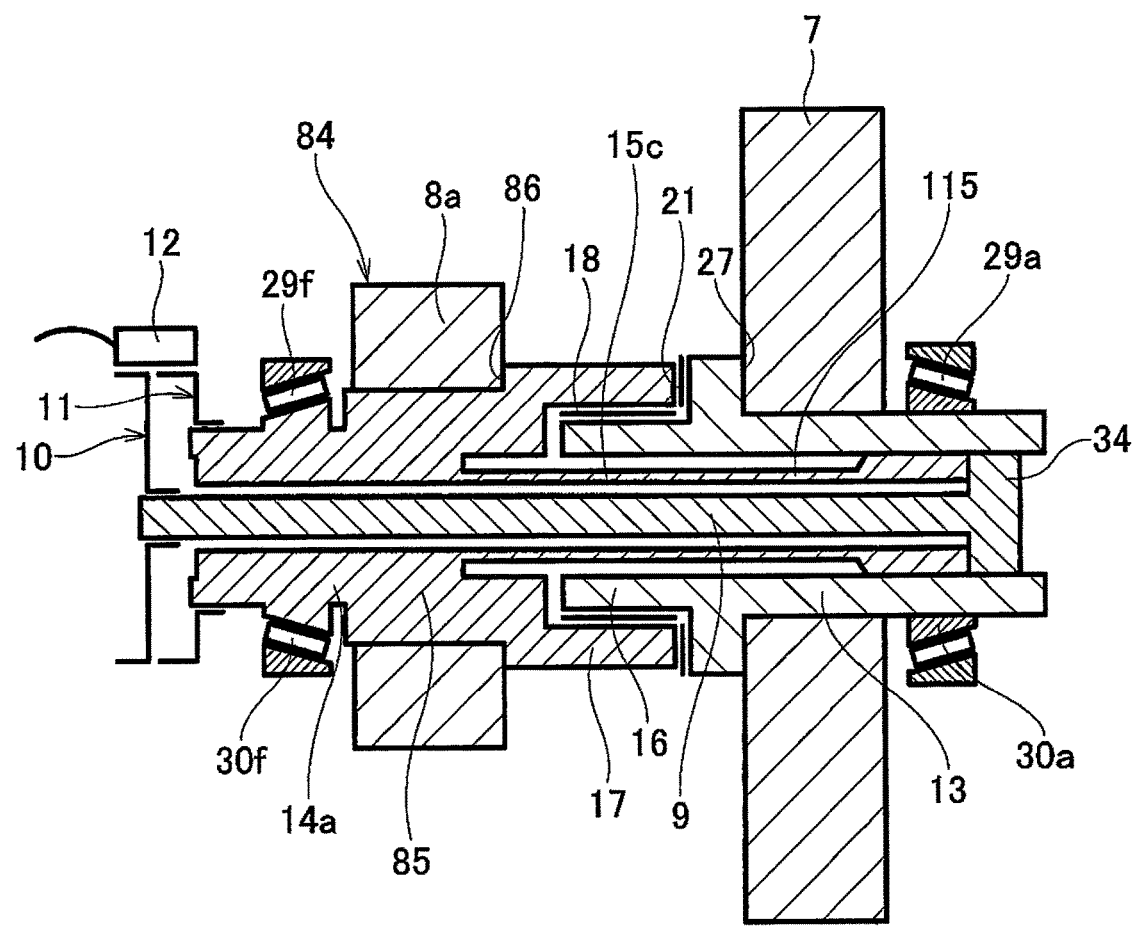
FIG. 52 is a cross-sectional view illustrating a rotation transmission device of a twenty-second example of an embodiment of the present invention.

FIG. 52 illustrates a twenty-second example of an embodiment of the present invention. In this example, an output-side rotating body 84 is formed by fastening an output gear 8a around the outside of the middle section in the axial direction of an output-side unit 85 so as to be concentric with the output-side unit 85, and so as to be able to rotate in synchronization with the output-side unit 85. The output-side unit 85 is an integrally formed part by integrally forming an output shaft 14a, an inner ring 30f of a conical roller bearing 29f that supports the output shaft 14a so as to rotate freely with respect to a housing, and a torsion bar 15c. The output-side unit 85 is such that a stepped surface 86 that faces toward the other end side in the axial direction of the output shaft 14a is provided around the outer-circumferential surface of the middle section in the axial direction. The output-side unit 85 is made by performing plastic working such as forging or by cutting a metal material such as a chromium steel like SCr420 or SCM420, or a chromium molybdenum steel such as SCM420 or the like, and then performing heat treatment such as carburizing or carbo-nitriding.

The output gear 8a is positioned in the axial direction with respect to the output-side unit 85 by one side surface (right side surface in FIG. 52) of the output gear 8a coming in contact with the stepped surface 86. In this state, the output gear 8a is prevented from displacement in the axial direction with respect to the output-side unit 85 by a retaining ring or the like engaging with a portion on the outer-circumferential surface of the output-side unit 85 that is in contact with the other side in the axial direction of the output gear 8a. The inner-diameter dimension of the output gear 8a is larger than the outer-diameter dimension of the inner ring 30d, so it is possible to pass the outer gear 8a in the axial direction over the inner ring 30f when installing the outer gear 8a in the output-side unit 85 or removing the output gear 8a from the output-side unit 85.

In this example, the output shaft 14a, the inner ring 30f of the conical roller bearing 29f and the torsion bar 15c are integrally formed, so it is possible to suppress the cost of managing parts and assembly costs. Furthermore, there is no need for parts such as a retaining ring 25b and nut 32b that are used for assembling these members 14a, 30f, 15c so as not to separate from each other, and so from this aspect as well, it is possible to suppress the cost of managing parts. Therefore, it is possible to reduce the manufacturing cost of the rotation transmission device.

When embodying this example as well, it is also possible to integrate the input shaft 13, and inner ring 30a of the conical bearing 29a that supports the input shaft 13 so as to rotate freely with respect to the housing. In that case, it is necessary to make the inner-diameter dimension of the input gear 7 larger than the outer-diameter dimension of the inner ring 30a so that the input gear 7 is able to pass in the axial direction over the inner ring 30a when installing or removing the input gear 7. By integrating the input shaft 13 and inner ring 30a, it is possible to further suppress the cost of managing parts and assembly costs, and thus it is possible to further reduce the manufacturing cost of the rotation transmission device with torque measurement device. In addition to the input shaft 13 and inner ring 30a, it is also possible to integrate the input gear 7. The other construction and functions are the same as those of the first through nineteenth examples of embodiments.

[Twenty-third Example]

Figure 53:
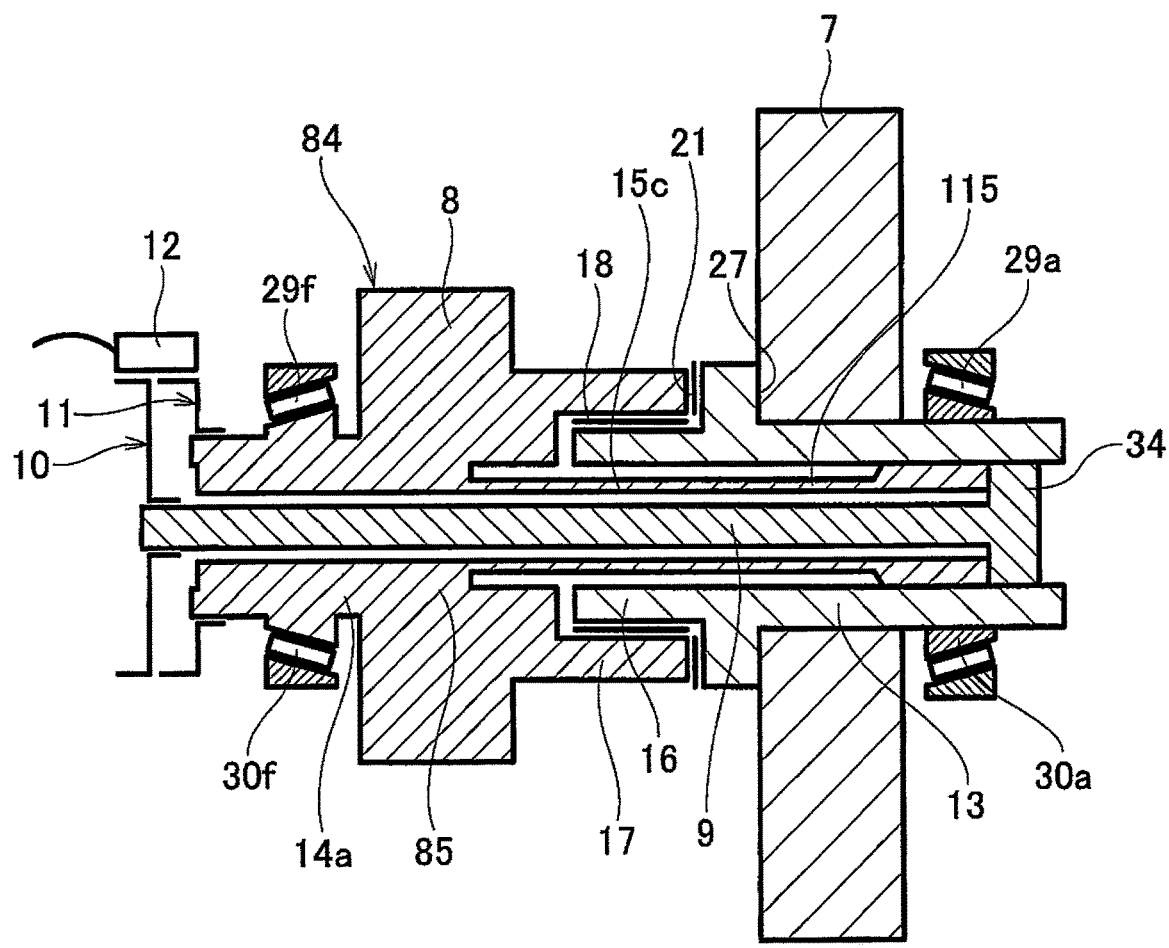
FIG. 53 is a cross-sectional view illustrating a rotation transmission device of a twenty-third example of an embodiment of the present invention.

FIG. 53 illustrates a twenty-third example of an embodiment of the present invention. In this example, in addition to the inner ring 30f, the output shaft 14a and torsion bar 15c, the output gear 8 is also integrally formed. Therefore, there is no need to form the output gear 8 as an independent part, and it is possible to eliminate installing parts for preventing the output gear 8 from displacing in the axial direction with respect to the output shaft 14c. Consequently, it is possible to suppress the cost of managing parts and the assembly cost, and to further reduce the manufacturing cost of the rotation transmission device by that amount. The other construction and functions are the same as those of the twenty-second example of an embodiment.

[Twenty-fourth Example]

Figure 54:
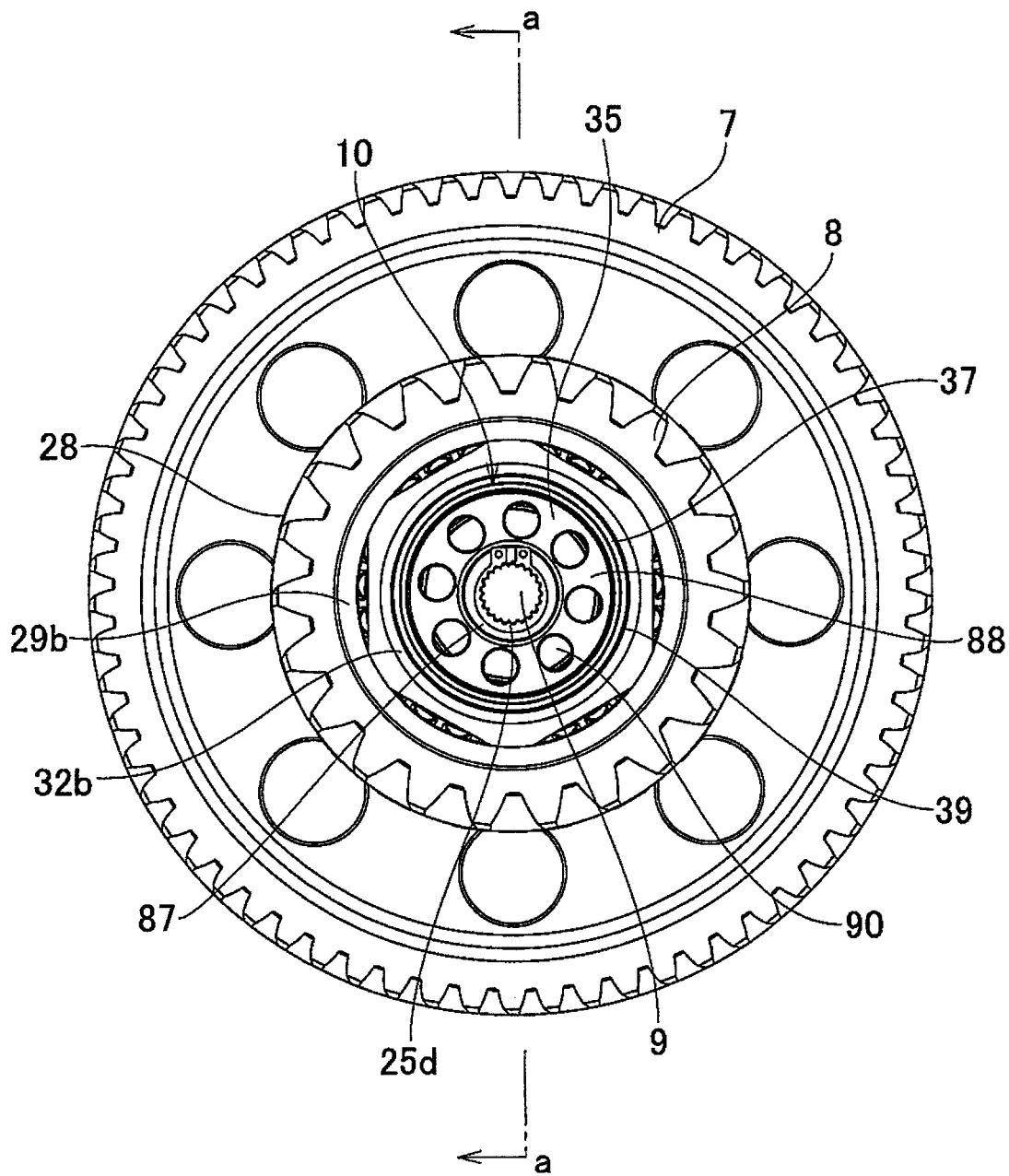
FIG. 54 is a cross-sectional view illustrating a rotation transmission device of a twenty-fourth example of an embodiment of the present invention.
Figure 55:
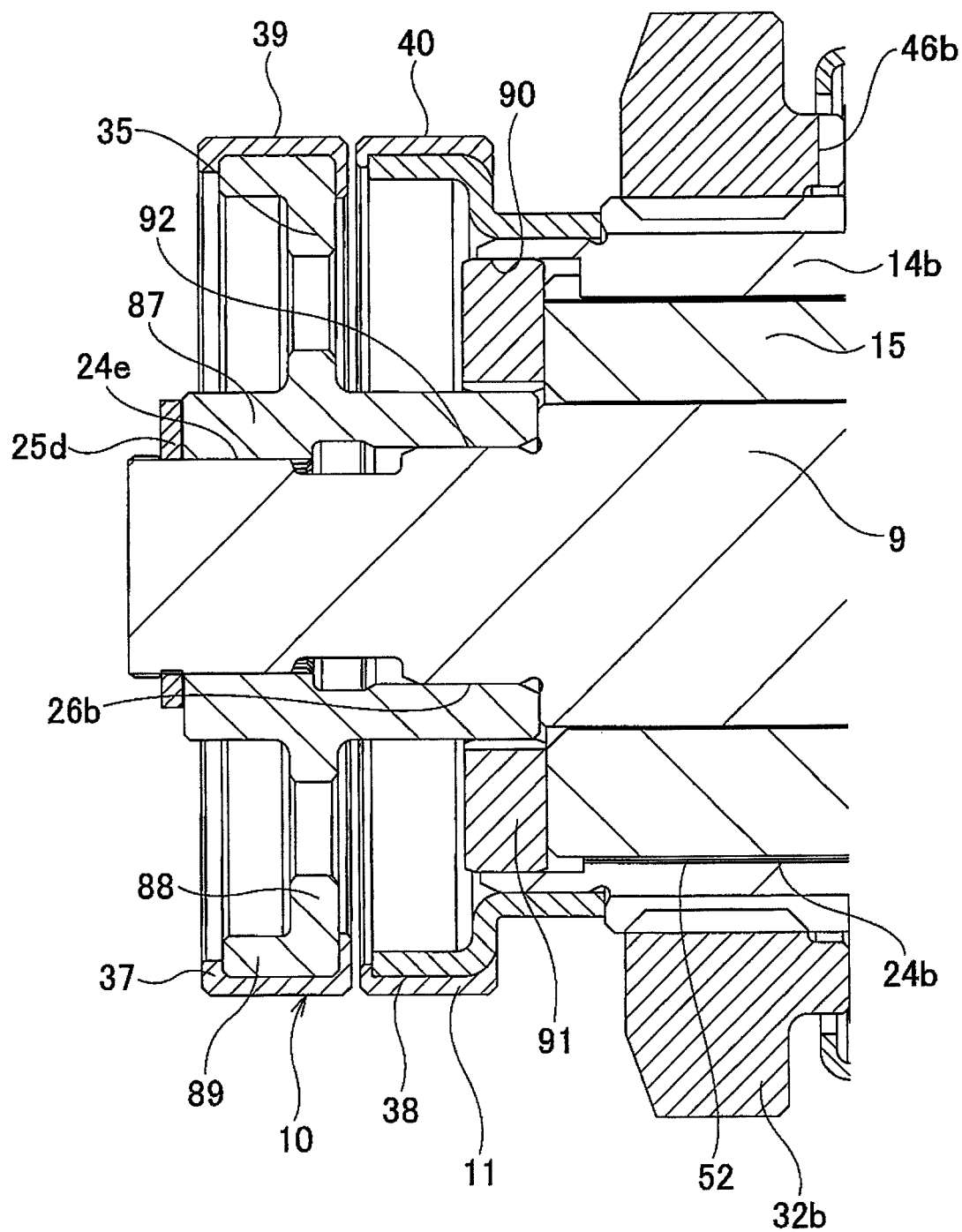
FIG. 55 is an enlarged cross-sectional view of the other end section of the rotation transmission device illustrated in FIG. 54.

FIG. 54 and FIG. 55 illustrate a twenty-fourth example of an embodiment of the present invention. In this example, the amount of run-out of the first encoder 10 with respect to the second encoder 11 that is associated with error in the torque measurement is kept small by improving the concentricity of the centers of rotation of the first and second encoders 10, 11. In this example as well, the first encoder 10 is concentrically fastened around the other end section of the coupling shaft 9. The first encoder has a metal core 35 made of a magnetic metal, and a permanent magnet 37. The metal core 35 includes: a cylindrical shaped fitting cylindrical section 87 that fits onto the coupling shaft 9; an outward-facing flange shaped wheel section 88 that is provided around the middle section in the axial direction of the fitting cylindrical section 87; and a cylindrical section 89 that is provided in a direction toward one end side in the axial direction of the coupling shaft 9 from the outer-circumferential edge of the cylindrical section 89. Moreover, the permanent magnet 37 is fastened around the entire outer-circumferential surface of the cylindrical section 89.

In this example, a sliding bearing 91 that is made of a material that slides easily such as oil-impregnated metal, synthetic resin or the like is provided between a large-diameter section 90 that is provided on the outer-circumferential surface of the other end section of the output shaft 14b and the outer-circumferential surface of one end section (right-end section in FIG. 55) of the fitting cylindrical section 87. More specifically, first, the coupling shaft 9 is supported by the input shaft 13 by connecting the outer-circumferential surface of a rim section 34 that is formed on one end section of the coupling shaft 9 and the inner-circumferential surface of one end section of the input shaft 13 by an involute spline connection 24d. In this state, the rim section 34 is held on both sides in the axial direction by a pair of retaining rings 25a, 25c that are fastened around the inner-circumferential surface of the input shaft 13, which prevents the coupling shaft 9 from displacing in the axial direction with respect to the input shaft 13. Next, the hollow cylindrical shaped torsion bar 15 is inserted into the inner-diameter sides of the input shaft 13 and output shaft 14b from the opening on the other end side of the output shaft 14b. Then an involute spline connection 24a is formed by connecting a first male involute spline section 62 that is provided on the outer-circumferential surface of one end section of the torsion bar 15 with a first female involute spline section 63 that is provided on the inner-circumferential surface of one end section of the input shaft 13, and an involute connection 24b is formed by connecting a second male involute spline section 64 that is provided on the outer-circumferential surface of the other end section of the torsion bar 15 with a second female spline section 65 that is provided on the inner-circumferential surface of the other end section of the output shaft 14b. As a result, the torsion bar 15 is supported on the inner-diameter side of the input shaft 13 and output shaft 14b. Next, the sliding bearing 91 is pressure fitted into the large-diameter section of the output shaft 14b, and one side surface (right-side surface in FIG. 55) of the sliding bearing 91 is pressed against the other end surface of the torsion bar 15. By doing so, the torsion bar 15 is held on both sides in the axial direction between the retaining ring 25a and sliding bearing 91, which prevents the torsion bat 15 from displacing in the axial direction with respect to the input shaft 13 and the output shaft 14b. Next, by fastening the metal core 36 of the second encoder 11 around the outside of the other end section of the output shaft 14b, the second encoder 11 is supported by the output shaft 14b so as to be concentric with the output shaft 14b, and so as to rotate in synchronization with the output shaft 14b. Next, an involute connection 24e for preventing the relative rotation with respect to a cylindrical surface connecting connection 26b for maintaining concentricity is formed by fastening the fitting cylindrical section 87 of the metal core 35 of the first encoder 10 onto a small-diameter section 92 that is provided on the other end section of the coupling shaft 9, and a retaining ring 25d prevents the metal core 35 from displacing in the axial direction. As a result, the first encoder 10 is fastened to and supported by the input shaft 13 by way of the coupling shaft 9 so as to be concentric with the input shaft 13, and so as to be able to rotate in synchronization with the input shaft 13, and the outer-circumferential surface of one end section (right-end section in FIG. 55) of the fitting cylindrical section 87 is made to slide over or closely face the inner-circumferential surface of the sliding bearing.

The procedure for assembling the rotation transmission device of this example is not limited to the procedure described above. In other words, it is also possible to insert the coupling shaft 9 into the inner-diameter side of the torsion bar 15 after the torsion bar 15 is supported on the inner-diameter side of the input shaft 13 and output shaft 14b, or it is also possible to pressure fit the sliding bearing 91 into the other end section of the output shaft 14b and then support the torsion bar 15 with the rim section 34 of the coupling shaft 9 prevented from displacement in the axial direction with respect to the input shaft 13 by the pair of retaining ring 25a, 25c.

Moreover, it is also possible to cause the outer-circumferential surface of the sliding bearing 91 to slide over or closely face the large-diameter section 90 of the output shaft 14b by pressure fitting the sliding bearing 91 onto the outer-circumferential surface of one end section of the fitting cylindrical section 87 of the metal core 35 of the first encoder 10.

In this example, a sliding bearing 91 is provided between the large-diameter section 90 that is provided on the inner-circumferential surface of the other end section of the output shaft 14b and the outer-circumferential surface of one end section of the fitting cylindrical section 87 of the metal core 35 of the first encoder 10, so it is possible to keep the amount of run-out of the first encoder 10 with respect to the second encoder 11 that is associated with the error in torque measurement small. In other words, the inner-circumferential surface of the sliding bearing 91 that is pressure fitted into the large-diameter section 90 is made to slide over or closely face the outer-circumferential surface of the fitting cylindrical section 87 that is fastened around the outside of the other end section of the coupling shaft 9, so it is possible to improve the concentricity between the center of rotation of the first encoder 10 that is fastened to and supported by the other end section of the coupling shaft 9 and the center of rotation of the second encoder 11 that is fastened to and supported by the output shaft 14b. As a result, it is possible to keep the amount of run-out of the first encoder 10 with respect to the second encoder 11 small.

In this example, one side surface of the sliding bearing 91 that is pressure fitted into the large-diameter section 90 of the output shaft 14b is pressed against the other end surface of the torsion bar 15. Therefore, when compared with the case when the torsion bar 15 is held on both sides in the axial direction by retaining rings 25a, 25b that are fastened around the inner-circumferential surfaces of the input shaft 13 and output shaft 14 (14a) (see FIG. 6), it is possible to effectively prevent looseness in the axial direction of the torsion bar 15 with respect to the input shaft 13 and output shaft 14b. Moreover, it is not necessary to provide a fastening groove for fastening the retaining ring 25b (see FIG. 5 and FIG. 6) in the inner-circumferential surface of the other end section of the output shaft 14b, so it is possible to shorten the dimension in the axial direction of the output shaft 14b, and thus it is possible to make the rotation transmission device more compact and lightweight.

[Twenty-fifth Example]

Figure 56:
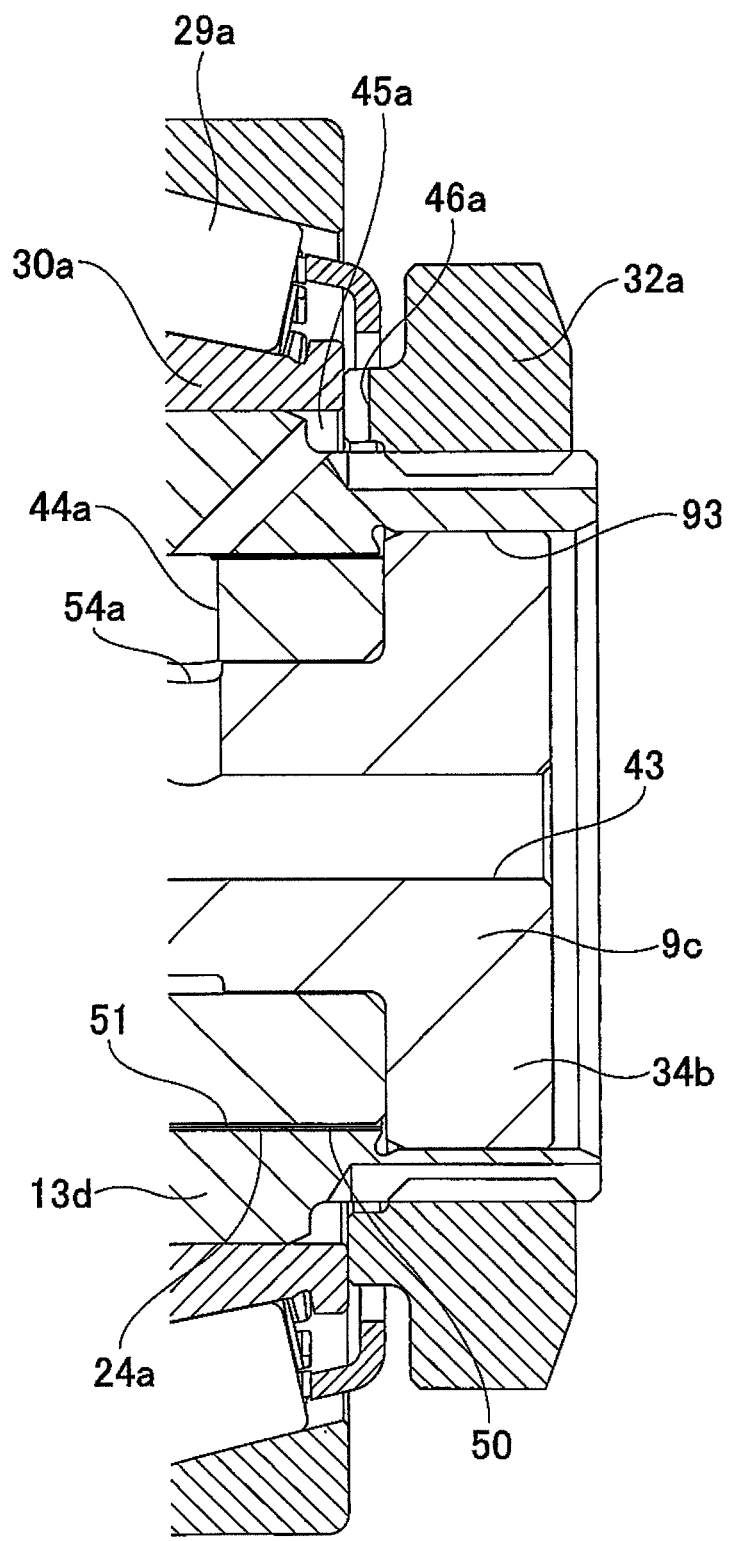
FIG. 56 is an enlarged cross-sectional view illustrating one end section of a rotation transmission device of a twenty-fifth example of an embodiment of the present invention.
Figure 58:
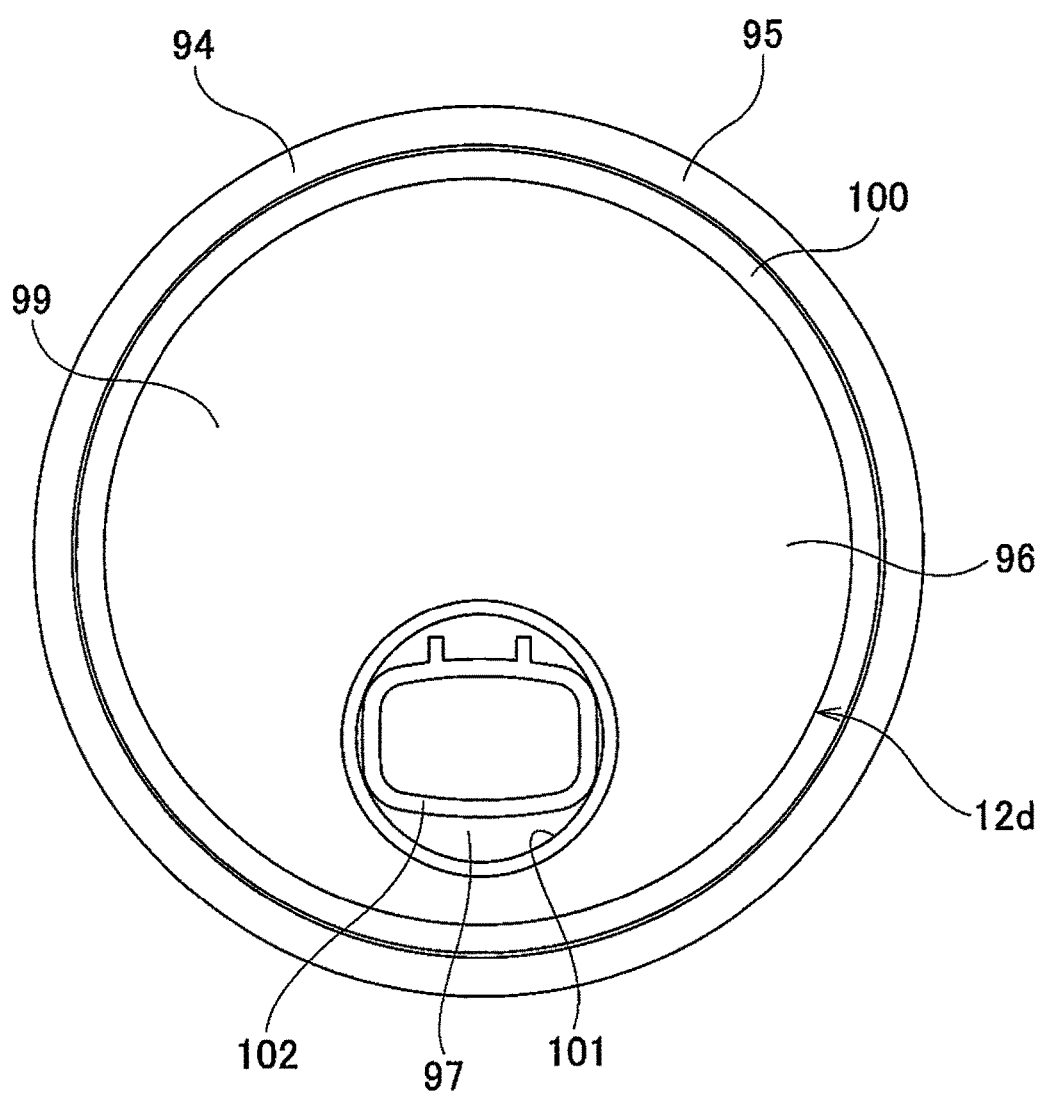
FIG. 58 is an end view of the other end section of the rotation transmission device illustrated in FIG. 57.

FIG. 58 illustrates a twenty-fifth example of an embodiment of the present invention. A feature of this example, and in the twenty-fourth example of an embodiment, is to keep the amount of run-out of the first encoder 10 with respect to the second encoder 11 that is associated with error in torque measurement small by improving the concentricity of the centers of rotation of the first and second encoders 10, 11. In this example, the coupling shaft 9c is supported by the input shaft 13d so as to be concentric with the input shaft 13d and so as to rotate in synchronization with the input shaft 13d by pressure fitting an outward-facing flange shaped rim section 34b that is formed around the outer-circumferential surface of one end section of the coupling shaft 9c into a large-diameter section 93 that is provided around the inner-circumferential surface of one end section of the input shaft 13d. Then, the other side surface (right-side surface in FIG. 56) of the rim section 34b is pressed against one end surface (right-end surface in FIG. 56) of the torsion bar 15, directly, or in other words, not by way of another member.

In this example, the coupling shaft 9c is supported by the input shaft 13d by pressure fitting the rim section 34b of the coupling shaft 9c into the large-diameter section of the input shaft 13d. Therefore, when compared with the case of supporting the coupling shaft 9 by the input shaft by way of the involute spline connection 24a, it is possible to improve the concentricity of not only the center axis of the coupling shaft 9a and the center axis of the input shaft 13a, but the center axis of the output shaft 14 as well. As a result, it is possible to further improve the concentricity of the centers of rotation of the first and second encoders 10, 11, and thus it is possible to keep the amount of run-out of the first encoder 10 with respect to the second encoder 11 that is associated with error in torque measurement small.

Moreover, in this example, the other side surface of the rim section 34b that is pressure fitted into the large-diameter section 93 of the input shaft 13d is pressed against one end surface of the torsion bar 15. Therefore, compared with the case of holding the torsion bar 15 on both sides in the axial direction by the retaining rings 25a, 25b that are fastened around the inner-circumferential surfaces of the input shaft 13 and output shaft 14, it is possible to effectively prevent looseness in the axial direction of the torsion bar 15 with respect to the input shaft 13a and output shaft 14. Furthermore, there is no need to provide fastening grooves around the inner-circumferential surface of the other end section of the input shaft 13a for fastening the retaining ring 25a, 25c, so it is possible to shorten the dimension in the axial direction of the input shaft 13d, and thus it is possible to make the rotation transmission device more compact and lightweight. The twenty-fourth example and twenty-fifth example of embodiments can be embodied at the same time

[Twenty-sixth Example]

Figure 57:
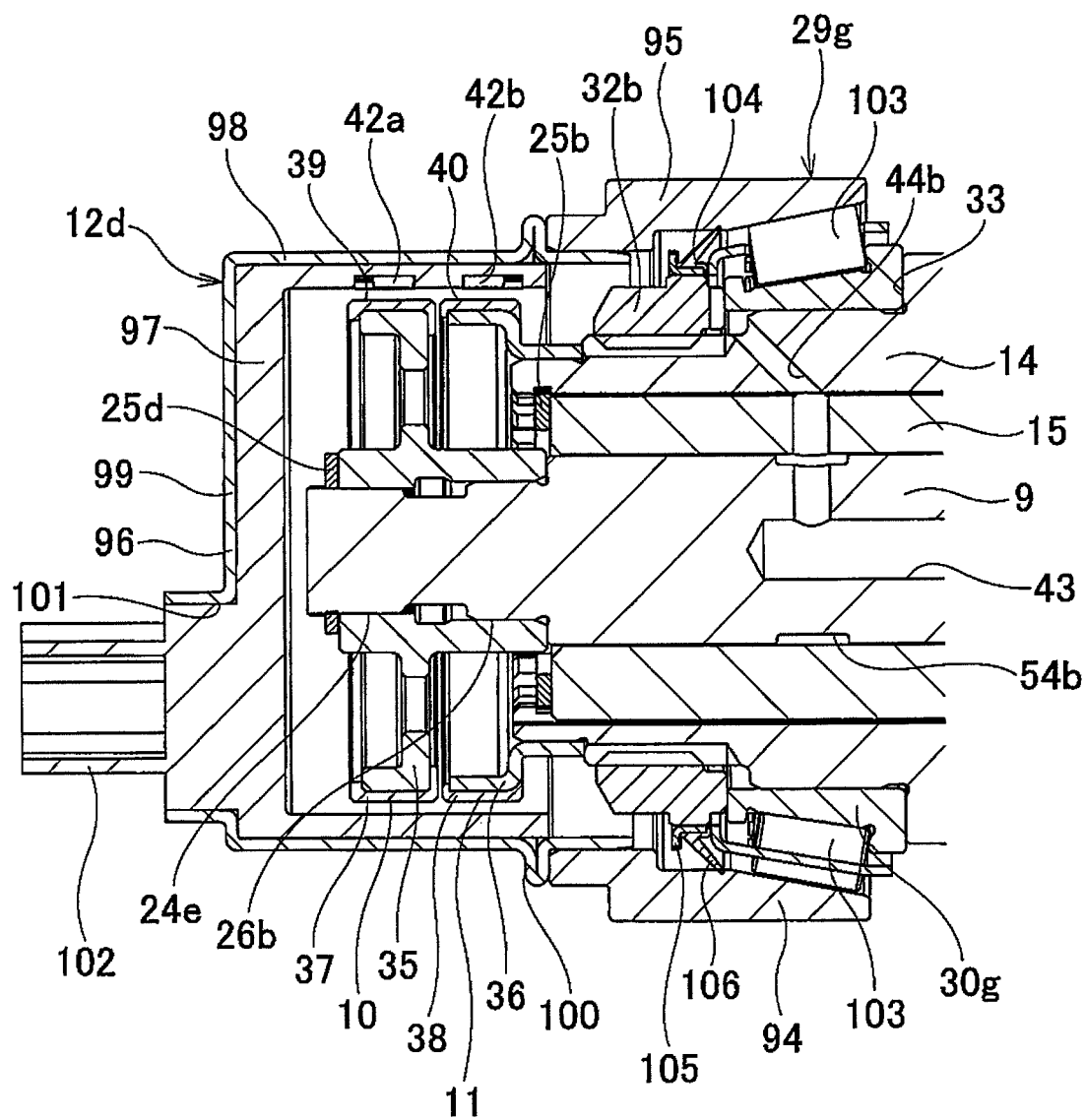
FIG. 57 is an enlarged cross-sectional view illustrating the other end section of a rotation transmission device of a twenty-sixth example of an embodiment of the present invention.

FIG. 57 and FIG. 58 illustrate a twenty-sixth example of an embodiment of the present invention. In this example, the construction of the sensor unit 12d, and the construction for supporting the sensor unit 12 by the housing (not illustrated in the figures) is devised in order to simplify positioning of the sensor unit 12d with respect to the first and second encoders 10, 11, and to improve the reliability of the torque measurement.

In this example, the output shaft 14 is supported by a conical roller bearing 29g that is located between a portion near the other end (left end in FIG. 57) of the outer-circumferential surface of the output shaft 14 and the inner-circumferential surface of the housing so as to rotate freely with respect to the housing. However, the half of the outer ring 94 of the conical roller bearing 29g near the other end side in the axial direction functions as an extended cylindrical section 95 that protrudes further in the axial direction than the end section on the small-diameter side of the inner ring 30g of the conical roller bearing 29g. The inner-circumferential surface of the extended cylindrical section 95 is screwed onto the other end section of the outer-circumferential surface of the output shaft 14 and tightened so as to face the outer-circumferential surface of a nut 32b.

In this example, the sensor unit 12 includes a sensor cover 96, a sensor holder 97, and a first and second sensor 42a, 42b. The sensor cover 96 is formed using metal sheet into a cylindrical shape with a bottom, and includes a cover cylinder section 98 and a cover bottom plate section 99 that covers the opening on the base end of the cover cylinder section 98. Moreover, an outward-facing flange shaped rim section 100 is provided on the portion near the tip end of the outer-circumferential surface of the cover cylinder section 98, and a through hole 101 is provided in part of the cover bottom plate section 99 (portion near the outer circumference in the example in the figure). The sensor holder 97 is formed into a complete cylindrical shape with a bottom using a synthetic resin, and is fastened to and supported by the inner surface of the sensor cover 96 by insert molding or adhesive. First and second sensors 42a, 42b are embedded in the cylindrical portion of the sensor holder 97 that is located on the inner-diameter side of the cover cylinder section 98. Moreover, a connector section 102 that is provided on part of the sensor holder 97 protrudes through the through hole 101 to the outside of the sensor cover 96. The end section of a harness for the output signals from the first and second sensors 42a, 42b can be connected to or disconnected from this connector section 102.

In this example, the sensor unit 12a having construction such as described above is fastened to and supported by the housing by way of an outer ring 94. More specifically, the tip-end section of the cover cylinder section 98 of the sensor cover 96 is pressure fitted into the inner-circumferential surface of the tip-end section of the extended cylindrical section of the outer ring 94 and connected with an interference fit. Moreover, the sensor unit 12d is positioned in the axial direction with respect to the outer ring 94 by bringing the side surface of a rim section 100 that is provided on the portion near the tip end of the outer-circumferential surface of the cover cylinder section 98 into contact with the tip-end surface of extended cylindrical section 95. Then, in this state, the first and second encoders 10, 11 are placed in a space on the inside of the sensor cover 96, and detecting sections of the first and second sensors 42a, 42b are made to face first and second detected sections 39, 40 of the first and second encoders 10, 11.

In this example, a seal ring 104 is installed between a space where plural rollers 103 of the conical roller bearing 29g are located, and a space on the inside of the sensor cover 96 where the first and second detected sections 39, 40 are arranged, and functions as a seal device for partitioning between these spaces. The seal ring 104 includes a circular ring-shaped metal core 105 having an L-shaped cross section, and a circular ring-shape seal member 106 that is reinforced by the metal core 105. The metal core 105 fits around the outer-circumferential surface of the tip-end section of the nut 32, which is a cylindrical surface, by an interference fit, and the tip-end edge of the seal lip of the seal member is made to come in contact with the inner-circumferential surface of the base-end section of the extended cylindrical section 95, which is a cylindrical surface. As a result, lubrication oil that includes foreign magnetic matters such as iron powder that is supplied to the space where the conical rollers 75 are located is prevented from passing through the portion between the inner-circumferential surface of the extended cylindrical section 95 and the outer-circumferential surface of the tip-end section of the nut 32b, and getting into the space inside the sensor cover 96. By doing so, a drop in the reliability of the output signals from the sensor unit 12 due to lubrication oil that includes foreign magnetic matters such as iron powder is prevented from adhering to the tip-end surfaces of the first and second encoders 10, 11, and the sensor unit, and disturbance in the regular and periodic magnetic change in the circumferential direction of the first and second encoder 10, 11 is prevented. This kind of seal device is not limited to this seal ring 104, and various forms can be used. For example, it is also possible to use a seal member in which a metal core fits around the inner-circumferential surface of the extended cylindrical section 95, and the tip-end edge of the seal lip comes in sliding contact with the surface of the nut 32b (or output shaft 14). In either case, using a seal device having good seal characteristics, and for which the sliding resistance between the tip-end edge of the seal lip and the opposing surface is kept low is preferred.

In this example, the sensory unit 12d is fastened to and supported by the outer ring 94 of a conical roller bearing 29c that is installed between the output shaft 14 and the housing. Therefore, when compared with construction in which the sensor unit 12 and the rotary-shaft unit 6 (see FIG. 6) that supports the first and second encoders 10, 11 are separately fastened to and supported by the housing, it is easier to maintain the positioning precision of the sensor unit 12d with respect to the first and second encoders 10, 11. Moreover, it is possible to assemble the sensor unit 12d and rotary-shaft unit 6 in a specified positional relationship before assembly inside the housing, and that positional relationship does not move after that, so from this aspect, maintaining positional precision becomes easier.

In this example, the first and second detected sections 39, 40 and the detecting sections of the first and second sensors 42a, 42b are arranged inside the sensor cover 96, and a seal ring 104 is installed between the space inside the sensor cover 96 and the space where the plural conical rollers 103 of the conical roller bearing 29g are located so as to be a partition between these spaces. Therefore, it is possible to suppress or prevent lubrication oil that is inside the housing and that includes magnetic foreign matter (including lubrication oil that is supplied to the space where the conical rollers 103 are located) from adhering to the first and second detected sections 39, 40 and the detecting sections of the first and second sensors 42a, 42b. As a result, it is possible to further improve the reliability of torque measurement.

In this example, the first and second encoders 10, 11 are housed in a space inside the sensor cover 96, so, for example, the first and second encoders 10, 11 are prevented from bumping the housing and becoming damaged when assembling the sensor unit 12d and rotary-shaft unit 6 in the housing after the sensor unit 12d and rotary-shaft unit 6 (see FIG. 6) have been assembled. Moreover, in the stage before assembling portions other than the housing inside the housing, it is possible to check the output signals of the first and second sensors 42a, 42b. Furthermore, in the completed state, even when there is deformation of the housing, it is difficult for the positional relationship of the first and second detected sections 39, 40 and the detecting sections of the first and second sensors 42a, 42b to change. From this aspect as well, it is possible to improve the reliability of the torque measurement.

The rolling bearing for supporting the input shaft and output shaft so as to freely rotate with respect to the housing is not limited to a conical roller bearing, and it is also possible to use other types of bearings such as an angular ball bearing. The other construction and functions are the same as those of the first through twenty-fifth examples of embodiments.

[Twenty-seventh Example]

Figure 59:
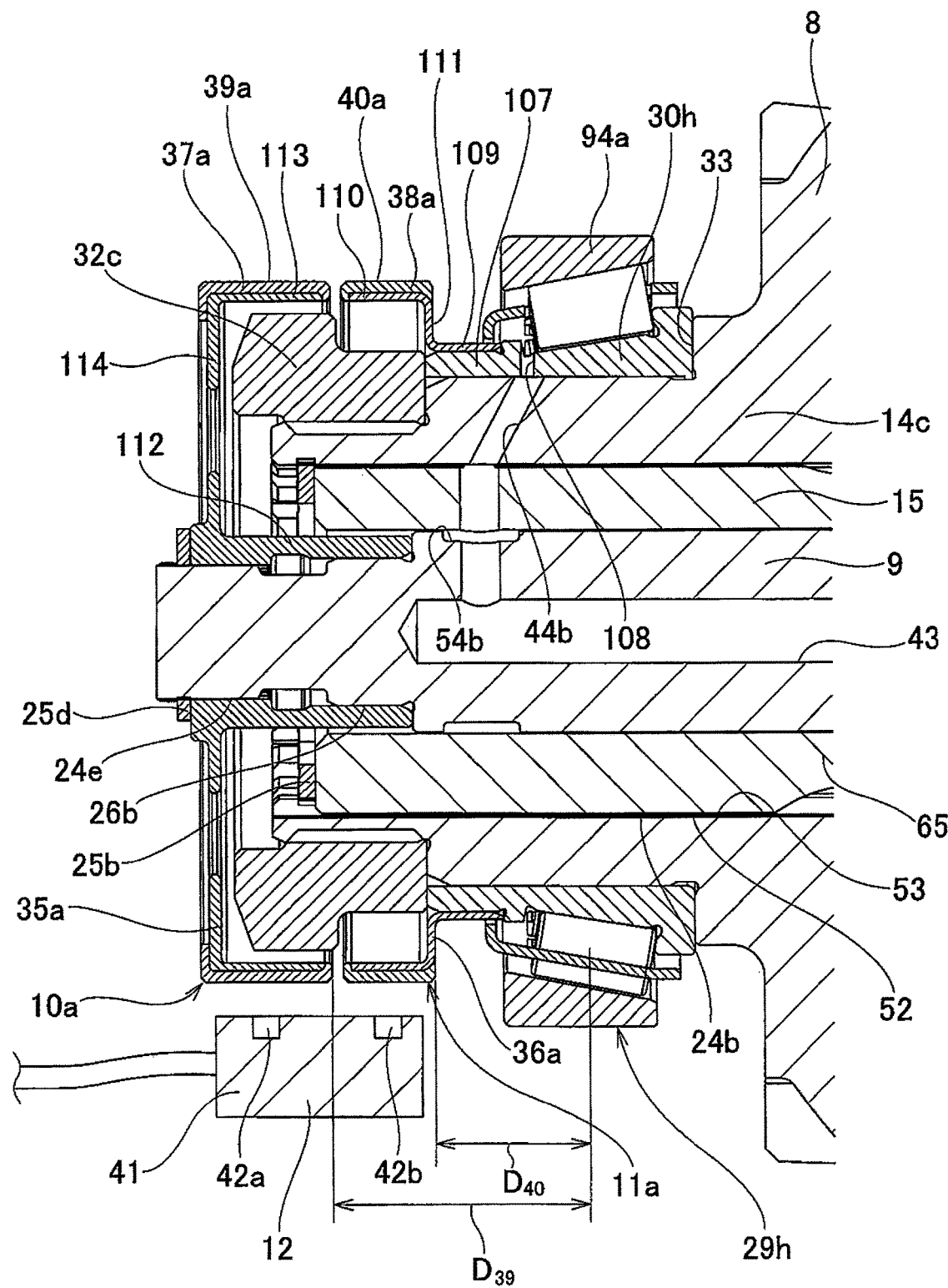
FIG. 59 is an enlarged cross-sectional view illustrating the other end section of a rotation transmission device of a twenty-seventh example of an embodiment of the present invention.
Figure 60:
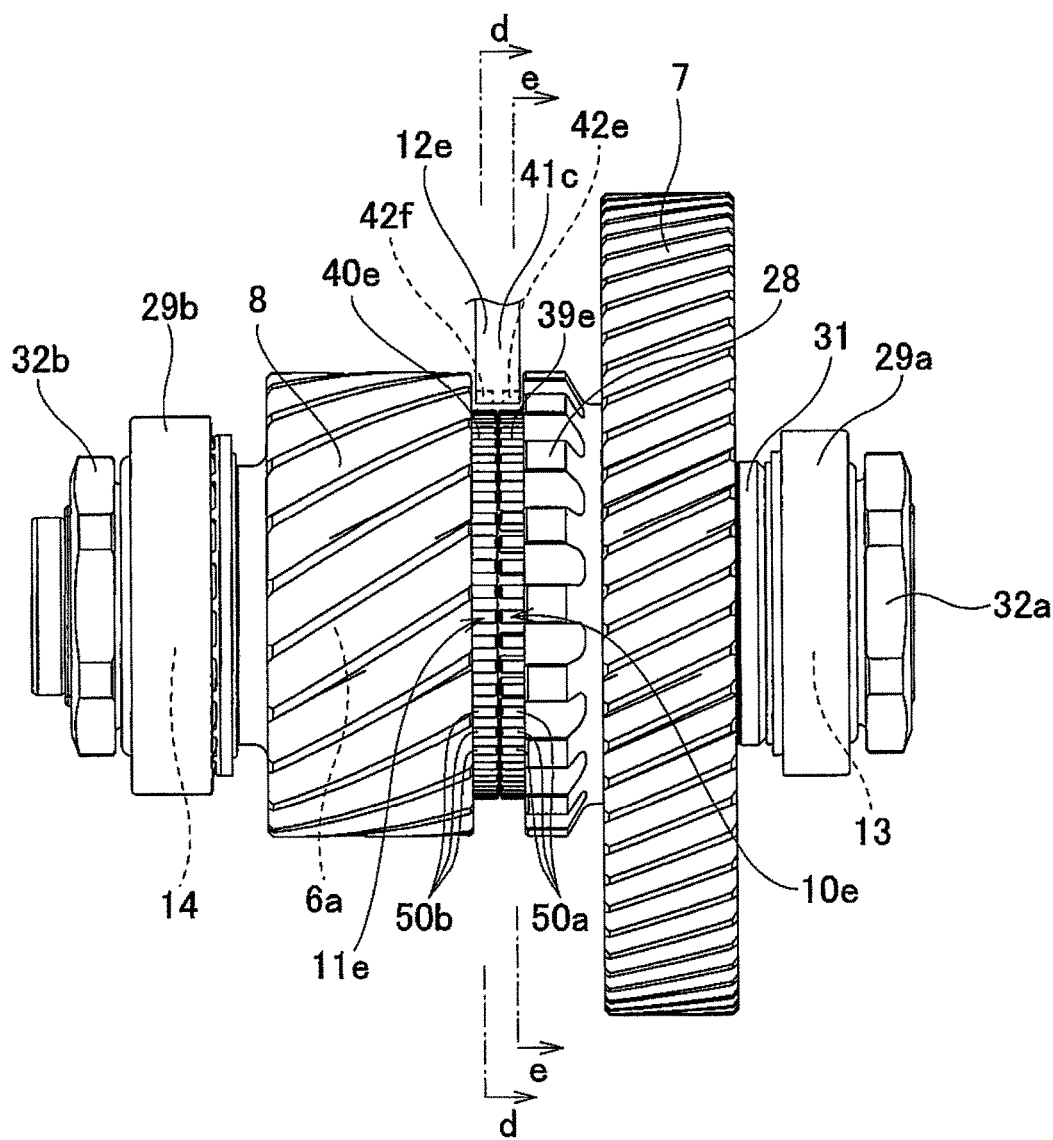
FIG. 60 is a side view illustrating a rotation transmission device of a twenty-eighth example of an embodiment of the present invention.
Figure 61:
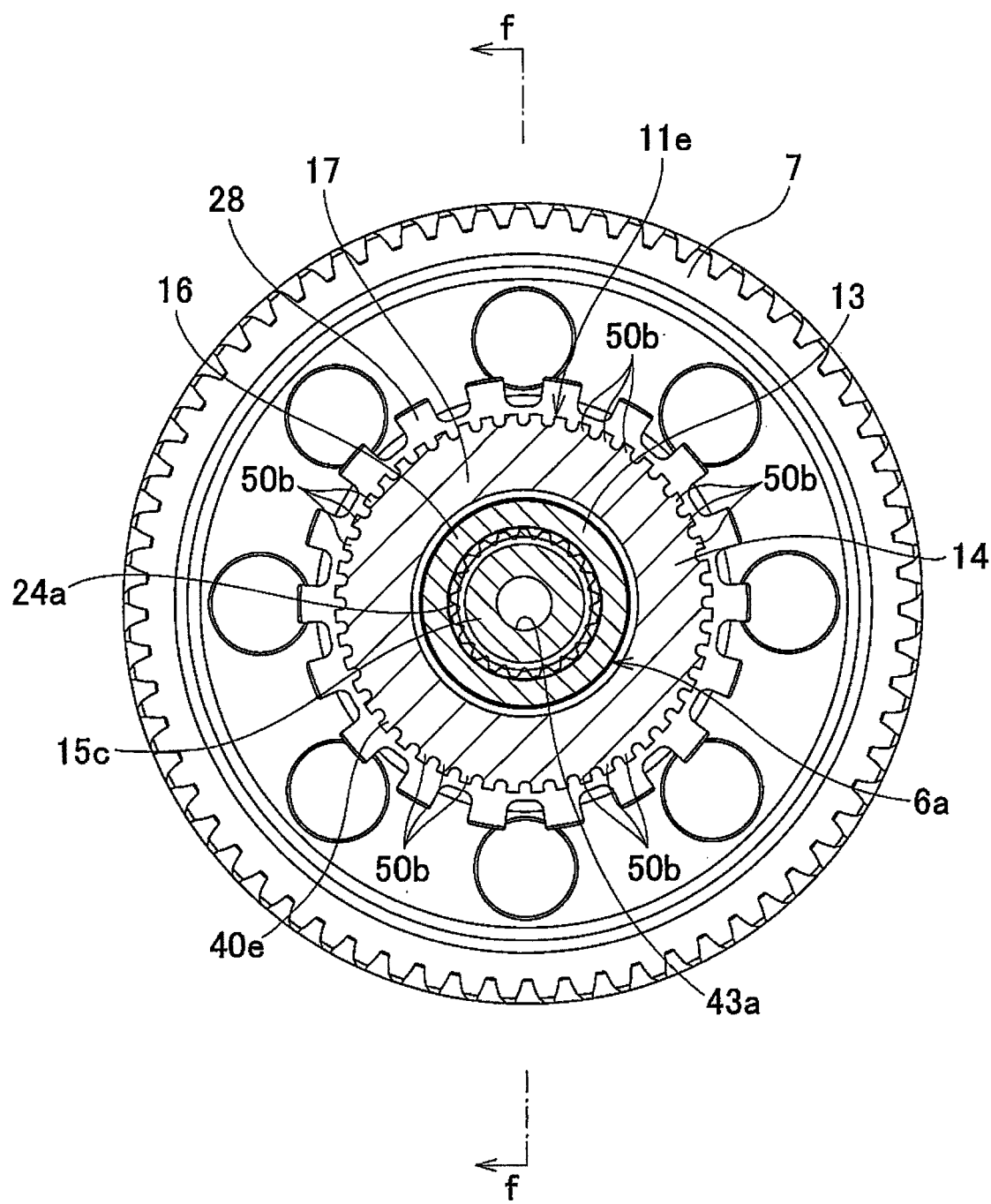
FIG. 61 is a cross-sectional view of section d-d in FIG. 60 of the rotation transmission device illustrated in FIG. 60.
Figure 62:
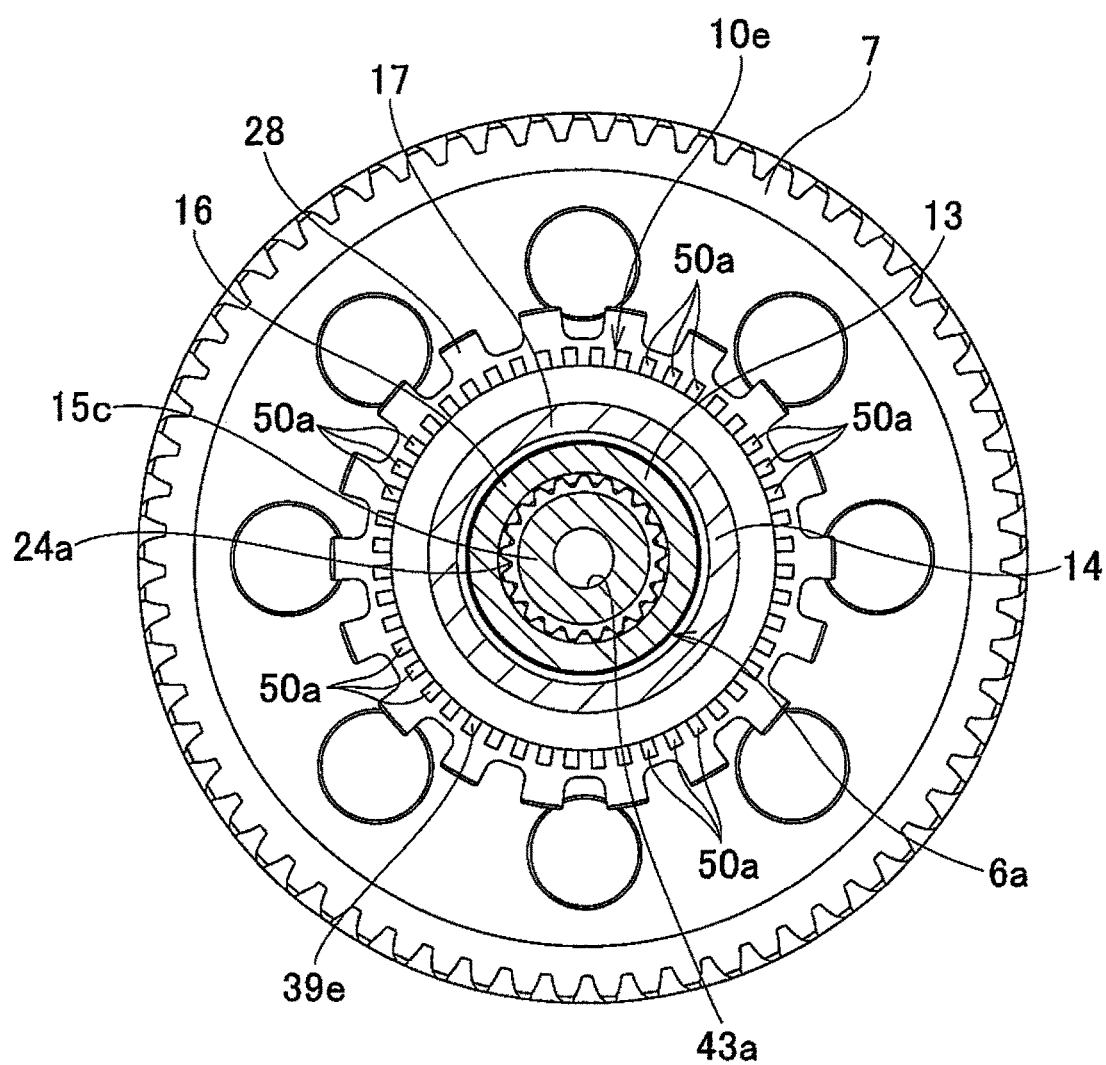
FIG. 62 is a cross-sectional view of section e-e in FIG. 60 of the rotation transmission device illustrated in FIG. 60.
Figure 63:
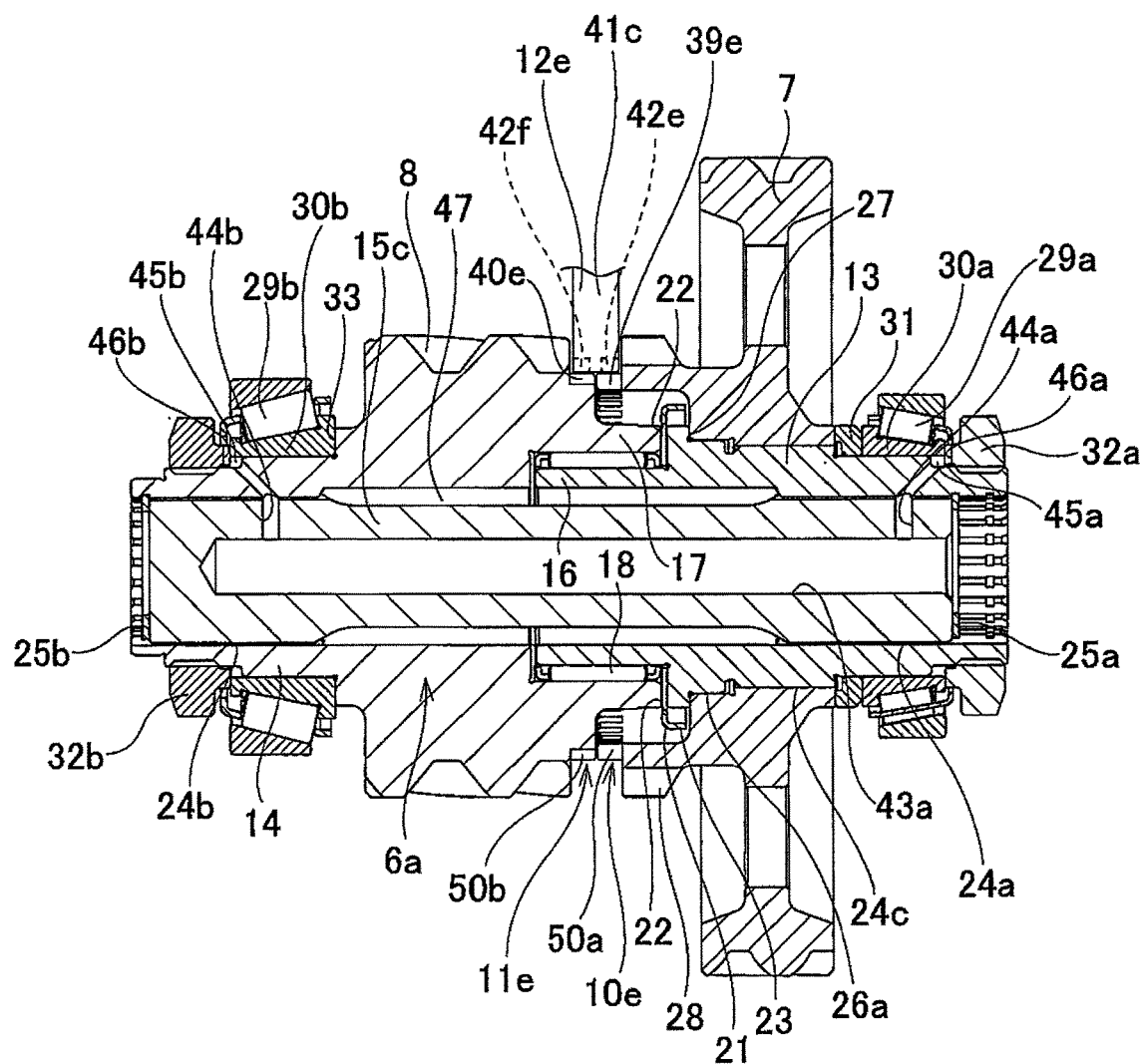
FIG. 63 is a cross-sectional view of section f-f in FIG. 61 of the rotation transmission device illustrated in FIG. 60.
Figure 64:
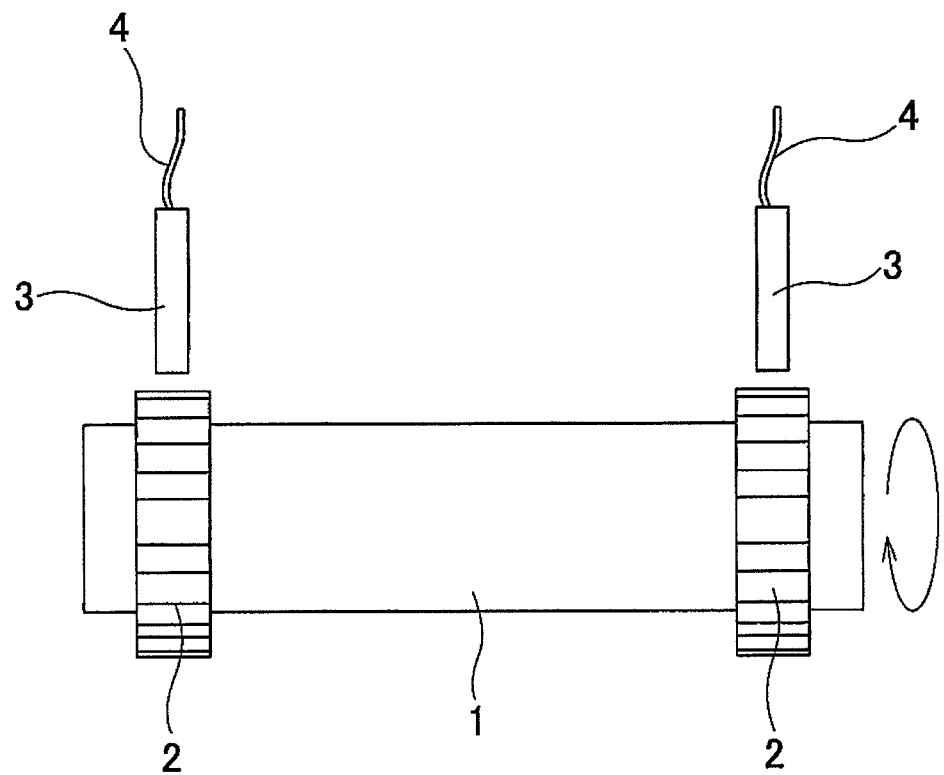
FIG. 64 is a side view illustrating a torque measurement device of a first example of conventional construction.
Figure 65:
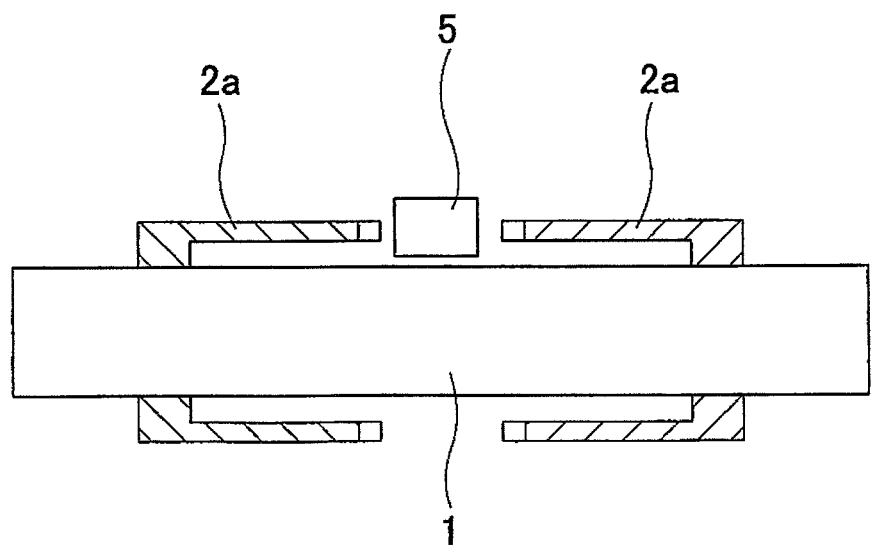
FIG. 65 is a side view illustrating a torque measurement device of a second example of conventional construction, and illustrates a state in which part is cut away.

FIG. 59 illustrates a twenty-seventh example of an embodiment of the present invention. In this example as well, the construction of the installation location of the first and second encoders 10a, 11a is devised in order to improve the precision of torque measurement. In other words, the inner ring 30h of a conical roller bearing 20h for supporting the output shaft 14c so as to rotate freely with respect to the housing is fastened around a portion near the other end of the output shaft 14c, and the end surface on the large-diameter side of the inner ring 30 is made to come in contact with a stepped surface 33 that s formed in a portion near the other end of the outer-circumferential surface of the output shaft 14c. Then, in this state, the inner ring 30h is fastened around the outside of the output shaft 14c by pressure fitting the end surface on the small-diameter side of the inner ring 30h with a nut 32c that is screwed onto the other end section of the outer-circumferential surface of the output shaft 14c and tightened. Particularly, in this example, a cylindrical shaped extended cylindrical section 107 that protrudes in the axial direction from the inner-diameter side of the outer ring 94a of the conical roller bearing 29h is integrally provided on the end section on the small-diameter side of the inner ring 30h, which is the end section on the other end side of the output shaft 14c. Moreover, a through hole 108 in the radial direction is provided in a portion near the small-diameter side of the inner ring 30h. Lubrication oil can be supplied from an oil passage 44b through this through hole 108 to the inside of the conical roller bearing 29h.

In this example, the metal core 36a of the second encoder 11a is fastened around the outside of the extended cylindrical section 107. In other words, the second encoder 11a is fastened around the outside of a portion near the other end of the output shaft 14c by way of the extended cylindrical section 107 of the inner ring 30h. Moreover, the metal core 36a of the second encoder 11a is formed into a complete circular ring shape having a crank shaped cross section, and includes a small-diameter cylindrical section 109 and large-diameter cylindrical section 110 that are arranged so as to be concentric with each other, and a ring section 111 that connects the edges on the ends in the axial direction of these cylindrical sections 109, 110. A cylindrical shaped permanent magnet 38a is fastened to the outer-circumferential surface of the large-diameter cylindrical section 110. The second encoder is fastened to the inner ring 30h by fastening the small-diameter cylindrical section 109 of the metal core 36a around the outside of the extended cylindrical section 107 of the inner ring 30h with an interference fit. Moreover, in this state, the large-diameter cylindrical section 110 and permanent magnet 38a are arranged on the other-diameter side of half (right half in FIG. 59) in the axial direction of the nut 32c in positions that overlap in the radial direction with this half in the axial direction. In other words, in this example, the cylindrical shaped second detected section 40a, which is the outer-circumferential surface of the permanent magnet 38a, is arranged on the outer-diameter side of half in the axial direction of the nut 32c so as to overlap in the radial direction this half in the axial direction (and other end section of the output shaft 14c).

Moreover, the metal core 35a of the first encoder 10a is formed into a complete circular ring shape with a C-shaped cross section, and includes a small-diameter cylindrical section 112 and a large-diameter section 113 that are arranged so as to be concentric with each other, and a ring section 114 that connects the end sections in the axial direction of these cylindrical sections 112, 113. A cylindrical-shaped permanent magnet 37a is fastened around the outer-circumferential surface of the large-diameter cylindrical section 113. The small-diameter cylindrical section 112 of the first encoder 10a is fastened around the outside of the other end section (left-end section in FIG. 59) of the coupling shaft 9. The connection between the inner-circumferential surface of the small-diameter cylindrical section 112 and the outer-circumferential surface of the other end section of the coupling shaft 9 is formed by arranging a cylindrical connection 26b for maintaining concentricity and an involute spline connection 24e for preventing relative rotation so as to be adjacently in contact with each other in the axial direction. Moreover, the small-diameter cylindrical section 112 is prevented from coming apart from the coupling shaft 9 by a retaining ring 25d that is fastened around the outer-circumferential surface of the other end section of the coupling shaft 9. In this state, one end section (right-end section in FIG. 59) and the middle section in the axial direction of the large-diameter cylindrical section 113 and permanent magnet 37a are arranged on the outer-diameter side of the other half (left half in FIG. 59) in the axial direction of the nut 32c in positions that overlap in the radial direction this other half in the axial direction. In other words, in this example, one end section and middle section in the axial direction of the cylindrical-shaped first detected section 39a, which is the outer-circumferential surface of the permanent magnet 37a, is arranged around the outer-diameter side of the other half in the axial direction of the nut 32c, in a position that overlaps in the radial direction the other half section (or output shaft 14c) in the axial direction.

As a result, the first detected section 39a and second detected section 40a are adjacent in the axial direction and are arranged close to each other (for example, arranged so as to be separated by a space of 5 mm or less in the axial direction). The sensor unit 12 is fastened to and supported by the housing so that of the first and second sensor 42a, 42b of the sensor unit 12, the detecting section of the first sensor 42a closely faces in the radial direction the first detected section 39a, and the detecting section of the second sensor 42b closely faces in the radial direction the second detected section 40a.

In this example, the cylindrical shaped second detected section 40a of the second encoder 11a is arranged around the outer-diameter side of half in the axial direction of the nut 32c so as to overlap in the radial direction that half in the axial direction, so compared with the first example of an embodiment, it is possible to shorten the distance D40 in the axial direction from the center section in the axial direction of the array of rolling bodies of the conical roller bearing 29h to the second detected section 40a. Therefore, it is possible to keep displacement and inclination in the radial direction of the second detected section 40a that occurs as the output shaft 14c bends about the conical roller bearing 29h as a fulcrum due to the gear reaction force in the radial direction that acts on the output gear 8 being applied to the output shaft 14 when torque is being transmitted, small. Furthermore, of the cylindrical shaped first detected section 39a of the first encoder 10a that is fastened around the outside of the other end section of the coupling shaft 9, the one end section to middle section in the axial direction is arranged around the outer-diameter side of the other half in the axial direction of the nut 32c in a position that overlaps in the radial direction this other half in the axial direction. Therefore, when compared with the first example of an embodiment, it is possible to shorten the distance D39 in the axial direction from the center section in the axial direction of the array of rolling bodies of the conical roller bearing 29h. Consequently, even when the coupling shaft 9 bends about the conical roller bearing 29h as a fulcrum due to gear reaction force in the radial direction when torque is being transmitted, it is possible to keep displacement and inclination in the radial direction of the first detected section 39a that occurs due to this bending, small.

Therefore, in this example, when compared with construction in which the entire second detected section 40 of the second encoder 11 that is fastened around the outside of the other end section of the output shaft 14, and the entire first detected section 39 of the first encoder 10 that is fastened around the other end section of the coupling shaft 9 are arranged in a portion that protrudes further toward the other side in the axial direction than the other end section of the output shaft 14, such as in the case of the first example of an embodiment, it is possible to prevent contact between the first and second detected sections 39a, 40 and the tip-end surface of the sensor unit 12 even when the space between the first and second detected sections 39a, 40a and the tip-end surface of the sensor unit 12 is small, and regardless of whether elastic deformation such as bending of the members occurs due to gear reaction force in the radial direction that acts when torque is being transmitted. Moreover, it is possible to reduce shifting between the centers of rotation of the first and second detected sections 39a, 40a that occurs due to displacement or inclination in the radial direction of the first and second detected sections 39a, 40a. As a result, when compared with the case of the first example of an embodiment, it is possible to further improve the precision of torque measurement.

In this example, from one end section to the middle section in the axial direction of the first detected section 39a, and the second detected section 40a are arranged around the outer-diameter side of the nut 32c that is screwed onto and fastened the outer-circumferential surface of the other end section of the output shaft 14c in positions that overlap in the radial direction with the nut 32c. Therefore, when compared with construction in which the entire first and second detected sections 39, 40 are arranged in a portion that protrudes further toward the other side in the axial direction than the other end section of the output shaft 14 such as in the first example of an embodiment, it is possible to shorten the dimension in the axial direction of the rotation transmission device. As a result, it is possible to make the rotation transmission device more compact and lightweight. The other construction and functions are the same as those of the first through twenty-sixth examples of embodiments.

[Twenty-eighth Example]

FIG. 60 to FIG. 63 illustrates a twenty-eighth example of an embodiment of the present invention. In this example, the first and second encoder 10e, 11e, and the sensor unit 12e are arranged in the middle section of the rotary-shaft unit 6a, in a portion between the input gear 7 and output gear 8 in the axial direction.

In order for this, the first encoder 10e is integrally formed on the tip-end surface (left-end surface in FIG. 60 and FIG. 63) of a parking-lock gear 28 that is integrally formed in a portion near the inner circumference on one side surface of the input gear 7. In other words, the first encoder 10e is formed by arranging plural magnetic metal convex sections 50a that are integrally formed so as to protrude in the axial direction from the tip-end surface of the parking-lock gear 28 so as to have a uniform pitch in the circumferential direction. The entire first encoder 10e functions as a first detected section 39e. The first encoder 10e is fastened to the input shaft 13 by way of the input gear 7 and parking-lock gear 28. Moreover, the second encoder 11e is integrally formed with a portion that is near the outer-circumferential surface of the output shaft 14, and that is adjacent in the axial direction to the output gear 8. In other words, the second encoder 11e is formed by arranging plural magnetic metal convex sections 50b that are integrally formed so as to protrude in the radial direction from a portion near on end of the outer-circumferential surface of the output shaft 14 so as to have a uniform pitch in the circumferential direction. The entire second encoder 11e functions as a second detected section 40e. In this example, the first and second encoders 10e, 11e have the same outer-diameter dimensions, and are arranged so as to be concentric with each other and so as to be closely adjacent to each other in the axial direction. The total number of convex sections 50a and the total number of convex sections 50b are the same as each other. Moreover, the width in the circumferential direction of the convex sections 50a and the width in the circumferential direction of the convex sections 50b are the same as each other. Furthermore, when torque is not being transmitted, the phases in the circumferential direction of the convex sections 50a and convex sections 50b coincide.

The sensor unit 12e includes a holder 41c that is made of a synthetic resin, and first and second sensors 42e, 42f that are embedded in the tip-end sections of the holder 41c. The sensor unit 12e is supported by a housing (not illustrated in the figures) so that the detecting section of the first sensor 42e closely faces the outer-circumferential surface of the first encoder 10e (first detected section 39e), and the detecting section of the second sensor 42f closely faces the outer-circumferential surface of the second encoder 11e (second detected section 40e). Each of the sensors 42e, 42f includes a permanent magnet that is magnetized in the direction that the outer-circumferential surface of the encoder 10e, 11e faces the detecting section of the sensor 42e, 42f; and a magnetism-detecting element such as a Hall element, Hall IC, MR element, GMR element or the like that is located in the end surface of both end surfaces in the direction of magnetization of the permanent magnet. One permanent magnet can also be shared as the permanent magnet of the sensors 42e, 42f.

In this example, there is no coupling shaft on the inner-diameter side of the torsion bar 15c. An oil inlet passage 43a that is on only one end surface is provided in the center section in the radial direction of the torsion bar 15c. In this example, lubrication oil that enters inside the oil inlet passage 43a through the opening on one end section of the oil inlet passage 43a is supplied to the inside of a pair of oil passages 44a, 44b that are provided in portions near both ends of the rotary-shaft unit 6a.

In this example, as in the first example of an embodiment, the frequency (and period) of the output signals from the first and second sensors 42e, 42f of the sensor unit 12e is a value that corresponds to the rotational speed of the rotary-shaft unit 6a. Therefore, it is possible to find the rotational speed based on the frequency (or period). Moreover, the phase difference ratio (=phase difference/1 period) between the output signals of the first and second sensors 42e, 42f is a value that corresponds to the torque that is transmitted by the rotary-shaft unit 6a between the input gear 7 and the output gear 8. Therefore, it is possible to find the torque based on this phase difference ratio. The other construction and functions are the same as those of the first example of an embodiment.

When embodying the construction of each of the examples of embodiments described above, as long as there are no evident contradictions in the construction, it is possible to freely combine the construction of the examples of embodiments.

[Industrial Applicability]

The form of a transmission in which the present invention is assembled and used is not particularly limited as long as the construction has a counter shaft and a counter gear, and it is possible to use various kinds of transmissions such as an automatic transmission (AT), continuously-variable transmission (CVT), manual transmission (MT) and the like. Moreover, the rotational speed and torque that are measured can be used for other control of an automobile besides transmission control. Furthermore, a motor that is placed on the up-stream side of the transmission does not absolutely need to be an internal-combustion engine such as a gasoline engine or a diesel engine, and it is also possible for the motor to be an electric motor that is used, for example, in a hybrid automobile or an electric automobile. In either case, present invention can be widely applied to various kinds of machinery in which it is necessary to transmit torque by a rotary shaft, and to measure the torque that is transmitted by the rotary shaft.

Furthermore, when embodying the present invention, it is necessary to measure the torque, however, except for construction in which voltage is generated in a coil (when using an induced electromotive force), it is not necessary to measure the rotational speed. Even when knowing the rotational speed is necessary, it is possible to measure that rotational speed by using separate and simple construction.

[Explanation of Reference Numbers]
1 Rotary shaft
2, 2a Encoder
3 Sensor
4 Harness
5 Sensor unit
6, 6a Rotary-shaft unit
7 Input gear
8 Output gear
9, 9a, 9b Coupling shaft
10, 10a to 10h First encoder
11, 11a to 11h Second encoder
12, 12a to 12e Sensor unit
13, 13a to 13c Input shaft
14, 14a to 14c Output shaft
15, 15a to 15c Torsion bar
16 Input-side combination cylinder
17 Output-side combination cylinder
18 Radial needle bearing
19 Stepped surface
20 Tip-end surface
21, 21a to 21c Thrust washer
22 Slit
23 Reinforcing cylindrical section
24a to 24e, 24a1, 24b1 Involute spline connection
25a to 25d Retaining ring
26a, 26b Cylindrical connecting section
27 Stepped surface
28 Packing-lock gear
29a to 29h Conical roller bearing
30a to 30h Inner ring
31 Spacer
32a to 32c Nut
33 Stepped surface
34 Rim section
35, 35a, 35b Metal core
36, 36a, 36b Metal core
37, 37a to 37c Permanent magnet
38, 38a to 38c Permanent magnet
39, 39a to 39e First detected section
40, 40a to 40e Second detected section
41, 41a to 41c Holder
42a to 42f (First, Second) Sensor
43, 43a Oil inlet passage
44a, 44b Oil passage
45a, 45b Ring-shaped space
46a, 46b Oil groove
47 Cylindrical space
48 Tip-end surface
49 Stepped surface
50, 50a, 50b Convex section
51, 51a to 51d Tongue piece
52 Stator
53 Conducting wire
54 Coil
55 Core
56 Rim section
57 Sleeve bearing
58 Thrust needle bearing
59 Pin
60 Engagement hole
61 Oil passage
62, 62a First male involute spline section
63, 63a First male involute spline section
64, 64a Second female involute spline section
65, 65a Second female involute spline section
66a, 66b Concave groove
67a, 67b Through hole
68 Concave hole
69 Pin
70a, 70b Concave section
71 Convex section
72a, 72b Marking
73a, 73b Marking
74 First plating layer
75 Second plating layer
76 Cylindrical surface
77 Cylindrical surface
82 Input-side rotating body
83 Input-side unit
84 Output-side rotating body
85 Output-side unit
86 Stepped surface
87 Fitting cylindrical section
88 Ring section
89 Cylindrical section
90 Large-diameter section
91 Sliding bearing
92 Small-diameter section
93 Large-diameter section
94, 94a Outer ring
95 Extended cylindrical section
96 Sensor cover
97 Sensor holder
98 Cover cylinder section
99 Cover bottom plate section
100 Rim section
101 Through hole
102 Connector section
103 Conical roller
104 Seal ring
105 Metal core
106 Seal ring
107 Extended cylindrical section
108 Through hole
109 Small-diameter cylindrical section
110 Large-diameter cylindrical section
111 Ring section
112 Small-diameter cylindrical section
113 Large-diameter cylindrical section
114 Ring section
115 Spring section

What is claimed is:
1. A rotation transmission device comprising:
a rotary-shaft unit that comprises: a first rotary shaft and a second rotary shaft that are both hollow, and together with being arranged so as to be concentric with each other, are combined so that the end sections of each are able to rotate relative to each other, and in this state are supported by a housing so as to rotate freely; and a torsion bar that is hollow and concentrically arranged on the inner-diameter side of the first and second rotary shafts, with one end section being connected to the first rotary shaft so that relative rotation is not possible, and the other end section being connected to the second rotary shaft so that relative rotation is not possible;
a first gear that is provided in the middle section in the axial direction of the outer-circumferential surface of the first rotary shaft;
a second gear that is provided in the middle section in the axial direction of the outer-circumferential surface of the second rotary shaft;
a first encoder that is fastened to one of the first and second rotary shafts so as to be concentric with that one rotary shaft, and comprising a first detection section that is magnetized so that the magnetic characteristics change in an alternating manner at a uniform pitch;
a second encoder that is fastened to the other of the first and second rotary shafts so as to be concentric with that other rotary shaft, and comprising a second detection section that is magnetized so that the magnetic characteristics change in an alternating manner at a uniform pitch;
a sensor unit that is supported by the housing, and comprises at least one sensor that faces the first and second detection sections, and causes an output signal to change in correspondence to the change in magnetic characteristics of a portion of the first and second detection section where the at least one sensor faces; and
a coupling shaft that is arranged on the inner-diameter side of the torsion bar and arranged concentric with the torsion bar, with one end section being connected to one of the rotary shafts so that relative rotation is not possible, and the other end section protruding in the axial direction from the end section of the torsion bar,
wherein the first encoder is fastened to the other end section of the coupling shaft, and
the second encoder is fastened to the end section on the other end section side of the coupling shaft of the other rotary shaft so at to be close to the first encoder.

2. The rotation transmission device according to claim 1, wherein the first and second detection sections are arranged so as to be close to each other.

3. The rotation transmission device according to claim 2, wherein a sliding bearing is provided between the inner-circumferential surface of the end section on the other end section side of the coupling shaft of the other rotary shaft and the outer-circumferential surface of the coupling shaft or a fitting cylindrical section of a metal core of the first encoder that fits on the coupling shaft.

4. The rotation transmission device according to claim 2, wherein the coupling shaft comprises a rim section on the outer-circumferential surface of the one end section, and the coupling shaft is supported by that rim section being pressure fitted with the inner-circumferential surface of the end section on the one end side of the coupling shaft of the one rotary shaft so that relative rotation with respect to that one rotary shaft is not possible.

5. A rotation transmission device comprising:
a rotary-shaft unit that comprises: a first rotary shaft and a second rotary shaft that are both hollow, and together with being arranged so as to be concentric with each other, are combined so that the end sections of each are able to rotate relative to each other, and in this state are supported by a housing so as to rotate freely; and a torsion bar that is hollow and concentrically arranged on the inner-diameter side of the first and second rotary shafts, with one end section being connected to the first rotary shaft so that relative rotation is not possible, and the other end section being connected to the second rotary shaft so that relative rotation is not possible;
a first gear that is provided in the middle section in the axial direction of the outer-circumferential surface of the first rotary shaft;
a second gear that is provided in the middle section in the axial direction of the outer-circumferential surface of the second rotary shaft;
a first encoder that is fastened to one of the first and second rotary shafts so as to be concentric with that one rotary shaft, and comprising a first detection section that is magnetized so that the magnetic characteristics change in an alternating manner at a uniform pitch;
a second encoder that is fastened to the other of the first and second rotary shafts so as to be concentric with that other rotary shaft, and comprising a second detection section that is magnetized so that the magnetic characteristics change in an alternating manner at a uniform pitch;
a sensor unit that is supported housing, and comprises at least one sensor that faces the first and second detection sections, and causes an output signal to change in correspondence to the change in magnetic characteristics of a portion of the first and second detection section where the at least one sensor faces; and
a coupling shaft that is arranged on the inner-diameter side of the torsion bar and arranged concentric with the torsion bar, with one end section being connected to one of the rotary shafts so that relative rotation is not possible, and the other end section protruding in the axial direction from the end section of the torsion bar,
wherein the first encoder is fastened to the other end section of the coupling shaft,
the second encoder is fastened to the end section on the other end section side of the coupling shaft of the other rotary shaft so at to be close to the first encoder,
the first and second detection sections are arranged so as to be close to each other,
the other rotary shaft is supported by a rolling bearing that is located between the portion of the outer-circumferential surface of the other rotary shaft that is near the end section on the other end section side of the coupling shaft and the inner-circumferential surface of the housing so as to rotate freely with respect to the housing, and
the sensor unit comprises a sensor cover and a detecting section that is fastened to and supported by the inside of the sensor cover, and by fastening the sensor cover to and supporting the sensor cover by the end section of the outer ring of the rolling bearing on the other end section side of the coupling shaft of the other rotary shaft so that the first and second encoders are located in a space inside the sensor cover, the detecting section is made to face the first and second detection sections.

6. The rotation transmission device according to claim 5, wherein a seal device is located between the space where plural rolling bodies of the rolling bearing are located and the space on the inside of the sensor cover where the first and second detection sections are located, and functions as a partition between these spaces.

7. A rotation transmission device comprising:
a rotary-shaft unit that comprises: a first rotary shaft and a second rotary shaft that are both hollow, and together with being arranged so as to be concentric with each other, are combined so that the end sections of each are able to rotate relative to each other, and in this state are supported by a housing so as to rotate freely; and a torsion bar that is hollow and concentrically arranged on the inner-diameter side of the first and second rotary shafts, with one end section being connected to the first rotary shaft so that relative rotation is not possible, and the other end section being connected to the second rotary shaft so that relative rotation is not possible;
a first gear that is provided in the middle section in the axial direction of the outer-circumferential surface of the first rotary shaft;
a second gear that is provided in the middle section in the axial direction of the outer-circumferential surface of the second rotary shaft;
a first encoder that is fastened to one of the first and second rotary shafts so as to be concentric with that one rotary shaft, and comprising a first detection section that is magnetized so that the magnetic characteristics change in an alternating manner at a uniform pitch;
a second encoder that is fastened to the other of the first and second rotary shafts so as to be concentric with that other rotary shaft, and comprising a second detection section that is magnetized so that the magnetic characteristics change in an alternating manner at a uniform pitch;
a sensor unit that is supported housing, and comprises at least one sensor that faces the first and second detection sections, and causes an output signal to change in correspondence to the change in magnetic characteristics of a portion of the first and second detection section where the at least one sensor faces; and
a coupling shaft that is arranged on the inner-diameter side of the torsion bar and arranged concentric with the torsion bar, with one end section being connected to one of the rotary shafts so that relative rotation is not possible, and the other end section protruding in the axial direction from the end section of the torsion bar,
wherein the first encoder is fastened to the other end section of the coupling shaft,
the second encoder is fastened to the end section on the other end section side of the coupling shaft of the other rotary shaft so at to be close to the first encoder,
the first and second detection sections are arranged so as to be close to each other,
the other rotary shaft is supported by a rolling bearing that is located between the portion of the outer-circumferential surface of that other rotary shaft near the end section of the other end section side of the coupling shaft and the inner-circumferential surface of the housing so as to rotate freely with respect to the housing, and
the second encoder is fastened around the outside of the end section of the inner ring of the rolling bearing on the other end section side of the coupling shaft.

8. The rotation transmission device according to claim 7, wherein the first and second detection sections are both cylindrical shaped; and
at least one end section in the axial direction of the first and second detection sections is arranged around the outer-diameter side of the end section of the other rotary shaft on the other end section side of the coupling shaft, or another part that is fastened around the outside of that end section, in a position that overlaps in the radial direction that end section of the other rotary shaft or that other part.

9. A rotation transmission device comprising:
a rotary-shaft unit that comprises: a first rotary shaft and a second rotary shaft that are both hollow, and together with being arranged so as to be concentric with each other, are combined so that the end sections of each are able to rotate relative to each other, and in this state are supported by a housing so as to rotate freely; and a torsion bar that is hollow and concentrically arranged on the inner-diameter side of the first and second rotary shafts, with one end section being connected to the first rotary shaft so that relative rotation is not possible, and the other end section being connected to the second rotary shaft so that relative rotation is not possible;
a first gear that is provided in the middle section in the axial direction of the outer-circumferential surface of the first rotary shaft;
a second gear that is provided in the middle section in the axial direction of the outer-circumferential surface of the second rotary shaft;
a first encoder that is fastened to the first rotary shaft in a position between the first and second gears in the axial direction so as to be concentric with the first rotary shaft, and that has a first detection section with magnetic characteristics that change in an alternating manner at a uniform pitch;
a second encoder that is fastened to the second rotary shaft in a position between the first and second gears in the axial direction so as to be concentric with the second rotary shaft, and that has a second detection section with magnetic characteristics that change in an alternating manner at a uniform pitch; and
a sensor unit that is supported by the housing, and comprises at least one sensor that faces the first and second detection sections, and causes an output signal to change in correspondence to the change in magnetic characteristics of a portion of the first and second detection sections where the at least one sensor faces.

10. A rotation transmission device comprising:
a rotary-shaft unit that comprises: a first rotary shaft and a second rotary shaft that are both hollow, and together with being arranged so as to be concentric with each other, are combined so that the end sections of each are able to rotate relative to each other, and in this state are supported by a housing so as to rotate freely; and a torsion bar that is hollow and concentrically arranged on the inner-diameter side of the first and second rotary shafts, with one end section being connected to the first rotary shaft so that relative rotation is not possible, and the other end section being connected to the second rotary shaft so that relative rotation is not possible;
a first gear that is provided in the middle section in the axial direction of the outer-circumferential surface of the first rotary shaft;
a second gear that is provided in the middle section in the axial direction of the outer-circumferential surface of the second rotary shaft;
a first encoder that is fastened to one of the first and second rotary shafts so as to be concentric with that one rotary shaft, and comprising a first detection section that is magnetized so that the magnetic characteristics change in an alternating manner at a uniform pitch;

a second encoder that is fastened to the other of the first and second rotary shafts so as to be concentric with that other rotary shaft, and comprising a second detection section that is magnetized so that the magnetic characteristics change in an alternating manner at a uniform pitch; and a sensor unit that is supported by the housing, and comprises at least one sensor that faces the first and second detection sections, and causes an output signal to change in correspondence to the change in magnetic characteristics of a portion of the first and second detection section where the at least one sensor faces, wherein the first rotary shaft or second rotary shaft is integrally formed with the torsion bar.

11. A rotation transmission device comprising:

a rotary-shaft unit that comprises: a first rotary shaft and a second rotary shaft that are both hollow, and together with being arranged so as to be concentric with each other, are combined so that the end sections of each are able to rotate relative to each other, and in this state are supported by a housing so as to rotate freely; and a torsion bar that is hollow and concentrically arranged on the inner-diameter side of the first and second rotary shafts, with one end section being connected to the first rotary shaft so that relative rotation is not possible, and the other end section being connected to the second rotary shaft so that relative rotation is not possible;

a first gear that is provided in the middle section in the axial direction of the outer-circumferential surface of the first rotary shaft;

a second gear that is provided in the middle section in the axial direction of the outer-circumferential surface of the second rotary shaft;

a first encoder that is fastened to one of the first and second rotary shafts so as to be concentric with that one rotary shaft, and comprising a first detection section that is magnetized so that the magnetic characteristics change in an alternating manner at a uniform pitch;

a second encoder that is fastened to the other of the first and second rotary shafts so as to be concentric with that other rotary shaft, and comprising a second detection section that is magnetized so that the magnetic characteristics change in an alternating manner at a uniform pitch; and a sensor unit that is supported by the housing, and comprises at least one sensor that faces the first and second detection sections, and causes an output signal to change in correspondence to the change in magnetic characteristics of a portion of the first and second detection section where the at least one sensor faces, wherein the first and second encoders are made of a magnetic material, the first and second detection sections comprise sections with material removed and solid sections that are arranged in an alternating manner at a uniform pitch in the circumferential direction, and are arranged so as to be close to each other and overlap in the radial or axial direction, the sensor unit comprises a stator made of a magnetic material, and plural coils that are made of one conducting wire, and is constructed so that when a driving voltage is applied to the conducting wire, the output current or the output voltage from the conducting wire is used as an output signal, the stator comprises plural core sections that are arranged at a uniform pitch in the circumferential direction, extend in the overlapping direction of the first and second detection sections, and the tip-end surfaces face one of the first and second detection sections from one side in the overlapping direction of the first and second detection sections; and a circular ring-shaped rim section that connects together the base-end sections of the plural core sections, and the plural coils are fastened one by one around the plural core sections, and are such that the winding directions of coils that are adjacent in the circumferential direction are opposite each other.

12. A rotation transmission device comprising:

a rotary-shaft unit that comprises: a first rotary shaft and a second rotary shaft that are both hollow, and together with being arranged so as to be concentric with each other, are combined so that the end sections of each are able to rotate relative to each other, and in this state are supported by a housing so as to rotate freely; and a torsion bar that is hollow and concentrically arranged on the inner-diameter side of the first and second rotary shafts, with one end section being connected to the first rotary shaft so that relative rotation is not possible, and the other end section being connected to the second rotary shaft so that relative rotation is not possible;

a first gear that is provided in the middle section in the axial direction of the outer-circumferential surface of the first rotary shaft;

a second gear that is provided in the middle section in the axial direction of the outer-circumferential surface of the second rotary shaft;

a first encoder that is fastened to one of the first and second rotary shafts so as to be concentric with that one rotary shaft, and comprising a first detection section that is magnetized so that the magnetic characteristics change in an alternating manner at a uniform pitch;

a second encoder that is fastened to the other of the first and second rotary shafts so as to be concentric with that other rotary shaft, and comprising a second detection section that is magnetized so that the magnetic characteristics change in an alternating manner at a uniform pitch; and a sensor unit that is supported by the housing, and comprises at least one sensor that faces the first and second detection sections, and causes an output signal to change in correspondence to the change in magnetic characteristics of a portion of the first and second detection section where the at least one sensor faces, wherein the first and second encoders are made of a magnetic material, the first and second detection sections comprise sections with material removed and solid sections that are arranged in an alternating manner at a uniform pitch in the circumferential direction, and the solid sections of the first detection section and the solid sections of the second detection section are arranged in an alternating manner in the circumferential direction with a space in between each in the circumferential direction, and the sensor unit comprises one sensor that faces the portion where the solid sections are alternatingly arranged, and that sensor generates an output signal that changes in correspondence to the change in the magnetic characteristics of the portion where the sensor faces the solid sections of the first and second detection sections are alternatingly arranged.

* * * * *